(12) United States Patent
Xu et al.

(10) Patent No.: US 12,143,883 B2
(45) Date of Patent: *Nov. 12, 2024

(54) METHOD FOR SUPPORTING HANDOVER AND CORRESPONDING APPARATUS

(71) Applicant: Samsung Electronics Co., Ltd., Suwon-si (KR)

(72) Inventors: Lixiang Xu, Beijing (CN); Hong Wang, Beijing (CN); Xiaowan Ke, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,706

(22) Filed: Jun. 23, 2023

(65) Prior Publication Data

US 2023/0337099 A1     Oct. 19, 2023

Related U.S. Application Data

(63) Continuation of application No. 17/508,690, filed on Oct. 22, 2021, now Pat. No. 11,729,693, which is a
(Continued)

(30) Foreign Application Priority Data

Aug. 11, 2017 (CN) .......................... 201710682812.2
Sep. 30, 2017 (CN) .......................... 201710944124.9
Nov. 24, 2017 (CN) .......................... 201711194424.6

(51) Int. Cl.
*H04W 36/00* (2009.01)
*H04W 36/30* (2009.01)

(52) U.S. Cl.
CPC ........ *H04W 36/30* (2013.01); *H04W 36/0011* (2013.01)

(58) Field of Classification Search
CPC ............. H04W 36/30; H04W 36/0011; H04W 36/0022; H04W 36/14; H04W 36/0044;
(Continued)

(56) References Cited

U.S. PATENT DOCUMENTS 10,420,016 B2   9/2019   Ryu et al.
10,524,166 B2   12/2019  Youn et al.
(Continued)

FOREIGN PATENT DOCUMENTS

CN    102215537 A1    10/2011
EP       2385722 A1    11/2011
WO   2010/081429 A1     7/2010

OTHER PUBLICATIONS

3GPP TSG-RAN WG3#97bis R3-173613, Prague, Czech Republic, Oct. 9-13, 2017 Source: CATT, Title: Discussion on inter system data forwarding, 10 pages.*
(Continued)

*Primary Examiner* — Ahmed Elallam

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method of a base station for supporting an inter-system handover from an evolved packet system (EPS) system to a 5th generation (5G) system. The method solves the data forwarding prob-
(Continued)

lem during the movement of a UE between an LTE system and a 5G system, so that the loss of data is avoided and the continuity of services is ensured.

15 Claims, 17 Drawing Sheets

Related U.S. Application Data continuation of application No. 16/638,349, filed as application No. PCT/KR2018/009248 on Aug. 13, 2018, now Pat. No. 11,160,002.

(58) Field of Classification Search
CPC ............. H04W 28/02; H04W 36/0083; H04W 28/0268; H04W 36/0055
See application file for complete search history.

(56) References Cited

U.S. PATENT DOCUMENTS

| | | | |
|---|---|---|---|
| 10,694,434 | B2 | 6/2020 | Ryu et al. |
| 10,736,009 | B2 | 8/2020 | Xu et al. |
| 10,849,186 | B2 | 11/2020 | Dao et al. |
| 10,973,063 | B2 | 4/2021 | Wang |
| 11,160,002 | B2 * | 10/2021 | Xu .................... H04W 36/0044 |
| 11,223,987 | B2 | 1/2022 | Larsen et al. |
| 11,323,386 | B2 * | 5/2022 | Dannebro .......... H04W 36/0022 |
| 11,357,077 | B2 * | 6/2022 | Yang .................... H04W 76/11 |
| 11,606,733 | B2 | 3/2023 | Aminaka et al. |
| 11,617,109 | B2 * | 3/2023 | Ke ........................ H04W 36/14 370/331 |
| 11,729,693 | B2 * | 8/2023 | Xu ........................ H04W 36/30 370/331 |
| 2012/0207129 | A1 | 8/2012 | Sun |
| 2015/0215822 | A1 | 7/2015 | Won et al. |
| 2016/0021592 | A1 | 1/2016 | Vesely et al. |
| 2016/0330612 | A1 | 11/2016 | Mildh et al. |
| 2017/0034749 | A1 | 2/2017 | Chandramouli et al. |
| 2018/0014177 | A1 | 1/2018 | Sirotkin et al. |
| 2019/0349810 | A1 | 11/2019 | Cho et al. |
| 2020/0022061 | A1 | 1/2020 | Jin et al. |
| 2020/0037197 | A1 | 1/2020 | Cho et al. |
| 2020/0077356 | A1 | 3/2020 | Youn et al. |
| 2020/0120570 | A1 | 4/2020 | Youn et al. |
| 2020/0322857 | A1 | 10/2020 | Park et al. |
| 2020/0383151 | A1 | 12/2020 | Wang |
| 2021/0289402 | A1 | 9/2021 | Ke et al. |

OTHER PUBLICATIONS

3GPP TSG RAN WG3 Meeting #97bis R3-174201 Prague, Czech Republic, Oct. 9-13, 2017 Title: LS on the need for EPS Bearer ID knowledge in NG-RAN for inter-system handover from 5GS to EPS, one page.*

ISA/KR, International Search Report and Written Opinion of the International Searching Authority, International Application No. PCT/KR2018/009248, Nov. 23, 2018, 9 pages.

3GPP TS 23.502 V0.5.0 (Jul. 2017), Technical Specification, 3rd Generation Partnership Project; Technical Specification Group Services and System Aspects; Procedures for the 5G System; Stage 2 (Release 15), Jul. 2017, 154 pages.

China Telecom, "Update 5GS to EPS handover procedure," S2-175362, SA WG2 Temporary Document, SA WG2 Meeting #122-BIS, Aug. 21-25, 2017, Sophia Antipolis, France, 4 pages.

Huawei, "Update of 4G to 5G interworking handover with Nx interface," S2-175158, SA WG2 Meeting #122, San Jose del Cabo, Mexico, Jun. 26-30, 2017, 9 pages.

NTT Docomo, "23.502: handover from EPS to 5GS procedure using Nx interface," S2-174564, SA WG2 Temporary Document, SA WG2 Meeting #122, Jun. 26-30, 2017, Cabo, Mexico, 5 pages.

Supplementary European Search Report dated Jun. 30, 2021 in connection with European Application No. 18843077.1, 14 pages.

Office Action dated Jul. 20, 2021, in connection with Korean Application No. 10-2020-7003989, 10 pages.

3GPP TS 23.501 V1.2.0 (Jul. 2017), Technical Specification, 3rd Generation Partnership Project; Technical Specification Group Services and System Aspects; System Architecture for the 5G System; Stage 2 (Release 15), Jul. 2017, 166 pages.

3GPP TR 23.799 V14.0.0 (Dec. 2016), Technical Report, 3rd Generation Partnership Project; Technical Specification Group Services and System Aspects; Study on Architecture for Next Generation System (Release 14), Dec. 2016, 527 pages.

3GPP TS 36.413 V14.3.0 (Jun. 2017), Technical Specification, 3rd Generation Partnership Project; Technical Specification Group Radio Access Network; Evolved Universal Terrestrial Radio Access Network (E-UTRAN); S1 Application Protocol (S1AP) (Release 14), Jun. 2017, 347 pages.

ZTE, "TS 23.502 P-CR to handover from EPS to NGS," S2-172154 (revision of S2-17xxxx), SA WG2 Meeting #120, Busan, Korea, Mar. 27-31, 2017, 4 pages.

Office Action dated Aug. 12, 2022 in connection with Chinese Patent Application No. 201711194424.6, 19 pages.

* cited by examiner

METHOD FOR SUPPORTING HANDOVER AND CORRESPONDING APPARATUS

CROSS-REFERENCE TO RELATED APPLICATIONS

This application is a continuation of application Ser. No. 17/508,690, filed Oct. 22, 2021, which is a continuation of application Ser. No. 16/638,349, now U.S. Pat. No. 11,160,002, which is the 371 National Stage of International Application No. PCT/KR2018/009248, filed Aug. 13, 2018, which claims priority to Chinese Patent Application No. 201710682812.2, filed Aug. 11, 2017, Chinese Patent Application No. 201710944124.9, filed Sep. 30, 2017, and Chinese Patent Application No. 201711194424.6, filed Nov. 24, 2017, the disclosures of which are herein incorporated by reference in their entirety.

BACKGROUND

1. Field

The present invention relates to the technical field of radio communication, and in particular to a method for supporting handover and a corresponding apparatus.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "communication and network infrastructure" "service interface technology" "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Modern mobile communications increasingly tend to focus on multimedia services that provide users with high-rate transmission. FIG. 1 is a system architecture diagram showing System Architecture Evolution (SAE).

A User Equipment (UE) 101 is a terminal equipment for receiving data. An Evolved Universal Terrestrial Radio Access Network (E-UTRAN) 102 is a radio access network in which a macro eNodeB/NodeB providing the UE with an interface for accessing the radio network is included. A Mobility Management Entity (MME) 103 is responsible for managing a Mobility context, a session context and security information for the UE. A Serving Gateway (SGW) 104 mainly functions to provide a user plane, and the MME 103 and the SGW 104 may be in a same physical entity. A Packet Data Network Gateway (PGW) 105 is responsible for charging, lawful interception or more, and the PGW 105 and the SGW 104 may also be in a same physical entity. A Policy and Charging Rules Function Entity (PCRF) 106 provides Quality of Service (QoS) policy and charging rules. A Serving GPRS Support Node (SGSN) 108 is a network node equipment providing routing for data transmission in a Universal Mobile Telecommunication System (UMTS). A Home Subscriber Server (HSS) 109 is a home ownership subsystem of the UE, and is responsible for protecting user information comprising the current location of the UE, the address of a serving node, user security information, a packet data context of the UE, or more.

FIG. 2 shows an overall architecture of 5G. A User Equipment (UE) 201 is a terminal equipment for receiving data. A Next Generation Radio Access Network (NG-RAN) 102 is a radio access network in which a base station providing the UE with an interface for accessing the radio network is included. The base station may be a gNB or an eNB connected to 5GC, and the eNB connected to 5GC may also be called an nb-eNB. An Access Control and Mobility Management Function Entity (AMF) 203 is responsible for managing a Mobility context and security information for the UE. A User Plane Function Entity (UPF) 204 mainly provides a user plane function. A Session Management Function Entity (SMF) 205 is responsible for session management. A Data Network (DN) 206 contains operator services, the access to Internet, third-party services or more.

The interface between the NG-RAN and the AMF is NG-C or N2, and the interface between the NG-RAN and the UPF is NG-U or N3.

In the next generation network deployment, there is a scenario in which the LTE network and the 5G network coexist. When a UE moves in a boundary between the E-UTRAN and the NG-RAN, technologies for realizing a handover between different radio access technologies (inter-RAT handover) are required in order to ensure the continuity of services. Since there are EPS bearers in an EPS but no EPS bearers in a 5GS, there is a series of problems on how to perform data forwarding during the handover between the two systems.

SUMMARY

It can be known from the description of the prior art that the architecture of 5G is different from that of LTE. In addition, the data bearer mode in 5G is also different from that in an LTE system. In the LTE, each Packet Data Network (PDN) connection is divided into multiple bearers according to different Qos levels, and different interfaces and bearers are in one-to-one correspondence. However, in the 5G system, for each Packet Data Unit (PDU) session on the network side, data is transmitted by one tunnel. At an air interface, data received by a same tunnel from a network side can be mapped to different Data Radio Bearers (DRBs) for transmission. The concept of the PDN connection in the LTE system is the same as the concept of the PDU session in the 5G system. These differences need to be completed by a handover process between different systems. Particularly, at present, it is still not clear how to solve the following problems.

Problem 1: A UE accesses to a second NG-RAN node to establish a PDU session through a handover in the 5G system, rather than through the transition from the idle mode to the active mode or through a PDU session establishment process. Here, the NG-RAN node may be a gNB or an ng-eNB. The UE needs to be handed over from the second NG-RAN node to an LTE base station connected to the EPS. How this handover process is supported? Particularly, how data forwarding is performed?

Problem 2: In order to support the continuity of services during the handover between different systems, and when a UE accesses to the 5GS, when and how an EPS bearer identifier is allocated?

Problem 3: In the case of dual registration, since some PDU sessions need to be transferred from the 5GS to the EPS, how data forwarding is performed?

Problem 4: In the case of dual registration, since some PDU sessions need to be transferred from the EPS to the 5GS, how data forwarding is performed?

Problem 5: A UE accesses to a second eNB to establish a PDU session through a handover in the EPS system, rather than through the transition from the idle mode to the active mode or through a PDN connection establishment process. The UE needs to be handed over from the second eNB to a base station connected to the 5GS. How this handover process is supported? Particularly, how data forwarding is performed?

The objective of the present invention is to solve at least one of the above technical deficiencies, particularly the data forwarding problem during the movement of a UE between an LTE system and a 5G system.

In accordance with an aspect of the present disclosure, an embodiment of the present invention provides a method for supporting handover, comprising the following steps of: acquiring, by a first base station in a first communication system, Evolved Packet System (EPS) bearer information mapped by a Quality of Service (Qos) flow in a Packet Data Unit (PDU) session through an intra-system handover process; transmitting, by the first base station, a handover required message to an Access and Mobility Function entity (AMF), wherein the handover required message contains the EPS bearer information; receiving, by the first base station, a handover command message carrying data forwarding tunnel information transmitted by the AMF; and performing, by the first base station and with a third base station in a second communication system, data forwarding according to the received data forwarding tunnel information.

In accordance with another aspect of the present disclosure, another embodiment of the present invention provides a method for supporting handover, comprising the following steps of: receiving, by an Access and Mobility Function entity (AMF) in a first communication system, a handover required message transmitted by a first base station, wherein the handover required message contains Evolved Packet System (EPS) bearer information mapped by a Quality of Service (Qos) flow in a Packet Data Unit (PDU) session; and transmitting, by the AMF, a handover command message carrying data forwarding tunnel information to the first base station; wherein the EPS bearer information is acquired by the first base station through an intra-system handover process.

In accordance with another aspect of the present disclosure, another embodiment of the present invention provides a method for supporting handover, comprising the following steps of: transmitting, by a second base station, a handover request message to a first base station, wherein the handover request message contains EPS bearer information mapped by a Qos flow in a PDU session; and receiving, by the second base station, a handover request acknowledgment message fed back by the first base station.

In accordance with another aspect of the present disclosure, another embodiment of the present invention provides a method for supporting handover, comprising the following steps of: acquiring, by a first base station in a first communication system, Qos flow information corresponding to EPS bearer information through an intra-system handover process; transmitting, by the first base station, a handover required message to a Mobility Management Entity (MME), wherein the handover required message contains the Qos flow information corresponding to EPS bearer information; receiving, by the first base station, a handover command message carrying data forwarding tunnel information transmitted by the MME; and performing, by the first base station and with a third base station in a second communication system, data forwarding according to the received data forwarding tunnel information.

In accordance with another aspect of the present disclosure, another embodiment of the present invention provides a method for supporting handover, comprising the following steps of: receiving, by a Mobility Management Entity (MME) in a second communication system, a handover required message transmitted by a first base station, wherein the handover required message contains Qos flow information corresponding to EPS bearer information; and transmitting, by the MME, a handover command message carrying data forwarding tunnel information to the first base station; wherein the Qos flow information is acquired by the first base station through an intra-system handover process.

In accordance with another aspect of the present disclosure, another embodiment of the present invention provides a method for supporting handover, comprising the following steps of: transmitting, by a second base station, a handover request message to a first base station, wherein the handover request message contains Qos flow information; receiving, by the second base station, a handover response message fed back by the first base station; and transmitting, by the base station, a handover command message carrying data forwarding tunnel information to a UE.

In accordance with another aspect of the present disclosure, another embodiment of the present invention provides a base station comprising: an acquisition module configured to acquire, through an intra-system handover process, Evolved Packet System (EPS) bearer information mapped by a Quality of Service (Qos) flow in a Packet Data Unit (PDU) session; a transmitting module configured to transmit a handover required message to an Access and Mobility Function entity (AMF), wherein the handover required message contains the EPS bearer information; a receiving module configured to receive a handover command message carrying data forwarding tunnel information transmitted by the AMF; and a forwarding module configured to perform data forwarding according to the received data forwarding tunnel information.

In accordance with another aspect of the present disclosure, another embodiment of the present invention provides a base station comprising: an acquisition module configured to acquire, through an intra-system handover process, Qos flow information corresponding to EPS bearer information; a transmitting module configured to transmit a handover required message to a Mobility Management Entity (MME), wherein the handover required message contains the Qos flow information corresponding to EPS bearer information; a receiving module configured to receive a handover command message carrying data forwarding tunnel information transmitted by the MME; and a forwarding module configured to perform data forwarding according to the received data forwarding tunnel information.

In accordance with another aspect of the present disclosure, a method of a base station for supporting an inter-system handover from an evolved packet system (EPS) system to a 5th generation (5G) system is provided. The method comprises receiving, from an access and mobility management function (AMF), a handover request message including E-UTRAN radio access bearer (E-RAB) information and quality of service (Qos) flow information, identifying whether a protocol data unit (PDU) session is accepted or not, determining whether a data forwarding for at least one Qos flow associated with the PDU session is accepted or not based on the E-RAB information and the Qos flow information in case that the PDU session is accepted, and transmitting, to the AMF, a handover request acknowledgement message including information on the at least one Qos flow based on the determination.

In accordance with another aspect of the present disclosure, a method of an access and mobility management function (AMF) for supporting an inter-system handover from an evolved packet system (EPS) system to a 5th generation (5G) system is provided. The method comprises receiving, from a session management function (SMF), a first message including quality of service (Qos) flow information; transmitting, to a base station, a handover request message including E-UTRAN radio access bearer (E-RAB) information and the Qos flow information, receiving, from the base station, a handover request acknowledgement message including information indicating whether a data forwarding for at least one Qos flow associated with a protocol data unit (PDU) session is accepted or not, the information being determined based on the E-RAB information and the Qos flow information, when the PDU session is accepted by the base station, and transmitting, to the SMF, a second message including tunnel information for the data forwarding.

In accordance with another aspect of the present disclosure, a base station for supporting an inter-system handover from an evolved packet system (EPS) system to a 5th generation (5G) system is provided. The base station comprises a transceiver and a controller coupled with the transceiver and configured to receive, from an access and mobility management function (AMF), a handover request message including E-UTRAN radio access bearer (E-RAB) information and quality of service (Qos) flow information, identify whether a protocol data unit (PDU) session is accepted or not, determine whether a data forwarding for at least one Qos flow associated with the PDU session is accepted or not based on the E-RAB information and the Qos flow information in case that the PDU session is accepted, and transmit, to the AMF, a handover request acknowledgement message including information on the at least one Qos flow based on the determination.

In accordance with another aspect of the present disclosure, an access and mobility management function (AMF) for supporting an inter-system handover from an evolved packet system (EPS) system to a 5th generation (5G) system is provided. The AMF comprises a transceiver and a controller coupled with the transceiver and configured to receive, from a session management function (SMF), a first message including quality of service (Qos) flow information, transmit, to a base station, a handover request message including E-UTRAN radio access bearer (E-RAB) information and the Qos flow information, receive, from the base station, a handover request acknowledgement message including information indicating whether a data forwarding for at least one Qos flow associated with a protocol data unit (PDU) session is accepted or not, the information being determined based on the E-RAB information and the Qos flow information, when the PDU session is accepted by the base station, and transmit, to the SMF, a second message including tunnel information for the data forwarding.

By the data forwarding method for supporting handover according to the present invention, the data continuity problem during the movement between an EPS and a 5GC system is solved, so that the loss of data is avoided and the delay of data forwarding is reduced.

Additional aspects and advantages of the present invention will be partially appreciated and become apparent from the descriptions below, or will be well learned from the practices of the present invention.

BRIEF DESCRIPTION OF THE DRAWINGS

The above and/or additional aspects and advantageous of the present invention will become apparent and be more readily appreciated from the following descriptions of embodiments, with reference to the accompanying drawings, in which.

DETAILED DESCRIPTION

Figure 1:
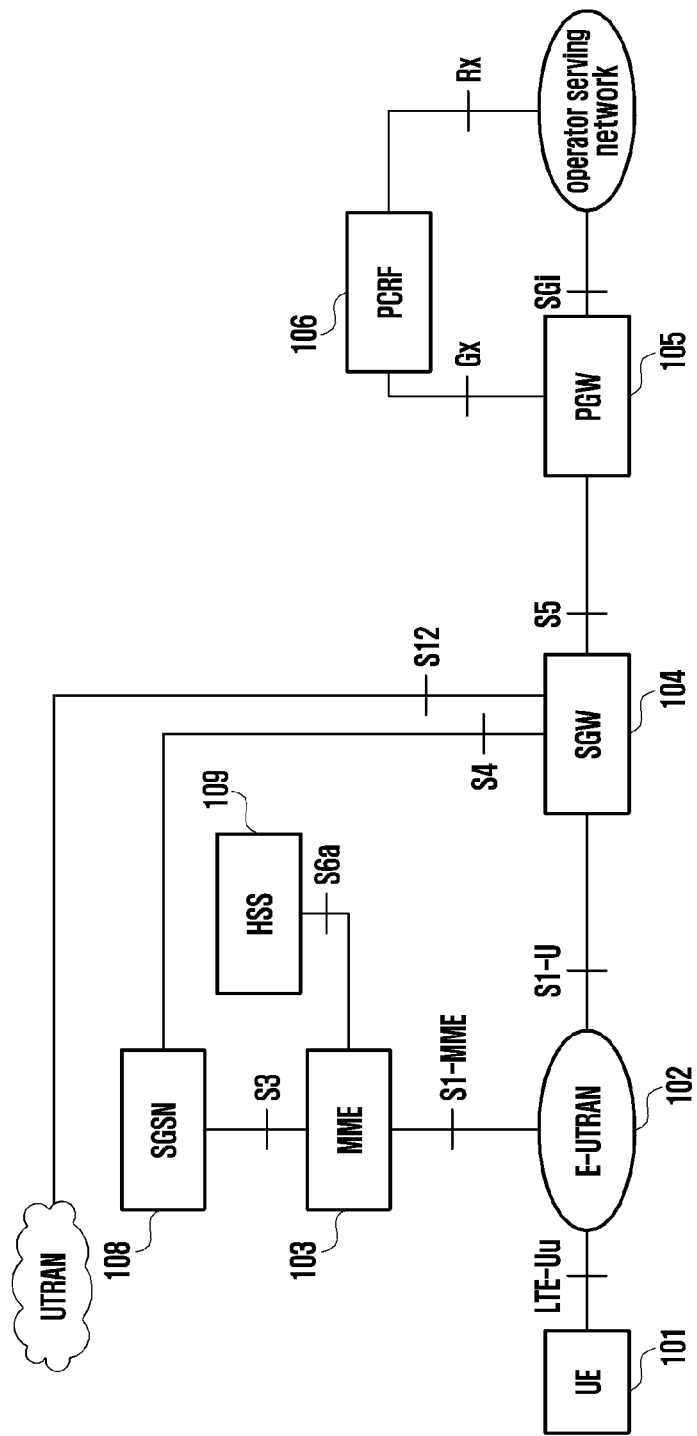
FIG. 1 is a system architecture diagram showing SAE.
Figure 2:
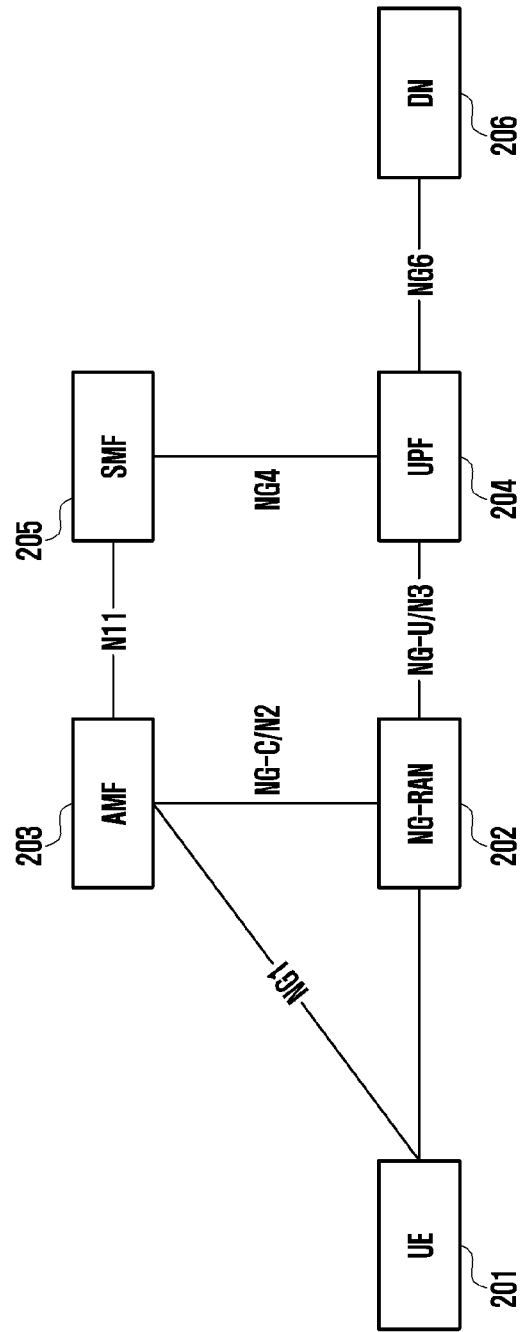
FIG. 2 is a schematic diagram of an overall architecture of 5G.

The objective of the present invention is to solve at least one of the above technical deficiencies, particularly the data forwarding problem during the movement of a UE between an LTE system and a 5G system.

An embodiment of the present invention provides a method for supporting handover, comprising the following steps of:

acquiring, by a first base station in a first communication system, Evolved Packet System (EPS) bearer information mapped by a Quality of Service (Qos) flow in a Packet Data Unit (PDU) session through an intra-system handover process;

transmitting, by the first base station, a handover required message to an Access and Mobility Function entity (AMF), wherein the handover required message contains the EPS bearer information;

receiving, by the first base station, a handover command message carrying data forwarding tunnel information transmitted by the AMF; and performing, by the first base station and with a third base station in a second communication system, data forwarding according to the received data forwarding tunnel information.

Specifically, the EPS bearer information acquired by the first base station contains an Evolved Radio Access Bearer (E-RAB) identifier; and the handover required message contains the identifier of the E-RAB and a downlink data forwarding proposal.

Specifically, the first communication system is a 5G communication system, and the second communication system is an LTE communication system.

Another embodiment of the present invention provides a method for supporting handover, comprising the following steps of:

receiving, by an Access and Mobility Function entity (AMF) in a first communication system, a handover required message transmitted by a first base station, wherein the handover required message contains Evolved Packet System (EPS) bearer information mapped by a Quality of Service (Qos) flow in a Packet Data Unit (PDU) session; and transmitting, by the AMF, a handover command message carrying data forwarding tunnel information to the first base station;

wherein the EPS bearer information is acquired by the first base station through an intra-system handover process.

Specifically, the intra-system handover process comprises the following steps of:

receiving, by the AMF, a handover required message transmitted by a second base station;

transmitting, by the AMF, a PDU handover request message to a Session Management Function entity (SMF);

receiving, by the AMF, a PDU handover request response message fed back by the SMF, wherein the PDU handover request response message contains the EPS bearer information mapped by the Qos flow in the PDU session;

transmitting, by the AMF and to the first base station, a handover request message containing the EPS bearer information mapped by the Qos flow in the PDU session; and receiving, by the AMF, a handover request acknowledgment message fed back by the first base station, and transmitting a handover command message to a second source base station.

Specifically, the intra-system handover process comprises the following steps of:

receiving, by the AMF, a path switch request message transmitted by the first base station;

transmitting, by the AMF, an N11 message to the SMF, wherein the N11 message contains N2 session information received based on the path switch request message;

receiving, by the AMF, an N11 message acknowledgment message transmitted by the SMF, wherein the acknowledgment message contains the EPS bearer information mapped by the Qos flow in the PDU session; and transmitting, by the AMF, a path switch request acknowledgment message to the first base station, wherein the path switch request acknowledgment message contains the EPS bearer information mapped by the Qos flow in the PDU session received from the AMF.

Correspondingly, still another embodiment of the present invention provides a method for supporting handover, comprising the following steps of:

transmitting, by a second base station, a handover request message to a first base station, wherein the handover request message contains EPS bearer information mapped by a Qos flow in a PDU session; and receiving, by the second base station, a handover request acknowledgment message fed back by the first base station.

Still another embodiment of the present invention provides a method for supporting handover, comprising the following steps of:

acquiring, by a first base station in a first communication system, Qos flow information corresponding to EPS bearer information through an intra-system handover process;

transmitting, by the first base station, a handover required message to a Mobility Management Entity (MME), wherein the handover required message contains the Qos flow information corresponding to EPS bearer information;

receiving, by the first base station, a handover command message carrying data forwarding tunnel information transmitted by the MME; and performing, by the first base station and with a third base station in a second communication system, data forwarding according to the received data forwarding tunnel information.

Specifically, the Qos flow information corresponding to EPS bearer information acquired by the first base station contains Qos and/or a Qos flow identifier; and the handover required message contains the PDU session identifier and a downlink data forwarding proposal for the PDU session.

Specifically, the first communication system is a 5G communication system, and the second communication system is an LTE communication system.

Still another embodiment of the present invention provides a method for supporting handover, comprising the following steps of:

receiving, by a Mobility Management Entity (MME) in a second communication system, a handover required message transmitted by a first base station, wherein the handover required message contains Qos flow information corresponding to EPS bearer information; and transmitting, by the MME, a handover command message carrying data forwarding tunnel information to the first base station;

wherein the Qos flow information is acquired by the first base station through an intra-system handover process.

Specifically, the intra-system handover process comprises the following steps of:

receiving, by the MME, a PDU connection request message transmitted by a UE;

transmitting, by the MME, a session establishment request message to a Serving Gateway (SGW);

receiving, by the MME, a session establishment response message fed back by the SGW, wherein the session establishment response message contains Qos flow information corresponding to an EPS bearer;

transmitting, by the MME, a bearer establishment request message to the first base station, wherein the message contains the Qos flow information corresponding to the EPS bearer; and receiving, by the MME, a bearer establishment response message fed back by the first base station.

Specifically, the intra-system handover process comprises the following steps of:

receiving, by the MME, handover request information transmitted by a second base station, wherein the handover request information contains Qos flow information; and transmitting, by the MME, a handover command message carrying data forwarding tunnel information to the first base station.

Yet another embodiment of the present invention provides a method for supporting handover, comprising the following steps of:

transmitting, by a second base station, a handover request message to a first base station, wherein the handover request message contains Qos flow information;

receiving, by the second base station, a handover response message fed back by the first base station; and transmitting, by the base station, a handover command message carrying data forwarding tunnel information to a UE.

A base station is provided, comprising:

an acquisition module configured to acquire, through an intra-system handover process, Evolved Packet System (EPS) bearer information mapped by a Quality of Service (Qos) flow in a Packet Data Unit (PDU) session;

a transmitting module configured to transmit a handover required message to an Access and Mobility Function entity (AMF), wherein the handover required message contains the EPS bearer information;

a receiving module configured to receive a handover command message carrying data forwarding tunnel information transmitted by the AMF; and a forwarding module configured to perform data forwarding according to the received data forwarding tunnel information.

A base station is provided, comprising:

an acquisition module configured to acquire, through an intra-system handover process, Qos flow information corresponding to EPS bearer information;

a transmitting module configured to transmit a handover required message to a Mobility Management Entity (MME), wherein the handover required message contains the Qos flow information corresponding to EPS bearer information;

a receiving module configured to receive a handover command message carrying data forwarding tunnel information transmitted by the MME; and a forwarding module configured to perform data forwarding according to the received data forwarding tunnel information.

In accordance with another aspect of the present disclosure a method of a base station for supporting an inter-system handover from an evolved packet system (EPS) system to a 5th generation (5G) system is provided. The method comprises receiving, from an access and mobility management function (AMF), a handover request message including E-UTRAN radio access bearer (E-RAB) information and quality of service (Qos) flow information, identifying whether a protocol data unit (PDU) session is accepted or not, determining whether a data forwarding for at least one Qos flow associated with the PDU session is accepted or not based on the E-RAB information and the Qos flow information in case that the PDU session is accepted, and transmitting, to the AMF, a handover request acknowledgement message including information on the at least one Qos flow based on the determination.

The handover request acknowledgement message includes information indicating that the data forwarding for at least one Qos flow is accepted in case that the data forwarding for the at least one Qos flow is accepted.

The handover request acknowledgement message includes information indicating that the data forwarding for at least one Qos flow is not accepted in case that the data forwarding for the at least one Qos flow is not accepted.

The E-RAB information includes an E-RAB identifier and data forwarding information.

The Qos flow information includes information on mapping between an E-RAB and the at least one Qos flow.

The handover request message includes handover type information.

The handover request acknowledgement message includes PDU session information indicating that the PDU session is rejected to be established by the base station and cause information for a rejection in case that the PDU session is not accepted.

In accordance with another aspect of the present disclosure, a method of an access and mobility management function (AMF) for supporting an inter-system handover from an evolved packet system (EPS) system to a 5th generation (5G) system is provided. The method comprises receiving, from a session management function (SMF), a first message including quality of service (Qos) flow information; transmitting, to a base station, a handover request message including E-UTRAN radio access bearer (E-RAB) information and the Qos flow information, receiving, from the base station, a handover request acknowledgement message including information indicating whether a data forwarding for at least one Qos flow associated with a protocol data unit (PDU) session is accepted or not, the information being determined based on the E-RAB information and the Qos flow information, when the PDU session is accepted by the base station, and transmitting, to the SMF, a second message including tunnel information for the data forwarding.

The Qos flow information includes information on mapping between an E-RAB and the at least one Qos flow.

The handover request acknowledgement message includes the tunnel information.

In accordance with another aspect of the present disclosure, a base station for supporting an inter-system handover from an evolved packet system (EPS) system to a 5th generation (5G) system is provided. The base station comprises a transceiver and a controller coupled with the transceiver and configured to receive, from an access and mobility management function (AMF), a handover request message including E-UTRAN radio access bearer (E-RAB) information and quality of service (Qos) flow information, identify whether a protocol data unit (PDU) session is accepted or not, determine whether a data forwarding for at least one Qos flow associated with the PDU session is accepted or not based on the E-RAB information and the Qos flow information in case that the PDU session is accepted, and transmit, to the AMF, a handover request acknowledgement message including information on the at least one Qos flow based on the determination.

The handover request acknowledgement message includes information indicating that the data forwarding for at least one Qos flow is accepted in case that the data forwarding for the at least one Qos flow is accepted.

The handover request acknowledgement message includes information indicating that the data forwarding for at least one Qos flow is not accepted in case that the data forwarding for the at least one Qos flow is not accepted.

The handover request acknowledgement message includes PDU session information indicating that the PDU session is rejected to be established by the base station and cause information for a rejection in case that the PDU session is not accepted.

In accordance with another aspect of the present disclosure, an access and mobility management function (AMF) for supporting an inter-system handover from an evolved packet system (EPS) system to a 5th generation (5G) system is provided. The AMF comprises a transceiver and a controller coupled with the transceiver and configured to receive, from a session management function (SMF), a first message including quality of service (Qos) flow information, transmit, to a base station, a handover request message including E-UTRAN radio access bearer (E-RAB) information and the Qos flow information, receive, from the base station, a handover request acknowledgement message including information indicating whether a data forwarding for at least one Qos flow associated with a protocol data unit (PDU) session is accepted or not, the information being determined based on the E-RAB information and the Qos flow information, when the PDU session is accepted by the base station, and transmit, to the SMF, a second message including tunnel information for the data forwarding.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

The present invention provides a method for supporting handover, comprising the following steps of:

acquiring, by a first base station in a first communication system Evolved Packet System (EPS) bearer information mapped by a Quality of Service (Qos) flow in a Packet Data Unit (PDU) session through an intra-system handover process;

transmitting, by the first base station, a handover required message to an Access and Mobility Function entity (AMF), wherein the handover required message contains the EPS bearer information;

receiving, by the first base station, a handover command message carrying data forwarding tunnel information transmitted by the AMF; and performing, by the first base station and with a third base station in a second communication system, data forwarding according to the received data forwarding tunnel information.

Specifically, the first communication system is a 5G communication system, and the second communication system is an LTE communication system.

Correspondingly, the present invention further provides a method for supporting handover, comprising the following steps of:

receiving, by an Access and Mobility Function entity (AMF) in a first communication system, a handover required message transmitted by a first base station, wherein the handover required message contains Evolved Packet System (EPS) bearer information mapped by a Quality of Service (Qos) flow in a Packet Data Unit (PDU) session; and transmitting, by the AMF, a handover command message carrying data forwarding tunnel information to the first base station;

wherein the EPS bearer information is acquired by the first base station through an intra-system handover process.

The method for supporting handover will be described below in detail by specific embodiments.

Figure 3:
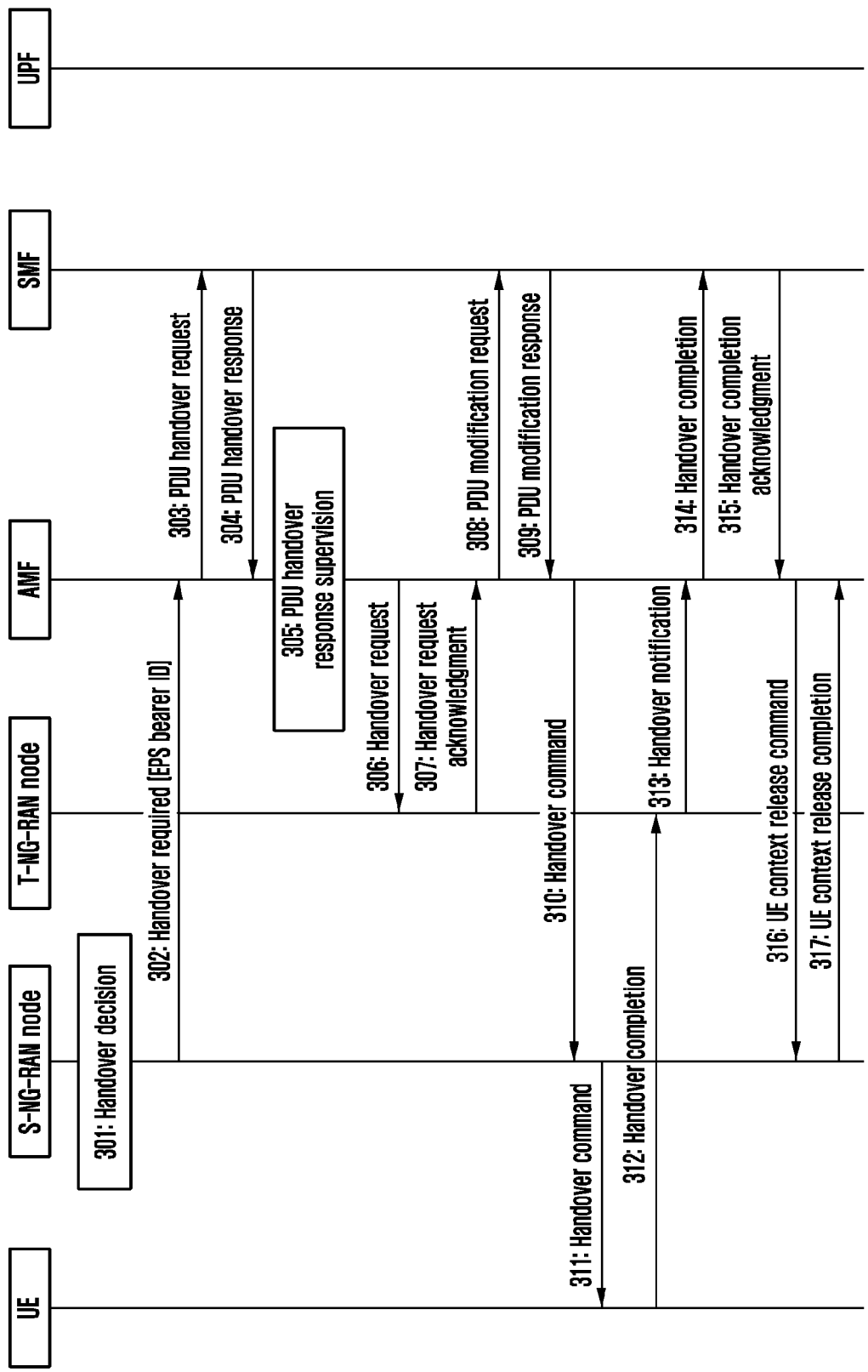
FIG. 3 is a schematic flowchart of the access of a UE to an NG-RAN base station through an NG handover.

As shown in FIG. 3, the method is used by an NG-RAN node to acquire the information for inter-system handover in order to support the scenario when a UE accesses to an NG-RAN node through an NG handover procedure and the NG-RAN node needs to trigger an inter-system handover to EPS. Here, the NG-RAN node can be a gNB or an eNB connected to the 5GC (also called an ng-eNB). This method comprises the following steps.

Step 301: A source NG-RAN node (S-NG-RAN node) decides to initiate a handover of a UE.

Step 302: The S-NG-RAN node transmits a handover required message to an AMF.

The UE has one or more ongoing PDU sessions. Each PDU session contains one or more Qos flows. During a PDU session establishment or Guaranteed Business Rate (GBR) Qos flow establishment process, mapped EPS Qos information and/or an EPS bearer identifier is allocated to a Qos flow. A Non-GBR Qos flow is mapped to a default EPS bearer. A GBR Qos flow is mapped to a dedicated EPS bearer. EPS Qos information mapped by a Qos flow can be allocated by a PCC or an SMF. The EPS bearer identifier corresponding to a QoS flow can be allocated by an SMF, an AMF or a UE. In order to support the handover between different systems, an SMF can have functions of a PGW control plane. In a PCC deployment scenario, a Policy Control Function (PCF) provides the SMF with mapped EPS Qos of a Qos flow. In order to support the handover between different systems, the PCF can have a Policy Control and Charging Rules Function (PCRF). The SMF transmits, through the AMF and to the UE, the mapped EPS Qos information and/or an EPS bearer identifier of a Qos flow. For example, the SMF transmits the information to the UE through a non-access stratum message a PDU session establishment message. During the PDU session establishment or GBR Qos flow establishment process, the SMF can further transmit, through the AMF and to an NG-RAN, the mapped EPS Qos information and/or an E-RAB identifier of a Qos flow. The AMF transmits the mapped EPS Qos information and/or an E-RAB identifier of a Qos flow to the NG-RAN through an initial context establishment request message or a PDU session resource establishment request message. The NG-RAN can transmit the mapped EPS Qos information and/or an E-RAB identifier of a Qos flow to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

In a source-to-target transparent transmitter, the S-NG-RAN node contains the EPS bearer identifier and/or EPS Qos information mapped by a Qos flow in the PDU session.

Step 303: The AMF transmits a PDU handover request message to the SMF. This message is specific to each PDU session on which an NG handover is to be performed. This message contains a PDU session identifier and a target identifier.

Step 304: The SMF transmits a PDU handover response message to the AMF. This message contains a PDU session identifier and information of Session Management (SM) over an NG-C interface. The SMF selects an UPF having an interface to a target gNB.

Step 305: The AMF detects the PDU handover response message of each SMF. When the AMF receives all PDU handover responses or the maximum waiting time arrives, the handover process will be continuously executed.

In the method of the present invention, steps 303 to 305 are not mandatory steps. The PDU session information and the information of the Qos flows contained in the PDU session can be contained in the handover required message, so that it is not necessary to execute steps 303 to 305.

Step 306: The AMF transmits a handover request message to a target NG-RAN node (T-NG-RAN node). This message contains a source-to-target transparent transmitter. The source-to-target transparent transmitter contains the EPS bearer identifier and/or EPS Qos information mapped by a Qos flow in the PDU session. The handover request further contains PDU session information to be established. The PDU session information to be established contains a PDU session identifier.

When the target NG-RAN node needs to initiate a handover of the UE to an EPS system, the target NG-RAN node uses the received EPS bearer identifier and/or EPS Qos information mapped by a Qos flow in the PDU session so that the data forwarding during the handover between different systems can be supported. The specific process is as described in the embodiment shown in FIG. 4.

Step 307: The T-NG-RAN node transmits a handover request acknowledgement message to the AMF. This message contains the data forwarding tunnel information allocated by the target base station. This message contains a target-to-source transparent transmitter. This message contains a list of unsuccessfully established PDU sessions.

Step 308: The AMF transmits a PDU modification request message to the SMF. This message contains the indirect data forwarding tunnel information allocated by the T-NG-RAN node. The AMF can transmit, through the PDU modification request message, the indirect data forwarding tunnel information allocated by the T-NG-RAN node and then request to allocate tunnel information used for data forwarding from the S-NG-RAN node to the UPF, or the AMF can transmit, through another individual message, the indirect data forwarding tunnel information allocated by the T-NG-RAN node and then request to allocate tunnel information used for data forwarding from the S-NG-RAN node to the UPF.

Step 309: The SMF transmits a PDU modification response message to the AMF.

Step 310: The AMF transmits a handover command message to the S-NG-RAN node. This message contains a target-to-source transparent transmitter. For the indirect data forwarding, the AMF transmits, to the source base station, the data forwarding tunnel information allocated by the UPF. If the UPF changes during a handover process, the AMF transmits, to the source base station, the data forwarding tunnel information allocated by the source UPF.

Step 311: The S-NG-RAN node transmits a handover command message to the UE. The UE is synchronized to the target base station.

Step 312: The UE transmits a handover completion message to the T-NG-RAN node.

Step 313: The T-NG-RAN node transmits a handover notification message to the AMF.

Step 314: The AMF transmits a handover completion message to the SMF. This message contains the PDU session identifier. This message is specific to each PDU session.

Step 315: The SMF transmits a handover completion acknowledgement message to the AMF. The SMF needs to inform the selected UPF of information indicating that the downlink user plane tunnel is handed over to the T-NG-RAN node, i.e., the downlink tunnel information allocated by the T-NG-RAN node.

Step 316: The AMF transmits a UE context release command message to the S-NG-RAN node.

Step 317: The S-NG-RAN node transmits a UE context release completion message to the AMF.

So far, the first method for supporting handover according to the present invention has been described. By this method, the data forwarding can be well supported when a UE accesses to an NG-RAN node through a handover and when the NG-RAN node needs to initiate a handover of the UE from a 5GS to an EPS, so that the loss of data is avoided, the delay of the data forwarding is reduced and the continuity of services is ensured.

Figure 4:
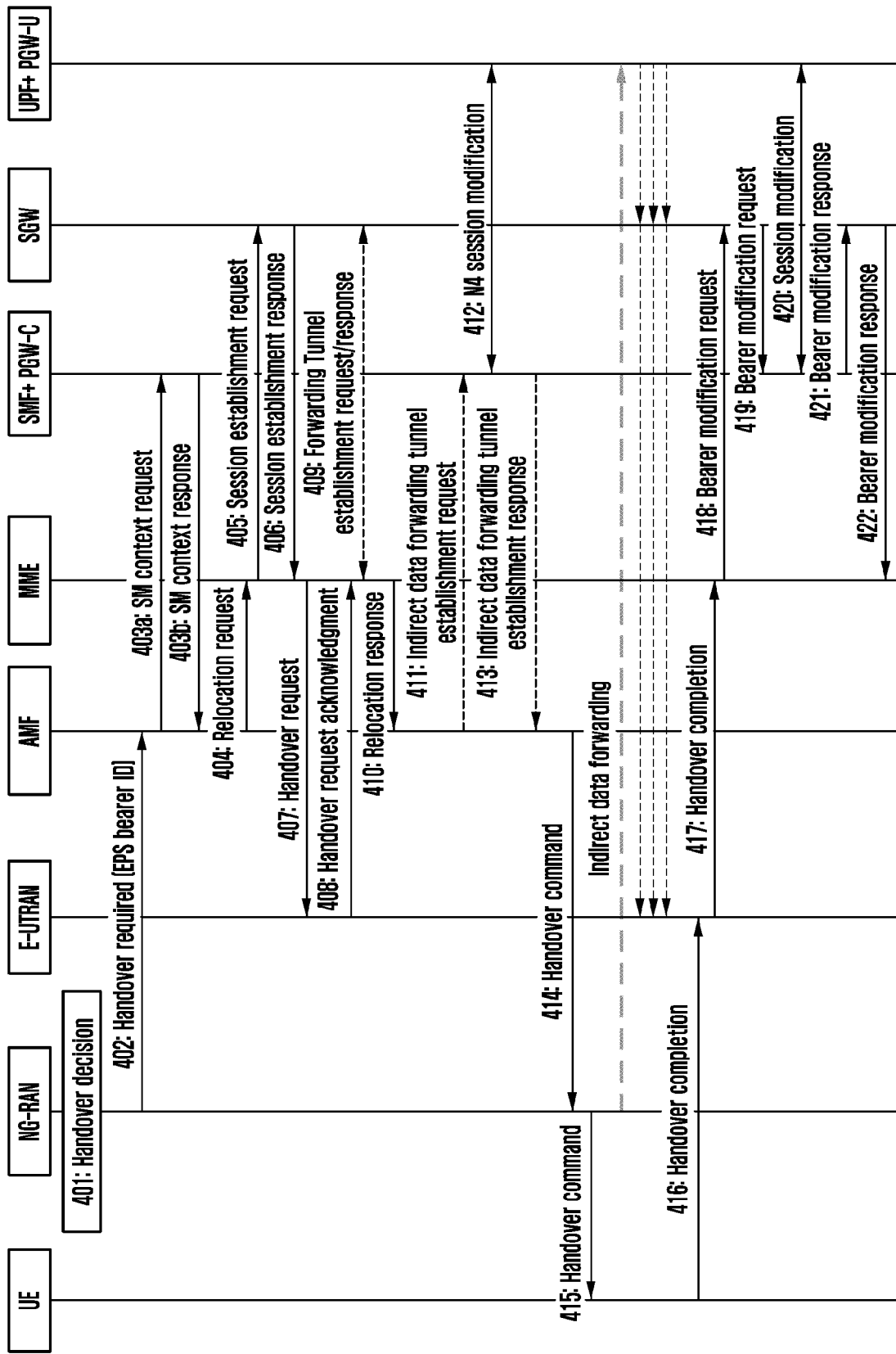
FIG. 4 is a schematic flowchart of a handover of a UE from a 5G system to an EPS system.

As shown in FIG. 4, this method can well support the data forwarding during the handover between different systems. This method comprises the following steps.

Step 401: An NG-RAN decides to hand over a UE to an E-UTRAN.

Here, the E-UTRAN can be an eNB connected to the EPC. The NG-RAN can be a gNB, an eNB connected to the 5GC or a Centralized Unit (CU) in the gNB.

The user plane path before handover is from an UPF to the NG-RAN. The SGW needs to support an interface to the UPF. The UPF can contain a function of a PGW user plane and a function of performing user plane anchoring during the handover between different RATs.

The UE has one or more ongoing PDU sessions. Each PDU session contains one or more Qos flows. During a PDU session establishment or Guaranteed Business Rate (GBR) Qos flow establishment process, mapped EPS Qos information and/or EPS bearer identifier is allocated to a Qos flow. A Non-GBR Qos flow is mapped to a default EPS bearer. A GBR Qos flow is mapped to a dedicated EPS bearer. EPS Qos information mapped by a Qos flow can be allocated by a PCC or an SMF. The EPS bearer identifier mapped by a Qos flow can be allocated by an SMF, an AMF or a UE. In order to support the handover between different systems, the SMF can have functions of a PGW control plane. In a PCC deployment scenario, a Policy Control Function (PCF) provides the SMF with mapped EPS Qos of a Qos flow. In order to support the handover between different systems, the PCF can have a Policy Control and Charging Rules Function (PCRF). The SMF transmits, through the AMF and to the UE, the mapped EPS Qos information and/or an EPS bearer identifier of a Qos flow. For example, the SMF transmits the information to the UE through a non-access stratum message PDU session establishment message. During the PDU session establishment or GBR Qos flow establishment process, the SMF can further transmit, through the AMF and to an NG-RAN, the mapped EPS Qos information and/or an E-RAB identifier of a Qos flow. The AMF transmits the mapped EPS Qos information and/or an E-RAB identifier of a Qos flow to the NG-RAN through an initial context establishment request message or a PDU session resource establishment request message. The NG-RAN can transmit the mapped EPS Qos information and/or an E-RAB identifier of a Qos flow to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

Step 402: The NG-RAN transmits a handover required message to an AMF. This message contains the identifier of a target eNB and a source-to-target transparent transmitter. The source-to-target transparent transmitter contains the E-RAB identifier and a downlink data forwarding proposed for an E-RAB. The NG-RAN acquires, through a PDU session establishment process or a handover process, the EPS bearer identifier mapped by a Qos flow in the PDU session. It is also possible to acquire the mapped EPS Qos information. The method for acquiring the EPS bearer information by the NG-RAN through handover is as described in the method shown in FIGS. 3, 5, 6 and 7. The method for acquiring the EPS bearer information through a PDU session establishment process is as described in step 401 or the method shown in FIGS. 8 and 9. The NG-RAN decides, according to the mapping from the Qos flow to the E-RAB and the Qos information, whether to propose data forwarding. The NG-RAN can make a decision by considering other factors, for example, the presence or absence of data in a buffer, without influencing the main contents of the present invention.

The handover required message can further contain a list of EPS bearer information. The EPS bearer information contains an EPS bearer identifier and Qos information of the EPS bearer.

This message further contains identification information indicating an MME to which the target eNB is connected. The identification information can be an identifier of a tracked area or an identifier of the MME.

The NG-RAN informs the AMF of the handover type. The handover type includes a handover in NR, a handover from NR to LTE, a handover from NR to UTRAN and a handover from NR to GERAN and/or GSM. For the handover from NR to LTE, the NG-RAN informs the AMF whether the target base station for the handover is a base station connected to a 5G core network or whether this handover is a handover between different systems. An LTE eNB may support an interface to the 5GC, or may not support an interface to the 5GC. If the target base station is also connected to the 5GC, the handover is a handover in the 5G system. If the target base station is connected to the EPC but not connected to the 5GC, the handover is a handover between different systems. The NG-RAN can contain, in the handover required message, information about an inter-system handover or information indicating that there is no interface between the target base station and the 5GC, so as to inform the AMF that this handover is a handover between different systems. If an identifier of an eNB connected to the 5GC and an identifier of an eNB not connected to the 5GC are different in length, the 5GC can determine, according to the length of the identifier of the target base station contained in the received handover required message, whether the handover is a handover between different systems. If the identification information of the MME connected to the target base station and the identifier of the AMF node are defined differently (for example, different in length), the 5GC can determine, according to the length of the identifier of the core network connected to the target base station contained in the received handover required message, whether the handover is a handover between different systems. Or, the NG-RAN directly sets the handover type in the handover required message as a handover from the NR to an eNB connected to the EPC or a handover from the NR to an eNB connected to the 5GC, to inform the AMF of the handover type. The handover type indicates the core network to which the target eNB is connected is an EPC or a 5GC. If the core network is a 5GC, the handover is an intra-system handover. If the core network is an EPC, the handover is a handover between different systems.

Step 403a: The AMF transmits a Session Management (SM) context request message to an SMF. According to the received information in the handover required message, the AMF knows that the handover is a handover between different systems, and the AMF requests the SMF to provide an SM context. The AMF can further request for an EPS bearer context. The AMF transmits this message to each SMF serving the UE.

Step 403b: The SMF transmits an SM context response message to the AMF. This message contains the SM context of the UE. The SM context further contains the mapped EPS bearer context, for example, the EPS bearer identifier and/or EPS Qos information. When the AMF requests for the SM context, the SMF also always feeds back the mapped EPS bearer context to the AMF if there is mapped EPS bearer context. Or, if the AMF also requests for the mapped EPS bearer context when it requests for the SM context to the SMF, the SMF transmits the mapped EPS bearer context to the SMF. According to the information, which is received from the source NG-RAN, indicating that there is no connection between the target eNB and the 5G core network or indicating that the handover is a handover between different systems or a handover from the NR to an eNB connected to the EPC, the AMF knows that the handover is a handover between different systems, and the AMF requests the SMF to provide the mapped EPS bearer context information.

In this method of the present invention, steps 403a and 403b may not be executed. The AMF acquires, from the handover required message received from the NG-RAN, EPS bearer information in the PDU session, for example, the EPS bearer identifier and EPS Qos information, so that the AMF can constitute a relocation request message in step 404.

In this method of the present invention, steps 403a and 403b may not be executed. The AMF acquires, from the handover required message received from the NG-RAN, EPS bearer information in the PDU session, for example, the EPS bearer identifier and EPS Qos information, so that the AMF can constitute a relocation request message in step 404.

Step 404: The AMF transmits a relocation request message to an MME. According to the identification information indicating the MME connected to the target eNB contained in the handover required message, the AMF selects and finds an MME. The identification information of the MME connected to the target eNB can be a TAI. This message contains the identifier of the target eNB, a source-to-target transparent transmitter and mapped EPS UE context information. The mapped EPS UE context information contains UE Mobility Management (MM) context information and Session Management (SM) context information.

The AMF or the MME decides whether the data forwarding is possible. Here, the data forwarding refers to indirect data forwarding. If the AMF decides that the indirect data forwarding is impossible, the AMF informs the MME of the information.

The AMF informs the MME of the information of the Qos flow(s) contained in the PDU session.

Step 405: The MME transmits a session establishment request message to an SGW. This message contains the EPS bearer context information.

Step 406: The SGW transmits a session establishment response message to the MME. This message contains tunnel information for uplink data transmission over an S1 interface allocated by the SGW.

Step 407: The MME transmits a handover request message to the E-UTRAN. This message contains a source-to-target transparent transmitter and an E-EAB context. The E-RAB context contains an E-RAB to be established and uplink tunnel information over the S1 interface allocated by the SGW. The E-RAB context contains information indicating whether the data forwarding is possible. This message contains the handover type. The specific content is the same as that in step 402 and will not be repeated here.

Step 408: The E-UTRAN transmits a handover request acknowledgement message to the MME. This message contains a list of established E-RABs, a list of unsuccessfully established E-RABs and a target-to-source transparent transmitter. For the established RABs, this message further contains tunnel information for downlink data transmission over the S1 interface. For the established E-RABs, if the source base station gives a proposal of downlink data forwarding, the data forwarding is possible and the target eNB accepts the downlink data forwarding proposal, the target base station contains the tunnel information which is allocated, by the E-UTRAN to each E-RAB requiring downlink data forwarding, for data forwarding over the S1 interface.

Step 409: The MME requests the SGW to establish an indirect data forwarding tunnel. This step is executed only when the indirect data forwarding is to be executed. Upon receiving, from the E-UTRAN, the downlink tunnel information for data forwarding over the S1 interface, the MME requests the SGW to establish an indirect data forwarding tunnel. The MME transmits, to the SGW, the address of a transport layer for data forwarding and a TED allocated by the eNB. The address of the transport layer and the TEID correspond to each E-RAB.

The SGW transmits an indirect data forwarding tunnel establishment response message to the MME. This message contains the information for data forwarding between the SGW and the UPF allocated by the SGW. The information for data forwarding between the SGW and the UPF contains a PDU session identifier and/or E-RAB information contained in the PDU session. The E-RAB information contains an E-RAB identifier and the tunnel information used by the E-RAB for data forwarding. The tunnel information contains the address of a transport layer and a TEID allocated by the SGW. The SGW allocates downlink data forwarding tunnel information to an E-RAB requiring downlink data forwarding. The SGW allocates uplink data forwarding tunnel information to an E-RAB requiring uplink data forwarding. The data forwarding tunnel information contained in the E-RAB information can contain uplink and/or downlink data forwarding tunnel information.

There are two methods for performing data forwarding between the UPF and the SGW.

A way for data transmission between the UPF and the SGW is that each EPS in each PDU session bears one tunnel. If the NG-RAN and the UPF perform data forwarding in such a way that each PDU session corresponds to one user plane tunnel, the UPF transmits, to the SGW and through a tunnel corresponding to an EPS bearer of each Qos flow, data of multiple Qos flows belonging to a same PDU session received from the NG-RAN, that is, the UPF performs a mapping from one tunnel to multiple tunnels. The UPF performs, according to the correspondence between a Qos flow in the PDU session and an EPS bearer or an E-RAB, a mapping from one tunnel to multiple tunnels. In this forwarding method, the SGW allocates, to each EPS bearer requiring data forwarding in each PDU session, a tunnel information used for data forwarding between the SGW and the UPF. For each PDU session, the number of data forwarding tunnels is equal to the number of EPS bearers. The UPF knows, according to the information received from the SMF in step 412, the number of EPS bearers requiring data forwarding in each PDU session in the EPS, the mapping between a Qos flow and an EPS bearer and/or the EPS bearer identifier. The UPF knows information of the Qos flow(s) of the PDU session contained in the 5G system.

The step 409 is executed when the indirect data forwarding is possible.

Step 410: The MME transmits a relocation response message to the AMF. This message contains the tunnel information allocated by the SGW for data forwarding. The tunnel information is specific to each EPS bearer in each PDU session. This message contains a target-to-source transparent transmitter. The MME transmits, to the AMF, the E-RAB information contained in the PDU session and the tunnel information for data forwarding allocated by the SGW to each E-RAB.

This message contains the information for data forwarding between the SGW and the UPF allocated by the SGW. The information for data forwarding between the SGW and the UPF contains a PDU session identifier and/or E-RAB information contained in the PDU session. The E-RAB information contains an E-RAB identifier and the tunnel information used by the E-RAB for data forwarding. The information for data forwarding between the SGW and the UPF contains the tunnel information for data forwarding allocated to each E-RAB of each PDU session by the SGW. The tunnel information for data forwarding can contain uplink and/or downlink data forwarding tunnel information.

The MME directly transmits the E-RAB information to the AMF, and the E-RAB information is transferred by the AMF.

Step 411: The AMF requests the SMF to create a data forwarding tunnel. The AMF transmits a indirect data forwarding tunnel establishment request message to the SMF. This message contains PDU session information. The PDU session information contains the PDU session identifier, information of the Qos flow(s) contained in the PDU session, the number of EPS bearers requiring data forwarding in each PDU session in the EPS, the mapping between a Qos flow and an EPS bearer, the EPS bearer identifier and/or Qos information of each EPS bearer. This message contains the information for data forwarding received from the MME.

Step 412: The SMF transmits an N4 session modification message to the UPF. This message contains PDU session information. The PDU session information contains the PDU session identifier, information of the Qos flow(s) contained in the PDU session, the number of EPS bearers requiring data forwarding in each PDU session in the EPS, the mapping between a Qos flow and an EPS bearer, the EPS bearer identifier and/or Qos information of each EPS bearer. This message contains the information for data forwarding received from the AMF.

The N4 session modification message contains EPS bearer information contained in the PDU session. The EPS bearer information contains an EPS bearer identifier and tunnel information used by each EPS bearer for data forwarding. The SMF informs the UPF of the correspondence between a Qos flow and an EPS bearer in the PDU session. The UPF knows the Qos flow information of the PDU session in the 5G system, and the UPF receives, from the SMF, the EPS bearer information contained in the PDU session and the mapping between a Qos flow and an EPS bearer.

The UPF allocates tunnel information for data forwarding between the NG-RAN and the UPF and then transmits the tunnel information to the SMF.

A way for data forwarding between the NG-RAN and the UPF is as follows.

The NG-RAN and the UPF perform data forwarding in such a way that each PDU session corresponds to one user plane tunnel. In this data forwarding method, the UPF allocates tunnel information for each PDU session. The tunnel information contains the address of a transport layer and a TEID.

The UPF transmits the allocated tunnel information for data forwarding to the SMF. The SMF receives an N4 session modification response message from the UPF. This message contains the tunnel information for data forwarding between the NG-RAN and the UPF allocated by the UPF.

Step 413: The SMF transmits a indirect data forwarding tunnel establishment response message to the AMF. This message contains the tunnel information for data forwarding between the NG-RAN and the UPF allocated by the UPF.

Step 414: The AMF transmits a handover command message to the NG-RAN. This message contains a target-to-source transparent transmitter and the tunnel information for data forwarding allocated by the UPF. This message further contains information about established PDU sessions and information about unsuccessfully established PDU sessions. The information about established PDU sessions contains information about established Qos flows and information about unsuccessfully established Qos flows. The tunnel information for data forwarding is specific to each PDU session.

Step 415: The NG-RAN transmits a handover command message to the UE.

The NG-RAN forwards data to the UPF. For a PDU session requiring data forwarding and on a corresponding tunnel, the NG-RAN forwards data to the UPF.

The NG-RAN transmits, on a user plane tunnel allocated for the PDU session, data of each Qos flow to the UPF. For the downlink data, the NG-RAN transmits, on a tunnel allocated for downlink data forwarding, a downlink data packet to the UPF.

The UPF forwards data to the SGW. The UPF directly forwards the data received from the NG-RAN to the SGW through a user plane tunnel allocated for the corresponding EPS bearer. The SGW directly forwards the data to the target base station. The UPF forwards, according to the mapping between a Qos flow and an EPS bearer and through the user plane tunnel allocated for the corresponding EPS bearer, data of different Qos flows in the PDU session to the SGW. According to the mapping between a Qos flow and an EPS bearer and the information about the EPS bearer accepting the data forwarding, the UPF knows a Qos flow accepting the data forwarding, and the UPF forwards, to the SGW and through the user plane tunnel allocated for the corresponding EPS bearer, the data of the Qos flow that accepts the data forwarding. Correspondingly, if there is no Qos flow accepting the data forwarding and there is no corresponding data forwarding tunnel, the UPF discards the data. The SGW directly forwards data to the target base station.

The SGW forwards data to the E-UTRAN. The SGW transmits, to the E-UTRAN and through the corresponding tunnel allocated by the E-UTRAN, the data received from the UPF by the tunnel corresponding to each EPS bearer, that is, the UPF performs a mapping from multiple tunnels to one tunnel. The SGW forwards data to the E-UTRAN according to the session transmission method in the EPS.

During the PDU session establishment or GBR Qos flow establishment process, the UE receives, from the network, mapped EPS Qos information and/or EPS bearer identification information mapped by a Qos flow. The UE correlates an ongoing Qos flow with the EPS bearer identifier contained in the handover command message. For a Qos flow without the corresponding EPS bearer, the UE can delete this Qos flow.

Step 416: The UE transmits a handover completion message to the E-UTRAN.

Step 417: The E-UTRAN transmits a handover completion message to the MME. This message contains the tunnel information allocated by the E-UTRAN for downlink data transmission.

Step 418: The MME transmits a bearer modification request message to the SGW. This message contains the tunnel information for downlink data transmission over the S1 interface.

Step 419: The SGW transmits a bearer modification request message to the SMF. The SMF can further have a function of a PGW control plane. The SGW allocates tunnel information for downlink data transmission between the SGW and the UPF, and the tunnel information corresponds to each EPS bearer or each PDU session.

Step 420: The SMF requests the UPF to perform session modification. The SMF can further have a function of a PGW control plane. The SMF transmits, to the UPF, the tunnel information for downlink data transmission between the SGW and the UPF allocated by the SGW, and the tunnel information corresponds to each EPS bearer or each PDU session. The UPF transmits a session modification response to the SMF. The UPF allocates tunnel information for uplink data transmission between the SGW and the UPF, and the UPF transmits, to the SMF, the tunnel information for uplink data transmission.

Step 421: The SMF transmits a bearer modification response message to the SGW. This message contains the tunnel information for uplink data transmission between the SGW and the UPF allocated by the UPF.

Step 422: The SGW transmits a bearer modification response message to the MME.

So far, the process of supporting the data forwarding during the handover between different systems can be well supported by using the information obtained from intra-5GS handover procedure in the present invention. By this method, the handover problem from the 5GS to the EPS can be solved, so that the loss of data is avoided and the continuity of services is ensured.

Figure 5:
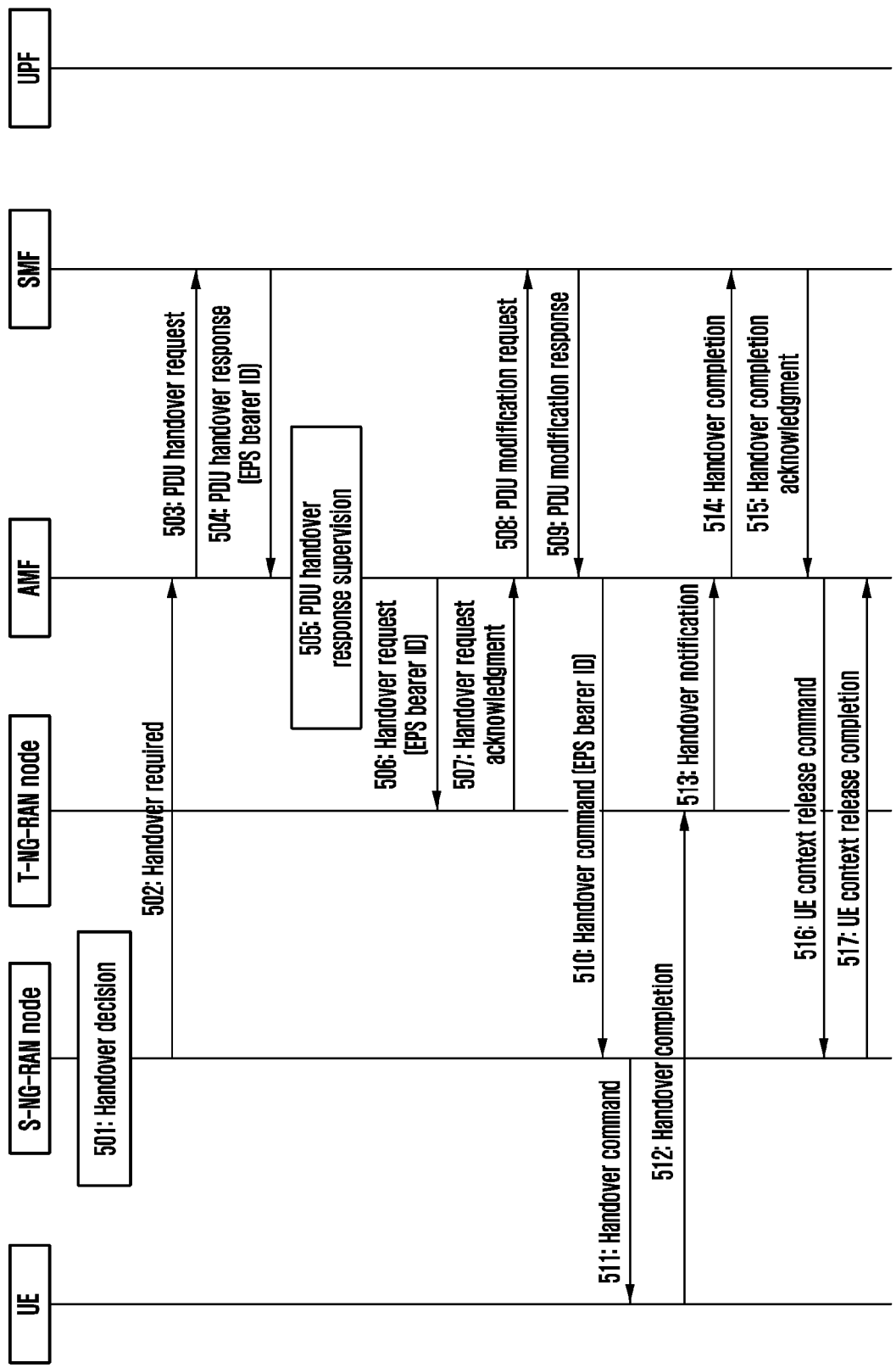
FIG. 5 is a schematic flowchart of the access of a UE to an NG-RAN base station through an NG handover.

As shown in FIG. 5, the method is used to support a handover when a UE accesses to an NG-RAN node through an NG handover process and the NG-RAN node needs to initiate a handover of the UE to an EPS. Here, the NG-RAN node can be a gNB or an eNB connected to the 5GC (also called an ng-eNB). This method comprises the following steps.

Step 501: A source NG-RAN node (S-NG-RAN node) decides to initiate a handover of a UE.

Step 502: The S-NG-RAN node transmits a handover required message to an AMF.

The UE has one or more ongoing PDU sessions. Each PDU session contains one or more Qos flows. During a PDU session establishment or Guaranteed Business Rate (GBR) Qos flow establishment process, mapped EPS Qos information and/or an EPS bearer identifier is allocated to a Qos flow. A Non-GBR Qos flow is mapped to a default EPS bearer. A GBR Qos flow is mapped to a dedicated EPS bearer. EPS Qos information mapped by a Qos flow can be allocated by a PCC or an SMF. The EPS bearer identifier corresponding to a QoS flow can be allocated by an SMF, an AMF or a UE. In order to support the handover between different systems, an SMF can have functions of a PGW control plane. In a PCC deployment scenario, a Policy Control Function (PCF) provides the SMF with mapped EPS Qos of a Qos flow. In order to support the handover between different systems, the PCF can have a Policy Control and Charging Rules Function (PCRF). The SMF transmits, through the AMF and to the UE, the mapped EPS Qos information and/or an EPS bearer identifier of a Qos flow. For example, the SMF transmits the information to the UE through a non-access stratum message PDU session establishment message. During the PDU session establishment or GBR Qos flow establishment process, the SMF can further transmit, through the AMF and to an NG-RAN, the mapped EPS Qos information and/or an E-RAB identifier of a Qos flow. The AMF transmits the mapped EPS Qos information and/or an E-RAB identifier of an Qos flow to the NG-RAN through an initial context establishment request message or a PDU session resource establishment request message. The NG-RAN can transmit the mapped EPS Qos information and/or an E-RAB identifier of a Qos flow to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

Step 503: The AMF transmits a PDU handover request message to an SMF. This message is specific to each PDU session on which an NG handover is required to be performed. This message contains a PDU session identifier and a target identifier.

Step 504: The SMF transmits a PDU handover response message to the AMF. This message contains a PDU session identifier and information of Session Management (SM) over an NG-C interface. The SMF selects an UPF having an interface to a target gNB. This message contains a mapped EPS bearer identifier and/or EPS Qos information of a Qos flow in the PDU session.

Step 505: The AMF detects the PDU handover response message from each SMF. When the AMF receives all PDU handover responses or the maximum waiting time arrives, the handover process will be continuously executed.

Step 506: The AMF transmits a handover request message to a target NG-RAN node (T-NG-RAN node). This message contains a source-to-target transparent transmitter. This message contains a mapped EPS bearer identifier and/or EPS Qos information of a Qos flow in the PDU session. The handover request further contains PDU session information to be established. The PDU session information to be established contains a PDU session identifier. In this method of the present invention, the EPS bearer identifier can be allocated by the SMF, the AMF or the UE. If the EPS bearer identifier is allocated by the SMF, the EPS bearer identifier is contained in both steps 504 and 506. If the EPS bearer identifier is allocated by the UE, during the PDU session establishment process, the SMF acquires, through the AMF and from the UE, the EPS bearer identifier mapped by a Qos flow, and the SMF transmits the EPS bearer identifier to the target NG-RAN node in steps 504 and 506. If the EPS bearer identifier is allocated by the AMF, the AMF transmits the EPS bearer identifier to the target NG-RAN node in step 506. Or, during the PDU session establishment process, the AMF transmits the allocated EPS bearer identifier mapped by a Qos flow to the SMF; and during the handover process, the SMF transmits the EPS bearer identifier to the target NG-RAN node in steps 504 and 506.

When the target NG-RAN node needs to initiate a handover of the UE to an EPS system, the target NG-RAN node uses the received EPS bearer identifier and/or EPS Qos information mapped by a Qos flow in the PDU session so that the data forwarding during the handover between different systems can be supported. The specific process is as described in the embodiment shown in FIG. 4.

Step 507: The T-NG-RAN node transmits a handover request acknowledgement message to the AMF. This message contains the data forwarding tunnel information allocated by the target base station. This message contains a target-to-source transparent transmitter. This message contains a list of unsuccessfully established PDU sessions.

Step 508: The AMF transmits a PDU modification request message to the SMF. This message contains the indirect data forwarding tunnel information allocated by the T-NG-RAN node. The AMF can transmit, through the PDU modification request message, the indirect data forwarding tunnel information allocated by the T-NG-RAN node and then request to allocate tunnel information used for data forwarding from the S-NG-RAN node to the UPF, or the AMF can transmit, through another individual message, the indirect data forwarding tunnel information allocated by the T-NG-RAN node and then request to allocate tunnel information used for data forwarding from the S-NG-RAN node to the UPF.

Step 509: The SW' transmits a PDU modification response message to the AMF.

Step 510: The AMF transmits a handover command message to the S-NG-RAN node. This message contains a target-to-source transparent transmitter. For the indirect data forwarding, the AMF transmits, to the source base station, the data forwarding tunnel information allocated by the UPF. If the UPF changes during a handover process, the AMF transmits, to the source base station, the data forwarding tunnel information allocated by the source UPF.

Step 511: The S-NG-RAN node transmits a handover command message to the UE. The UE is synchronized to the target base station.

Step 512: The UE transmits a handover completion message to the T-NG-RAN node.

Step 513: The T-NG-RAN node transmits a handover notification message to the AMF.

Step 514: The AMF transmits a handover completion message to the SMF. This message contains the PDU session identifier. This message is specific to each PDU session.

Step 515: The SMF transmits a handover completion acknowledgement message to the AMF. The SMF needs to inform the selected UPF of information indicating that the downlink user plane tunnel is handed over to the T-NG-RAN node, i.e., the downlink tunnel information allocated by the T-NG-RAN node.

Step 516: The AMF transmits a UE context release command message to the S-NG-RAN node.

Step 517: The S-NG-RAN node transmits a UE context release completion message to the AMF.

So far, the third method for supporting handover according to the present invention has been described. By this method, the data forwarding can be well supported when a UE accesses to an NG-RAN node through a handover and when the NG-RAN node needs to initiate a handover of the UE from a 5GS to an EPS, so that the loss of data is avoided, the delay of the data forwarding is reduced and the continuity of services is ensured.

Figure 6:
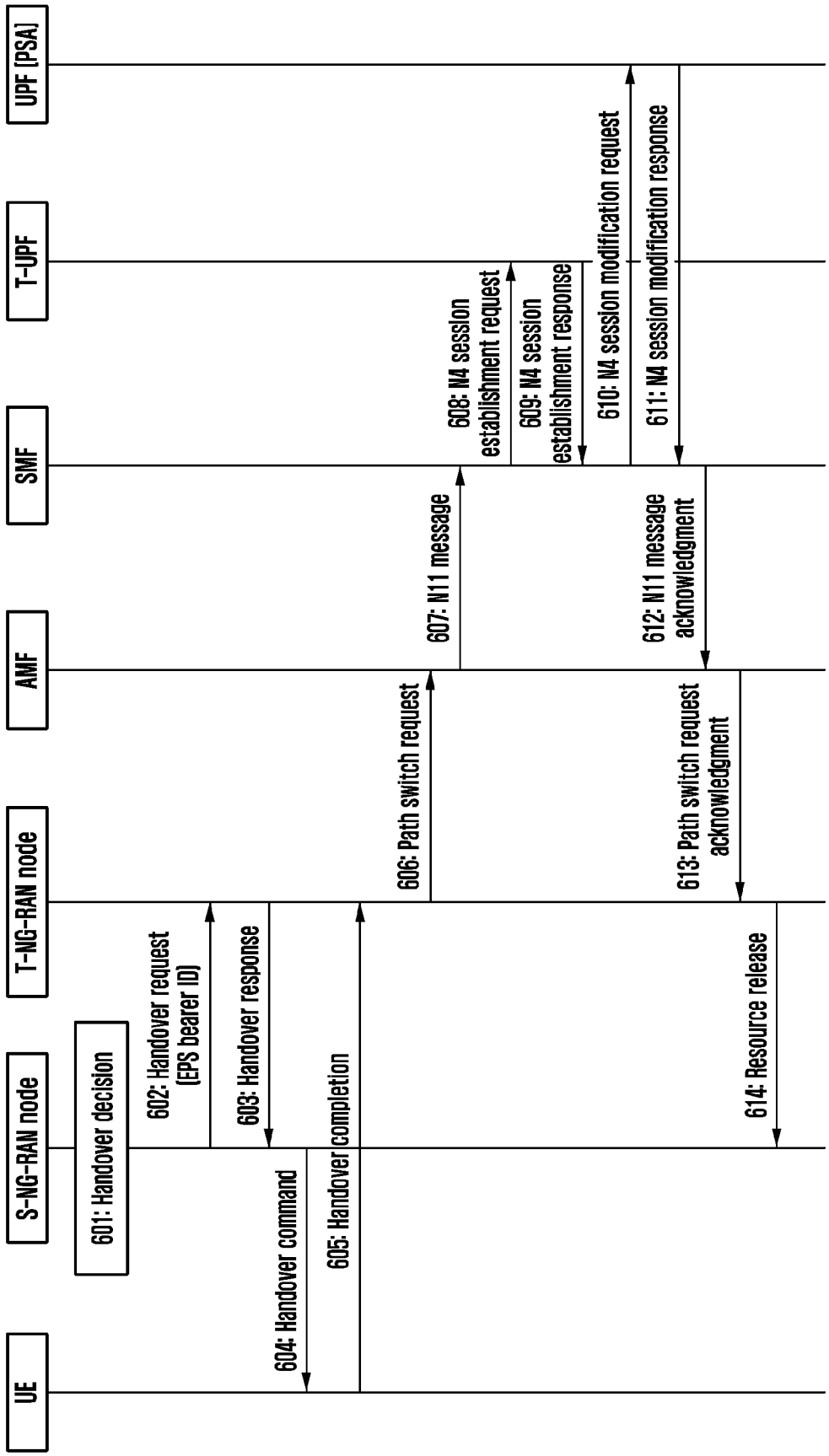
FIG. 6 is a schematic flowchart of the access of a UE to an NG-RAN base station through an Xn handover.

As shown in FIG. 6, the method is used by an NG-RAN node to acquire the information for inter-system handover in order to support the scenario when a UE accesses to an NG-RAN node through an Xn handover procedure and the NG-RAN node needs to initiate a handover of the UE to an EPS. Here, the NG-RAN node can be a gNB or an eNB connected to the 5GC (also called an ng-eNB). This method comprises the following steps.

Step 601: A source NG-RAN node (S-NG-RAN node) decides to initiate a handover of a UE.

Step 602: The S-NG-RAN node transmits a handover request message to a target NG-RAN node (T-NG-RAN node).

The UE has one or more ongoing PDU sessions. Each PDU session contains one or more Qos flows. During a PDU session establishment or Guaranteed Business Rate (GBR) Qos flow establishment process, mapped EPS Qos information and/or an EPS bearer identifier is allocated to a Qos flow. A Non-GBR Qos flow is mapped to a default EPS bearer. A GBR Qos flow is mapped to a dedicated EPS bearer. EPS Qos information mapped by a Qos flow can be allocated by a PCC or an SMF. The EPS bearer identifier corresponding to a QoS flow can be allocated by an SMF, an AMF or a UE. In order to support the handover between different systems, an SMF can have functions of a PGW control plane. In a PCC deployment scenario, a Policy Control Function (PCF) provides the SMF with mapped EPS Qos of a Qos flow. In order to support the handover between different systems, the PCF can have a Policy Control and Charging Rules Function (PCRF). The SMF transmits, through the AMF and to the UE, the mapped EPS Qos information and/or an EPS bearer identifier of a Qos flow. For example, the SMF transmits the information to the UE through a non-access stratum message PDU session establishment message. During the PDU session establishment or GBR Qos flow establishment process, the SMF can further transmit, through the AMF and to an NG-RAN, the mapped EPS Qos information and/or an E-RAB identifier of a Qos flow. The AMF transmits the mapped EPS Qos information and/or an E-RAB identifier of a Qos flow to the NG-RAN through an initial context establishment request message or a PDU session resource establishment request message. The NG-RAN can transmit the mapped EPS Qos information and/or an E-RAB identifier of a Qos flow to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

The handover request further contains PDU session information to be established. The PDU session information to be established contains a PDU session identifier and information of a Qos flow or Qos flows in the PDU session. The handover request message contains the EPS bearer identifier and/or EPS Qos information mapped by a Qos flow in the PDU session.

When the target NG-RAN node needs to initiate a handover of the UE to an EPS system, the target NG-RAN node uses the received EPS bearer identifier and/or EPS Qos information mapped by a Qos flow in the PDU session so that the data forwarding during the handover between different systems can be supported. The specific process is as described in the embodiment shown in FIG. 4.

Step 603: The T-NG-RAN node transmits a handover response message to the S-NG-RAN node.

Step 604: The S-NG-RAN node transmits a handover command message to the UE. The UE is synchronized to the target base station.

Step 605: The UE transmits a handover completion message to the T-NG-RAN node.

Step 606: The T-NG-RAN node transmits a path switch request message to an AMF.

Step 607: The AMF transmits an N11 message to an SMF. This message contains the PDU session identifier. This message is specific to each PDU session. The AMF transmits, through the N11 message, N2 session information received by the path switch request to the SMF.

Step 608: The SMF decides whether to hand over a UPF. For a PDU session to be handed over, the SMF selects a target UPF (T-UPF), and then allocates the IP address of the T-UPF and the uplink/downlink tunnel identifier. The SMF transmits an N4 session establishment request message to the T-UPF. This message contains the address of the target RAN and the uplink/downlink tunnel identifier.

Step 609: The T-UPF transmits an N4 session establishment response message to the SMF.

Step 610: The SMF transmits an N4 session modification message to a PDU Session Anchor (PSA).

Step 611: The PSA transmits an N4 session modification response message to the SMF. The PSA begins to transmit a downlink data packet to the target RAN through the T-UPF.

Step 612: The SMF transmits an N11 acknowledgement message to the AMF. This message contains the tunnel information allocated by the core network.

Step 613: The AMF transmits a path switch request acknowledgement message to the T-NG-RAN node. Once the AMF has received the N11 downlink responses from all SMFs, the AMF transmits the collected core network tunnel information to the T-NG-RAN node.

Step 614: The T-NG-RAN node transmits a resource release message to the S-NG-RAN node.

So far, the fourth method for supporting handover according to the present invention has been described. By this method, the data forwarding can be well supported when a UE accesses to an NG-RAN node through a handover and when the NG-RAN node needs to initiate a handover of the UE from a 5GS to an EPS, so that the loss of data is avoided, the delay of the data forwarding is reduced and the continuity of services is ensured.

Figure 7:
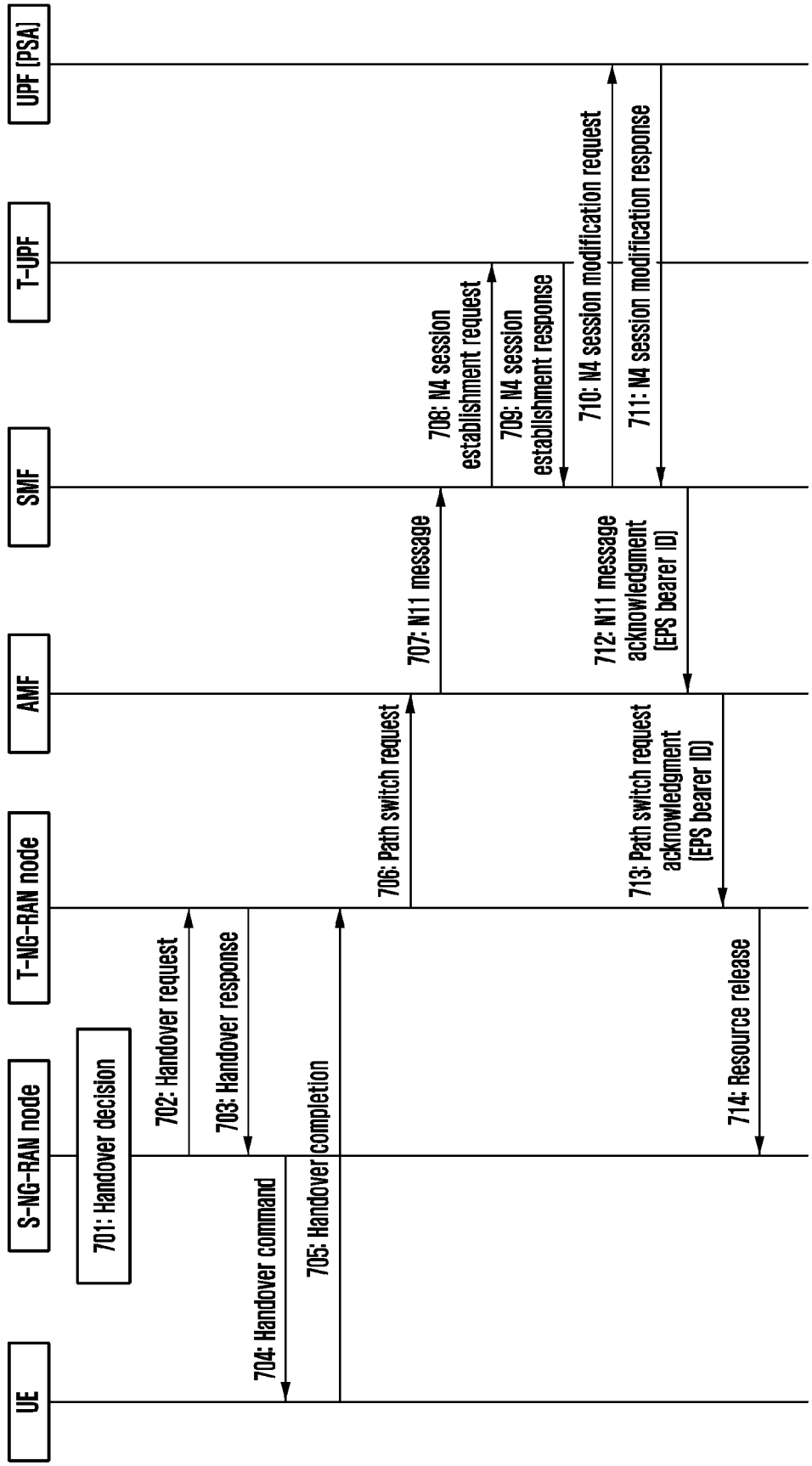
FIG. 7 is a schematic flowchart of the access of a UE to an NG-RAN base station through an Xn handover.

As shown in FIG. 7, the method is used by an NG-RAN node to acquire the information for inter-system handover in order to support the scenario when a UE accesses to an NG-RAN node through an Xn handover procedure and the NG-RAN node needs to initiate a handover of the UE from a 5GS to an EPS. Here, the NG-RAN node can be a gNB or an eNB connected to the 5GC (also called an ng-eNB). This method comprises the following steps.

Step 701: A source NG-RAN node (S-NG-RAN node) decides to initiate a handover of a UE.

Step 702: The S-NG-RAN node transmits a handover request message to a target NG-RAN node (T-NG-RAN node).

The UE has one or more ongoing PDU sessions. Each PDU session contains one or more Qos flows. During a PDU session establishment or Guaranteed Business Rate (GBR) Qos flow establishment process, mapped EPS Qos information and/or an EPS bearer identifier is allocated to a Qos flow. A Non-GBR Qos flow is mapped to a default EPS bearer. A GBR Qos flow is mapped to a dedicated EPS bearer. EPS Qos information mapped by a Qos flow can be allocated by a PCC or an SMF. The EPS bearer identifier corresponding to a QoS flow can be allocated by an SMF, an AMF or a UE. In order to support the handover between different systems, an SMF can have functions of a PGW control plane. In a PCC deployment scenario, a Policy Control Function (PCF) provides the SMF with mapped EPS Qos of a Qos flow. In order to support the handover between different systems, the PCF can have a Policy Control and Charging Rules Function (PCRF). The SMF transmits, through the AMF and to the UE, the mapped EPS Qos information and/or an EPS bearer identifier of a Qos flow. For example, the SMF transmits the information to the UE through a non-access stratum message PDU session establishment message. During the PDU session establishment or GBR Qos flow establishment process, the SMF can further transmit, through the AMF and to an NG-RAN, the mapped EPS Qos information and/or an E-RAB identifier of a Qos flow. The AMF transmits the mapped EPS Qos information and/or an E-RAB identifier of a Qos flow to the NG-RAN through an initial context establishment request message or a PDU session resource establishment request message. The NG-RAN can transmit the mapped EPS Qos information and/or an E-RAB identifier of a Qos flow to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

The handover request message contains a source-to-target transparent transmitter. The handover request further contains PDU session information to be established. The PDU session information to be established contains a PDU session identifier.

703: The T-NG-RAN node transmits a handover response message to the S-NG-RAN node.

Step 704: The S-NG-RAN node transmits a handover command message to the UE. The UE is synchronized to the target base station.

Step 705: The UE transmits a handover completion message to the T-NG-RAN node.

Step 706: The T-NG-RAN node transmits a path switch request message to an AMF.

Step 707: The AMF transmits an N11 message to an SMF. This message contains the PDU session identifier. This message is specific to each PDU session. The AMF transmits, through the N11 message, N2 session information received by the path switch request to the SMF.

Step 708: The SMF decides whether to hand over a UPF. For a PDU session to be handed over, the SMF selects a target UPF (T-UPF), and then allocates the IP address of the T-UPF and the uplink/downlink tunnel identifier. The SMF transmits an N4 session establishment request message to the T-UPF. This message contains the address of the target RAN and the uplink/downlink tunnel identifier.

Step 709: The T-UPF transmits an N4 session establishment response message to the SMF.

Step 710: The SMF transmits an N4 session modification message to a PDU Session Anchor (PSA).

Step 711: The PSA transmits an N4 session modification response message to the SMF. The PSA begins to transmit a downlink data packet to the target RAN through the T-UPF.

Step 712: The SMF transmits an N11 acknowledgement message to the AMF. This message contains the tunnel information allocated by the core network. This message contains the EPS bearer identifier and/or EPS Qos information mapped by a Qos flow in the PDU session.

Step 713: The AMF transmits a path switch request acknowledgement message to the T-NG-RAN node. Once the AMF has received N11 downlink responses from all SMFs, the AMF gathers the received N2 session information and then transmits the gathered N2 session information to the T-NG-RAN node. The N2 session information contains the core network tunnel identifier and the EPS bearer identifier and/or EPS Qos information mapped by a Qos flow in the PDU session. In this method of the present invention, the EPS bearer identifier can be allocated by the SMF, the AMF or the UE. If the EPS bearer identifier is allocated by the SMF, the EPS bearer identifier is contained in both steps 712 and 713. If the EPS bearer identifier is allocated by the UE, during the PDU session establishment process, the SMF acquires, through the AMF and from the UE, the EPS bearer identifier mapped by a Qos flow, and the SMF transmits the EPS bearer identifier to the target NG-RAN node in steps 712 and 713. If the EPS bearer identifier is allocated by the AMF, the AMF transmits the EPS bearer identifier to the target NG-RAN node in step 713. Or, during the PDU session establishment process the AMF transmits the allocated EPS bearer identifier mapped by the Qos flow to the SMF; and during the handover process, the SMF transmits the EPS bearer identifier to the target NG-RAN node in steps 712 and 713.

When the target NG-RAN node needs to initiate a handover of the UE to an EPS system, the target NG-RAN node uses the received EPS bearer identifier and/or EPS Qos information mapped by the Qos flow in the PDU session so that the data forwarding during the handover between different systems can be supported. The specific process is as described in the embodiment shown in FIG. 4.

Step 714: The T-NG-RAN node transmits a resource release message to the T-NG-RAN node.

So far, the fifth method for supporting handover according to the present invention has been described. By this method, the access of a UE to an NG-RAN node through a handover can be solved. When an NG-RAN node needs to initiate a handover from a 5GS to an EPS, the data forwarding can be well supported, so that the loss of data is avoided, the delay of the data forwarding is reduced and the continuity of services is ensured.

Figure 8:
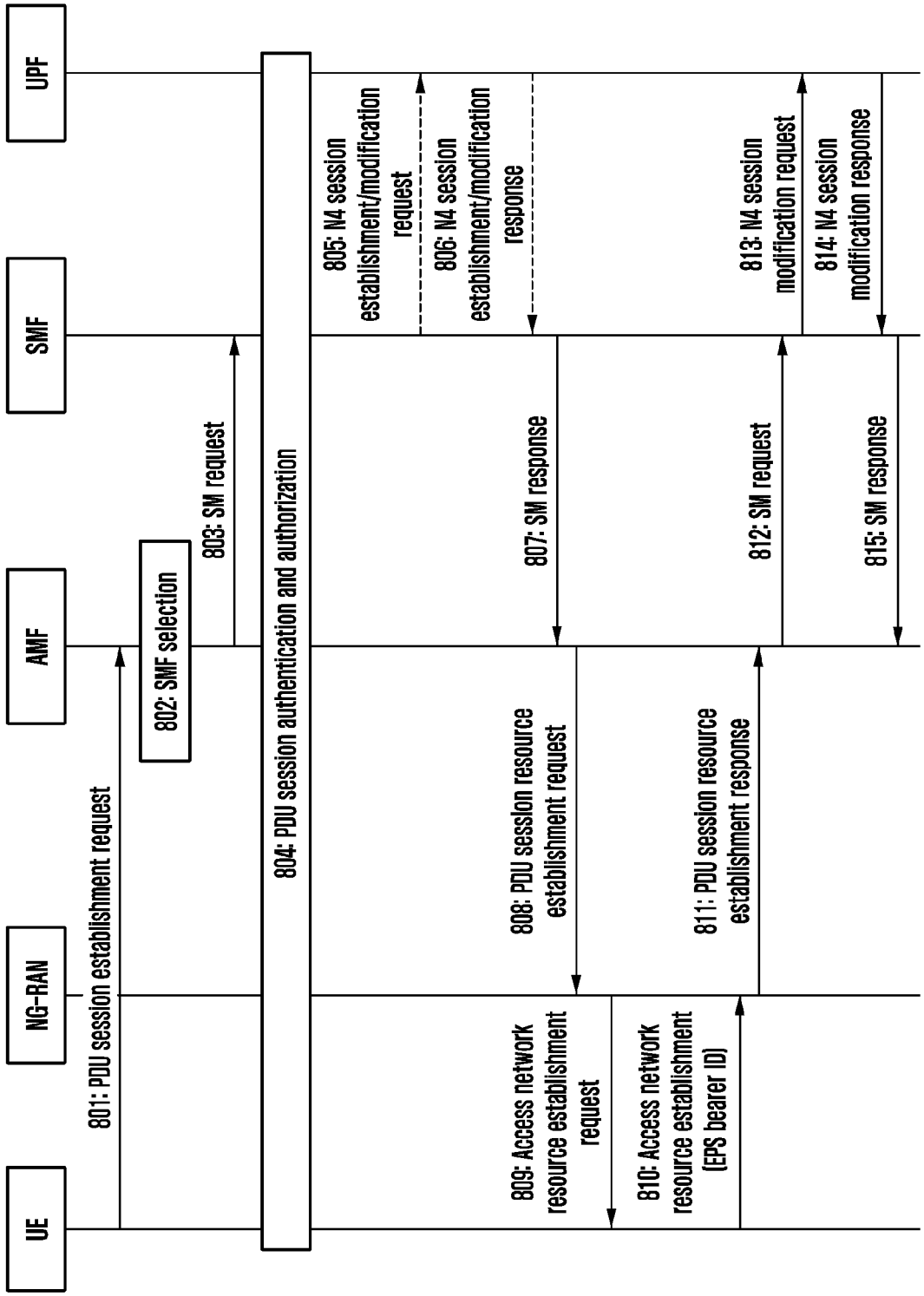
FIG. 8 is a schematic flowchart of a first method for acquiring, by an NG-RAN, an EPS bearer identifier when a UE allocates the EPS bearer identifier corresponding to a Qos flow.

As shown in FIG. 8, the method is used for allocating, by a UE, an EPS bearer identifier corresponding to a Qos flow. When an NG-RAN node needs to initiate a handover of the UE to an EPS system, a method for acquiring information required by a handover between different systems to support the handover is required. Here, the NG-RAN node can be a gNB or an eNB connected to the 5GC (also called an ng-eNB). Here, the detailed description of steps irrelevant to the present invention, for example, the processes and functions related to the Policy Control Function (PCF), the User Data management (UDM) and the Data Network (DN), will be omitted. This method comprises the following steps.

Step 801: A UE transmits a Non-Access Stratum (NAS) message to an AMF to initiate a PDU session establishment process. To establish a new PDU session, the UE generates a PDU session identifier. The NAS message contains the PDU session identifier and N1 Session Management (SM) information. The N1 SM information contains a PDU session establishment request message.

An NG-RAN transmits the received NAS message to the AMF through an NG message. The NG message further contains the location information of a user and the type of the access technology.

Step 802: For a new PDU session to be established, the AMF selects an SMF. The AMF saves the PDU session identifier and the identifier of the SMF.

Step 803: The AMF transmits an SM request message to the SMF. This message contains the N1 SM information received from the UE.

Step 804: The SMG triggers a PDU session authentication and authorization process.

Step 805: If the PDU session establishment request is an initial request and is not executed in step 804, the SMF transmits an N4 session establishment message to the selected UPF. Otherwise, the SMF transmits an N4 session modification request message to the selected UPF.

Step 806: The UPF transmits an N4 session establishment response message or an N4 modification response message to the SMF.

Step 807: The SMF transmits an SM response message to the AMF. This message contains N2 SM information and N1 SM information. The N1 SM information contains an NAS message PDU session establishment acception. The N2 SM information contains the PDU session identifier, Qos profile, core network tunnel information and S-NSSAI. The N2 SM information contains the EPS Qos information mapped by the Qos flow in the PDU session. The N1 SM information contains the EPS Qos information mapped by the Qos flow in the PDU session.

Step 808: The AMF transmits a PDU session resource establishment request message to an NG-RAN. The message contains the N2 SM information and the NAS message PDU session establishment acception. The NG-RAN saves the PDU session information, information of the Qos flow in the DPU session, and/or the EPS Qos information mapped by the Qos flow.

Step 809: The NG-RAN transmits an access network resource establishment request message to the UE. The access network resource establishment request message can be an RRC connection reconfiguration message. The NG-RAN allocates NG interface user plane downlink tunnel information. The message contains the NAS message PDU session establishment acception message. If the NG-RAN can allocate the required resources and the tunnel information of the NG-RAN side, the NG-RAN transmits an NAS message to the UE. The RRC message transmitted to the UE by the NG-RAN or the NAS message contained in the RRC message contains the EPS Qos flow information mapped by the Qos flow.

Step 810: The UE transmits an access network resource establishment message to the NG-RAN. The access network resource establishment message can be an RRC connection reconfiguration completion message. The UE allocates the EPS bearer identifier corresponding to the Qos flow. The UE allocates, according to the Qos of the Qos flow and the mapped EPS Qos information, the EPS bearer identifier corresponding to the Qos flow. This message contains the EPS bearer identifier mapped by a Qos flow. This message can further contain an NAS message PDU session establishment completion message. The NAS message contains the EPS bearer identifier mapped by a Qos flow.

Step 811: The NG-RAN saves the EPS bearer identifier mapped by a Qos flow received from the UE. The NG-RAN transmits a PDU session resource establishment response message to the AMF. This message contains the N2 SM information and the PDU session identifier. The N2 SM information contains the PDU session identifier, RAN tunnel information, the accepted Qos information and/or the rejected Qos flow information. This message or the N2 SM information further contains the EPS bearer identifier mapped by a Qos flow. This message or the N2 SM information further contains the NAS message PDU session establishment completion message.

When the NG-RAN needs to initiate a handover of the UE to an EPS system, the NG-RAN uses the EPS bearer identifier and/or EPS Qos information mapped by a Qos flow in the PDU session so that the data forwarding during the handover between different systems can be supported. The specific process is as described in the embodiment shown in FIG. 4.

Step 812: The AMF transmits an SM request message to the SMF. This message contains the N2 SM information received from the NG-RAN. This message contains the NAS message received from the UE. This message contains the EPS bearer identifier mapped by a Qos flow.

Step 813: If the N4 session of the corresponding PDU session has not been established, the SMF initiates an N4 session establishment process to the UPF. Otherwise, the SMF initiates an N4 session modification process. The SMF transmits the tunnel information allocated by the access network and/or the core network tunnel information to the UPF.

Step 814: The UPF transmits an N4 session modification response message or an N4 session request response message to the SMF.

Step 815: The SMF transmits an SM response message to the AMF.

So far, the sixth method for supporting handover according to the present invention has been described. By this method, the allocation of EPS bearer identifier by the UE can be solved. When an NG-RAN needs to initiate a handover of the UE from the 5GS to the EPS, the data forwarding can be well supported, so that the loss of data is avoided, the delay of data forwarding is reduced and the continuity of services is ensured.

Figure 9:
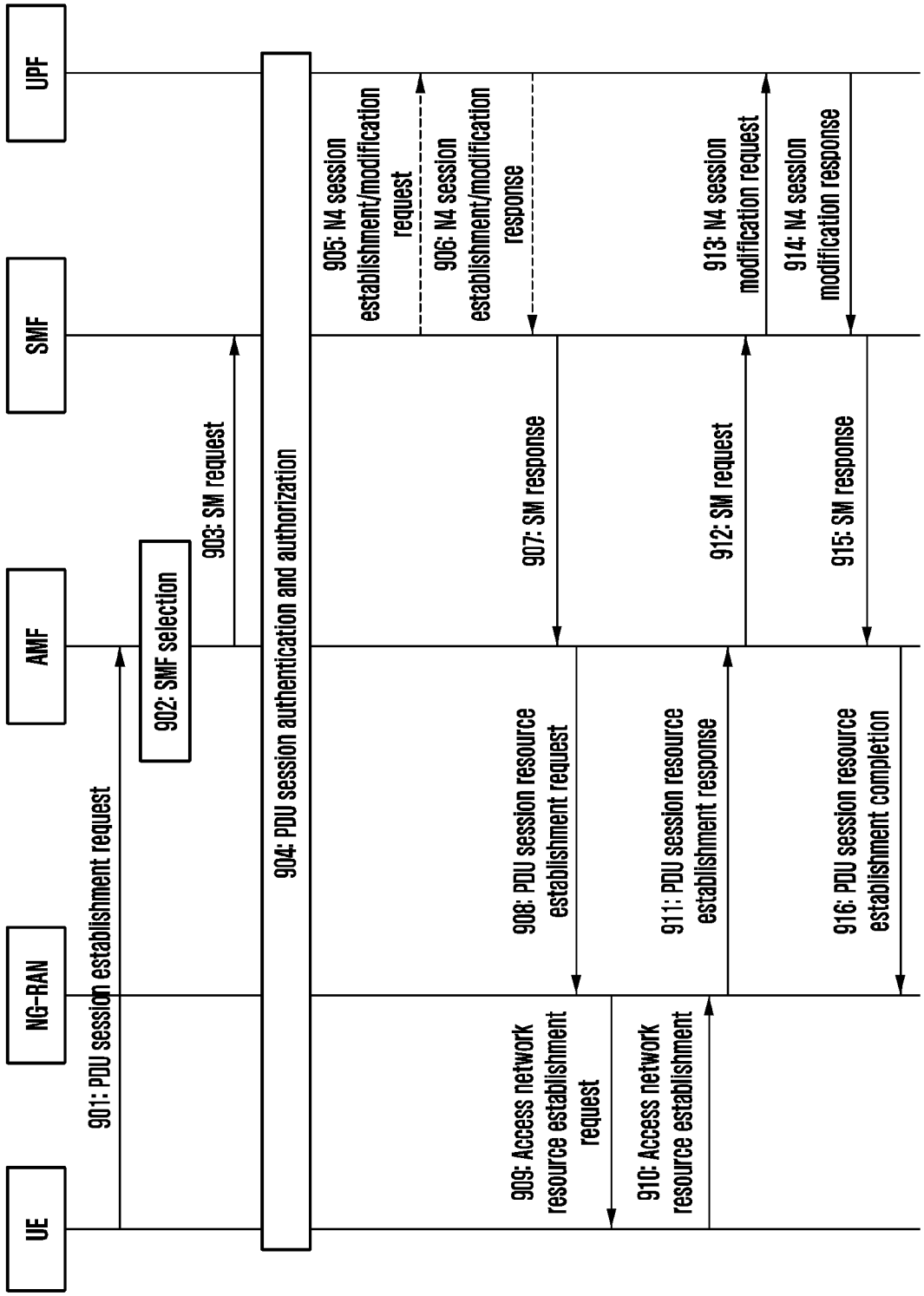
FIG. 9 is a schematic flowchart of a second method for acquiring, by an NG-RAN, an EPS bearer identifier when a UE allocates the EPS bearer identifier corresponding to a Qos flow.

As shown in FIG. 9, the method is used for allocating, by a UE, an EPS bearer identifier corresponding to a Qos flow. When an NG-RAN node needs to initiate a handover of the UE to an EPS system, a method for acquiring information required by a handover between different systems to support the handover is required. Here, the NG-RAN node can be a gNB or an eNB connected to the 5GC (also called an ng-eNB). Here, the detailed description of steps irrelevant to the present invention, for example, the functions related to the Policy Control Function (PCF), the User Data management (UDM) and the Data Network (DN), will be omitted. This method comprises the following steps.

Steps 901 to 909 are the same as steps 801 to 809 and will not be repeated here.

Step 910: The UE transmits an access network resource establishment message to the NG-RAN. The access network resource establishment message can be an RRC connection reconfiguration completion message. The UE allocates the EPS bearer identifier corresponding to the Qos flow. The UE allocates, according to the Qos of the Qos flow and the mapped EPS Qos information, the EPS bearer identifier corresponding to the Qos flow. This message can further contain an NAS message PDU session establishment completion message. The NAS message contains the EPS bearer identifier mapped by a Qos flow.

Step 911: The NG-RAN transmits a PDU session resource establishment response message to the AMF. This message contains the N2 SM information and the PDU session identifier. The N2 SM information contains the PDU session identifier, RAN tunnel information, the accepted Qos information and/or the rejected Qos flow information. This message or the N2 SM information further contains the NAS message PDU session establishment completion message.

Step 912: The AMF transmits an SM request message to the SMF. This message contains the N2 SM information received from the NG-RAN. This message contains the NAS message received from the UE. The NAS message contains the EPS bearer identifier mapped by a Qos flow.

Step 913: If the N4 session of the corresponding PDU session has not been established, the SMF initiates an N4 session establishment process to the UPF. Otherwise, the SMF initiates an N4 session modification process. The SMF transmits the tunnel information allocated by the access network and/or the core network tunnel information to the UPF.

Step 914: The UPF transmits an N4 session modification response message or an N4 session request response message to the SMF.

Step 915: The SMF transmits an SM response message to the AMF. This message contains the N2 SM information. This message contains the EPS bearer identifier mapped by a Qos flow received from the UE. This message can further contain the EPS Qos information mapped by the Qos flow.

Step 916: The AMF transmits a PDU session resource establishment completion message to the NG-RAN. This message contains the EPS bearer identifier mapped by a Qos flow. This message can further contain the EPS Qos information mapped by the Qos flow.

When the NG-RAN needs to initiate a handover of the UE to an EPS system, the NG-RAN uses the EPS bearer identifier and/or EPS Qos information mapped by a Qos flow in the PDU session so that the data forwarding during the handover between different systems can be supported. The specific process is as described in the embodiment shown in FIG. 4.

So far, the seventh method for supporting handover according to the present invention has been described. By this method, the allocation of an EPS bearer identifier by the UE can be solved. When an NG-RAN needs to initiate a handover of the UE from the 5GS to the EPS, the data forwarding can be well supported, so that the loss of data is avoided, the delay of data forwarding is reduced and the continuity of services is ensured.

Figure 10:
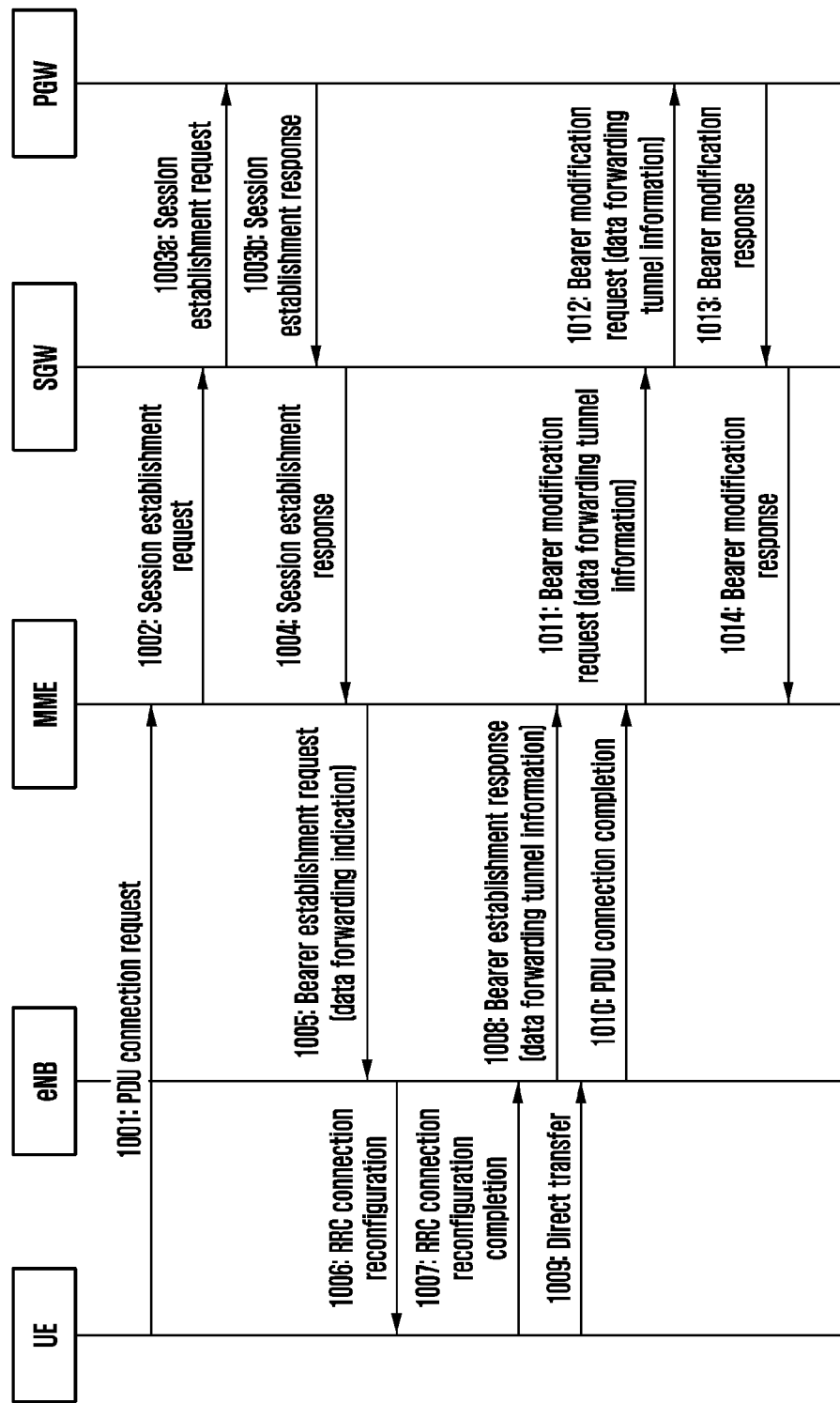
FIG. 10 is a schematic flowchart of a method for transferring a PDU session from a 5G system to an EPS system when a UE is registered in both the 5G system and the EPS system.

As shown in FIG. 10, the method is a method for supporting data forwarding when a PDU session of a UE is to be handed over from the 5GC to the EPC in the case of dual registration. This method comprises the following steps.

Step 1001: A UE transmits a PDU connection request message to an MME. This message contains a handover indication.

Step 1002: The MME receives the PDU connection request message. If the received message contains the handover indication information, the MME uses a PDN GW that is obtained from the subscription data in a location update process in an adhesion process. If the request is an initial request, the MME selects a PDN GW according to the PDN GW selection function (referring to TS23. 401 4.3.8.1). The MME saves the received handover indication.

The MME transmits a session establishment request message to an SGW. This message contains a PDN GW address. This message contains a handover indication.

Step 1003a: The SGW transmits a session establishment request message to a PDN GW (PGW). The SGW transmits this message to the PGW indicated by the PDN GW address received in step 1002. This message contains a handover indication. The SGW saves the received handover indication. If the SGW receives the handover indication from the MME, the SGW contains the handover indication in the session establishment request message to be transmitted to the PGW.

The process with the PCRF is not the focus of the present invention and thus will not be described in detail.

Step 1003b: The PGW transmits a session establishment response message to the SGW. If there is the handover indication, the PGW does not transmit downlink data to the SGW, and instead waits for the downlink path switch in step 1012*a*. If there is the handover indication, the PGW determines, according to the Qos of the service, whether the PDN connection requires data forwarding. The PGW can determine the data forwarding for the PDN connection or whether the data forwarding is required for each EPS bearer in the PDN connection. If the data forwarding is required, the PGW contains a data forwarding indication in the session establishment response message. The data forwarding indication can be specific to the PDU connection or the absence of the EPS bearer.

Step 1004: The SGW transmits a session establishment response message to the MME. If the UE has indicated the handover, the successful establishment of a bearer over an S5/S8 interface can be informed to the MME by this message. If the SGW has received the data forwarding indication from the PGW, the SGW contains this indication in the session establishment response message to be transmitted to the MME.

Step 1005: The MME transmits a bearer establishment request message to an eNB. This message contains the handover indication or the data forwarding indication. If the MME has received the handover indication from the UE and/or the MME has received the data forwarding indication from the SGW, the MME contains the handover indication or the data forwarding indication in the bearer establishment request message. The data forwarding indication can be specific to all E-RABs or specific to each E-RAB. The bearer establishment request message can also be an initial context establishment request message.

Step 1006: The eNB transmits an RRC connection reconfiguration message to the UE.

Step 1007: The UE transmits an RRC connection reconfiguration completion message to the eNB.

Step 1008: The eNB transmits a bearer establishment response message to the MME. If the eNB has received the data forwarding indication information, the eNB allocates tunnel information used for downlink data forwarding to an E-RAB. The tunnel information contains a tunnel identifier and the address of a transport layer. The eNB contains the data forwarding tunnel information in the bearer establishment response message.

Step 1009: The UE transmits a direct transfer message to the eNB. This message contains an NAS message, i.e., a PDN connection completion message.

Step 1010: The eNB transmits the received PDU connection completion message to the MME.

Step 1011: The MME transmits a bearer modification request message to the SGW. This message contains the data forwarding tunnel information received from the eNB. This message contains a handover indication. The SGW allocates the tunnel information for downlink data forwarding. The tunnel information contains a tunnel identifier and an address of a transport layer. The tunnel information is specific to each EPS bearer.

Step 1012: The SGW transmits a bearer modification request message to the PGW. This message contains the data forwarding tunnel information received from the MME or the downlink data forwarding tunnel information allocated by the SGW in step 1011. If this message contains the handover indication, the PGW transmits the data of the corresponding PDN connection to the SGW.

If the PGW has received the data forwarding tunnel information, corresponding to the PDN connection transferred from the 5GC to the EPC, the PGW allocates uplink tunnel information for data forwarding between the NG-RAN and the UPF. In order to support the movement between different systems, the PGW further has a function of an SMF control plane. Or, the PGW informs the UPF of the uplink tunnel information for data forwarding between the NG-RAN and the UPF. The PGW transmits, to the UPF, the EPS bearer identifier mapped by a Qos flow in the PDU session. The PGW transmits, through the AMF and to the NG-RAN, the uplink tunnel information for data forwarding between the NG-RAN and the UPF. The uplink tunnel information for data forwarding between the NG-RAN and the UPF is specific to each PDU session.

If the NG-RAN has received the data forwarding uplink tunnel information, the NG-RAN forwards downlink data to the UPF. The UPF transmits, according to the mapping between the Qos flow in the PDU session and the EPS bearer identifier and through a tunnel for the mapped EPS bearer, data of different Qos flows in the PDU session to the SGW or the PGW. The PGW transmits the received forwarded data to the SGW. The SGW transmits the received forwarded data to the eNB. Or, the PGW directly transmits the received forwarded data to the eNB.

The eNB transmits the forwarded data to the UE, and then transmits other data.

Step 1013: The PGW transmits a bearer modification response message to the SGW.

Step 1014: The SGW transmits the bearer modification response message to the MME. The SGW begins to transmit downlink cached data.

So far, the eighth method for supporting handover according to the present invention has been described. By this method, during the transfer of a PDU session of a dual-connection UE from the 5GC to the EPC, the data forwarding can be well supported, so that the loss of data is avoided, the delay of data forwarding is reduced and the continuity of services is ensured.

The present invention provides a method for supporting handover, comprising the following steps of:

acquiring, by a first base station in a first communication system, Qos flow information corresponding to EPS bearer information through an intra-system handover process;

transmitting, by the first base station, a handover required message to a Mobility Management Entity (MME), wherein the handover required message contains the Qos flow information corresponding to EPS bearer information;

receiving, by the first base station, a handover command message carrying data forwarding tunnel information transmitted by the MME; and performing, by the first base station, data forwarding according to the received data forwarding tunnel information.

The Qos flow information corresponding to EPS bearer information acquired by the first base station contains Qos and/or a Qos flow identifier.

the handover required message contains the PDU session identifier and a downlink data forwarding proposal for the PDU session. The first communication system is an LTE communication system.

The method will be further described by the following specific embodiments.

Figure 11:
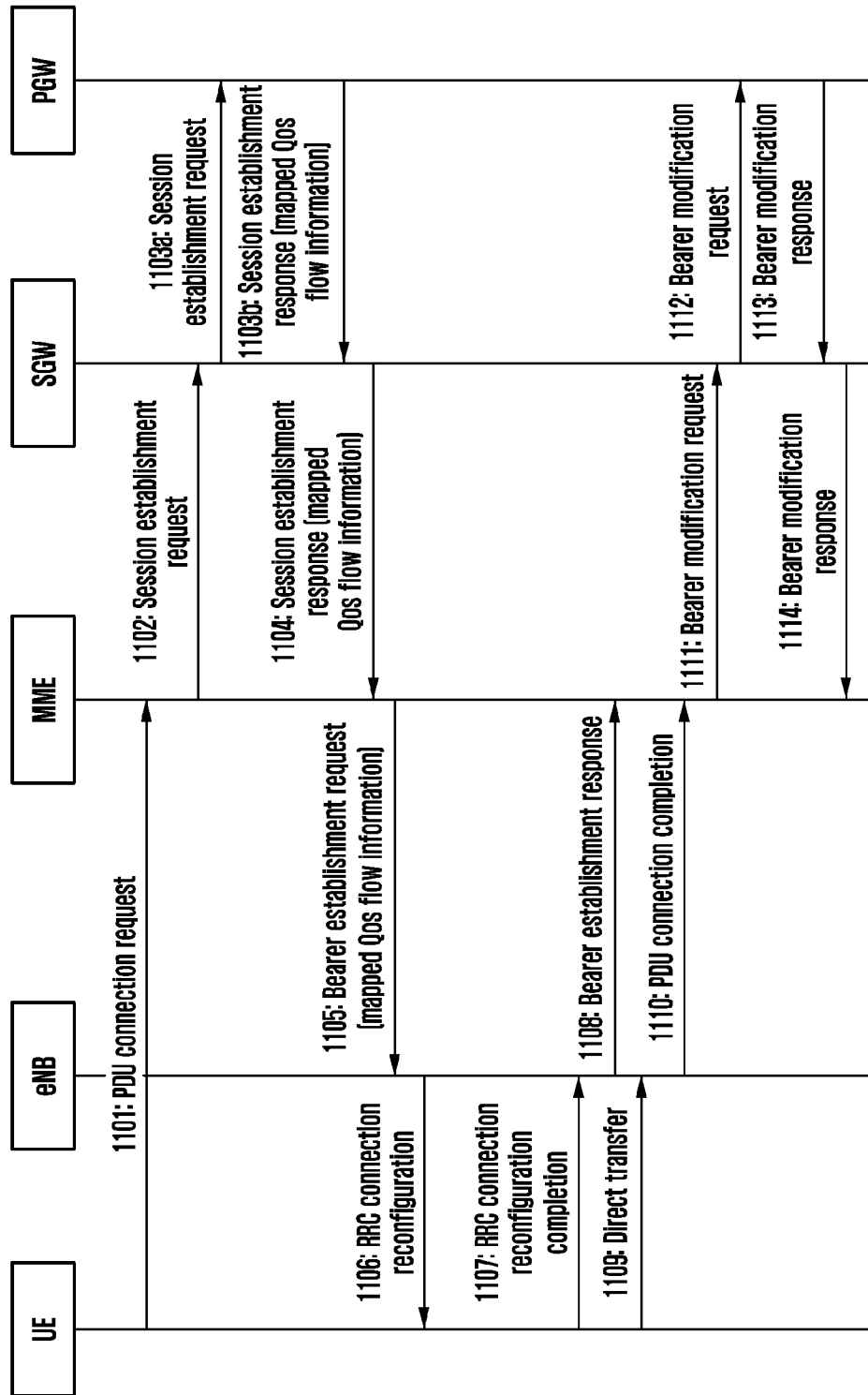
FIG. 11 is a schematic flowchart of a PDU connection establishment process to support a handover between different systems.

As shown in FIG. 11, this method is used for supporting data forwarding during the handover of a UE from the EPC to the 5GC. This method comprises the following steps.

Step 1101: A UE transmits a PDU connection request message to an MME. The UE allocates a PDU session identifier and then transmits the PDU session identifier to the MME.

Step 1102: The MME receives the PDU connection request message.

The MME transmits a session establishment request message to an SGW. This message contains a PDN GW address. This message contains the PDU session identifier.

Step 1103a: The SGW transmits a session establishment request message to a PDN GW (PGW). The SGW transmits this message to the PGW indicated by the PDN GW address received in step 1002. This message contains the PDU session identifier.

The process with the PCRF is not the focus of the present invention and thus will not be described in detail.

Step 1103b: The PGW transmits a session establishment response message to the SGW. In order to support the handover between different systems, the PGW further has a function of an SMF. The PDU session to which the EPS bearer belongs can be allocated by the function of the PCC or PGW control plane. The Qos information and/or Qos flow identifier of a mapped Qos flow of an EPS bearer can be determined by the PCC or PGW. In a PCC deployment scenario, the Policy Control and Charging Rules Function (PCRF) provides the SMF with the identifier of the PDU session to which the EPS bearer belongs, and the PCRF provides the SMF with the Qos and/or Qos flow identifier of a Qos flow mapped by the EPS bearer. Default EPS bearers are mapped to a non-Guaranteed Business Rate (non-GBR) Qos flows. The PGW transmits, to the SGW, the identifier of the PDU session to which the EPS bearer belongs, the Qos information of a Qos flow mapped by the EPS bearer and/or the identifier of a Qos flow mapped by the EPS bearer. The SGW saves the received identifier of the PDU session to which the EPS bearer belongs. The SGW saves the received Qos and/or Qos flow identifier of a Qos flow mapped by the EPS bearer.

Step 1104: The SGW transmits a session establishment response message to the MME. This message contains the identifier of the PDU session to which the EPS bearer belongs. This message contains the Qos information and/or Qos flow identifier of a mapped Qos flow of the EPS bearer. The MME saves the identifier of the PDU session to which the EPS bearer belongs. The MME saves the received Qos and/or Qos flow identifier of a Qos flow mapped by the EPS bearer.

Step 1105: The MME transmits a bearer establishment request message to an eNB. The message contains an NAS message, i.e., a PDU connection establishment acception message. This message contains the identifier of the PDU session to which the EPS bearer belongs. This message contains the Qos information and/or Qos flow identifier of a mapped Qos flow the EPS bearer. The bearer establishment request message can also be an initial context establishment request message.

When the eNB needs to initiate a handover of the UE to the NG-RAN, the eNB gives a proposal of downlink data forwarding. The eNB can give a proposal of downlink data forwarding for each PDU session or for each Qos flow. The eNB determines, according to the information about the PDU session to which the EPS bearer and/or the Qos flow mapped by the EPS bearer received from the MME, to give a proposal of downlink data forwarding. The eNB contains the PDU session identifier and the downlink data forwarding in a source-to-target transparent transmitter. Or, the eNB contains the PDU session identifier, the Qos flow identifier in the PDU session and the downlink data forwarding information in a source-to-target transparent transmitter. If the target base station has accepted the data forwarding, the source base station can forward data to the SGW according to a tunnel corresponding to each EPS bearer or a tunnel corresponding to each PDU session. The specific process is as described in the embodiment shown in FIG. 14.

Step 1106: The eNB transmits an RRC connection reconfiguration message to the UE. The message contains an NAS message, i.e., a PDU connection establishment acception message. This message or the NAS PDU connection establishment acception message contains the Qos information and/or Qos flow identifier of a mapped Qos flow of the EPS bearer and/or the identifier of the PDU session to which the EPS bearer belongs.

Step 1107: The UE transmits an RRC connection reconfiguration completion message to the eNB. The UE saves the Qos information and/or Qos flow identifier of a mapped Qos flow of the EPS bearer and/or the identifier of the PDU session to which the EPS bearer belongs.

Step 1108: The eNB transmits a bearer establishment response message to the MME.

Step 1109: The UE transmits a direct transfer message to the eNB. This message contains an NAS message, i.e., a PDN connection completion message.

Step 1110: The eNB transmits the received PDU connection completion message to the MME.

Step 1111: The MME transmits a bearer modification request message to the SGW.

Step 1112: The SGW transmits a bearer modification request message to the PGW.

Step 1113: The PGW transmits a bearer modification response message to the SGW.

Step 1114: The SGW transmits the bearer modification response message to the MME.

So far, the ninth method for supporting handover according to the present invention has been described. By this method, the information about a Qos flow mapped by an EPS bearer can be obtained by the eNB in advance. Therefore, when a UE is handed over from the EPS to the 5GS, the data forwarding can be well supported, so that the loss of data is avoided, the delay of data forwarding is reduced and the continuity of services is ensured.

Figure 12:
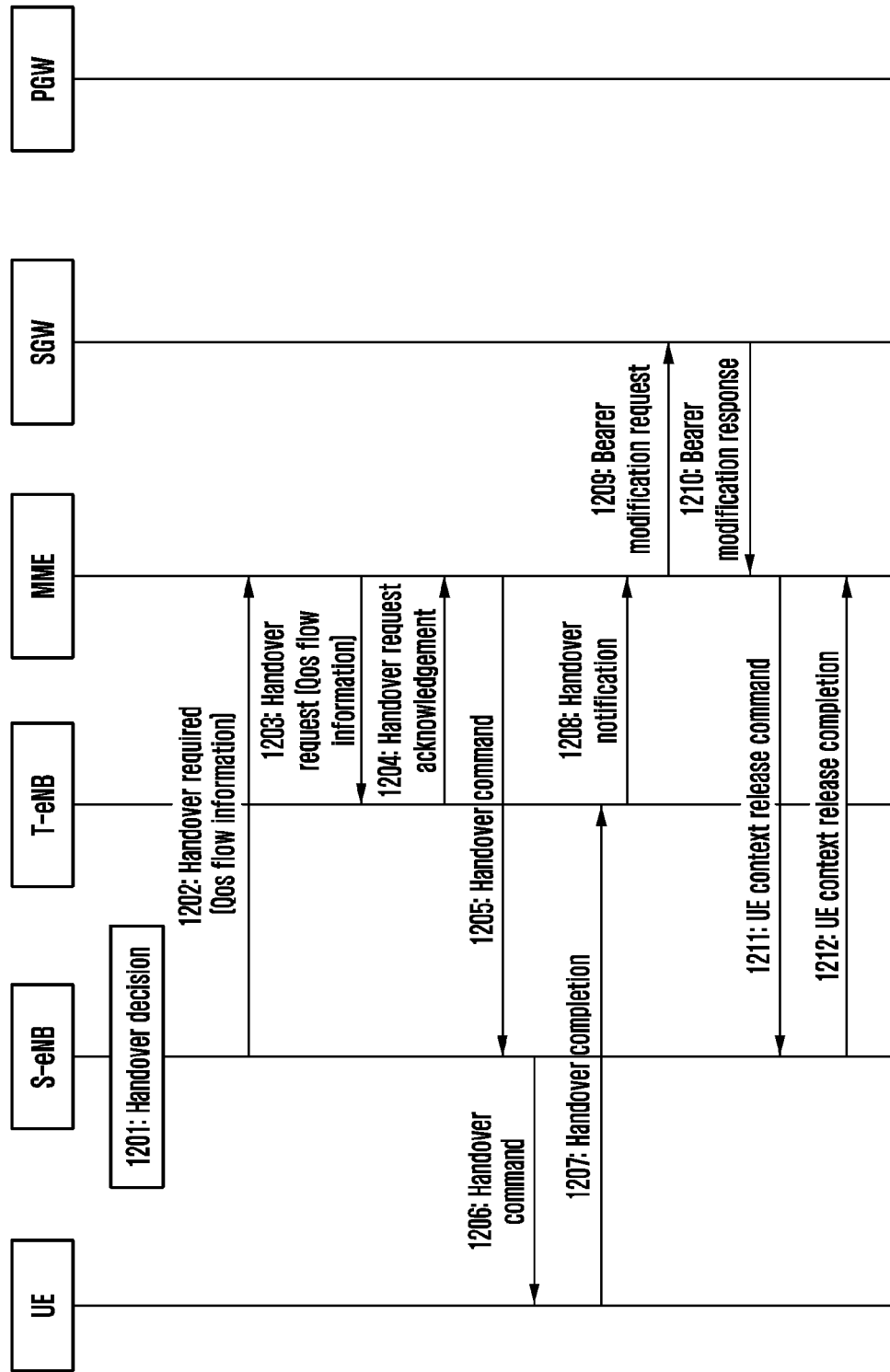
FIG. 12 is a schematic flowchart of a UE accessing to an eNB through an S1 handover to support a handover between different systems.

As shown in FIG. 12, the method is used for accessing a UE to an eNB through an S1 handover process. When the eNB needs to initiate a handover of the UE to a 5GS, a method for acquiring information required by a handover between different systems to support the handover is required. This method comprises the following steps.

Step 1201: A source eNB (S-eNB) decides to initiate a handover of a UE.

Step 1202: The S-eNB transmits a handover required message to an MME.

The UE has one or more ongoing PDU sessions (also referred to as PDN connections). Each PDU session contains one or more EPS bearers. During a PDU session establishment or EPS bearer establishment process, Qos information and/or Qos flow identifier of the mapped Qos flow and/or the identifier of the PDU session to which the EPS bearer belongs are allocated to each EPS bearer. Default EPS bearers are mapped to a non-Guaranteed Business Rate (non-GBR) Qos flow. The PDU session to which the EPS bearer belongs can be allocated by the function of the PCC or PGW control plane. The Qos information and/or Qos flow identifier of the mapped Qos flow of the EPS bearer can be allocated by a function of a PCC or PGW control plane. In order to support the handover between different systems, a PGW control plane can further have an SMF function. In a PCC deployment scenario, the Policy Control and Charging Rules Function (PCRF) provides the SMF with the identifier of the PDU session to which the EPS bearer belongs, and the PCRF provides the SMF with the Qos and/or Qos flow identifier of the Qos flow mapped by the EPS bearer. In order to support the handover between different systems, a PCRF further has a Policy Control Function (PCF). The PGW transmits, to the SGW, the identifier of the PDU session to which the EPS bearer belongs, the Qos information of the Qos flow mapped by the EPS bearer and/or the identifier of the Qos flow mapped by the EPS bearer. The SGW saves the received identifier of the PDU session to which the EPS bearer belongs. The SGW saves the received Qos and/or Qos flow identifier of the Qos flow mapped by the EPS bearer. The SMF transmits, through the MME and to the UE, the Qos and/or Qos flow identifier of the Qos flow mapped by the EPS bearer and/or the identifier of the PDU session to which the EPS bearer belongs. For example, the SMF transmits the information to the UE through a non-access stratum message, i.e., a PDN connection establishment message. During a PDU session establishment or EPS bearer establishment process, the MME transmits, to an E-UTRAN, the Qos and/or Qos flow identifier of the Qos flow mapped by the EPS bearer and/or the identifier of the PDU session to which the EPS bearer belongs. The MME acquires, from the SMF, the Qos and/or Qos flow identifier of the Qos flow mapped by the EPS bearer and/or the identifier of the PDU session to which the EPS bearer belongs. The E-UTRAN can transmit the mapping information to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

In the handover required message or a source-to-target transparent transmitter, the S-eNB contains the identifier of the PDU session to which the EPS bearer belongs, the Qos information of the Qos flow mapped by the EPS bearer and/or the identifier of the Qos flow mapped by the EPS bearer.

Step 1203: The MME transmits a handover request message to a target eNB (T-eNB). This message contains a source-to-target transparent transmitter. The handover request message or the source-to-target transparent transmitter contains the identifier of the PDU session to which the EPS bearer belongs, the Qos information of the Qos flow mapped by the EPS bearer and/or the identifier of the Qos flow mapped by the EPS bearer. The handover request further contains information about an E-RAB to be established. The information about an E-RAB to be established contains an E-RAB identifier, E-RAB Qos information, uplink tunnel information or more. In this method of the present invention, there are two methods for transmitting, to the T-eNB, the identifier of the PDU session to which the EPS bearer belongs, the Qos information of the Qos flow mapped by the EPS bearer and/or the identifier of the Qos flow mapped by the EPS bearer.

Way 1: A source-to-target transparent transmitter is used, as described in step 1202 and in this step.

Way 2: The MME transmits, to the T-eNB and through a handover request message, the identifier of the PDU session to which the EPS bearer belongs, the Qos information of the Qos flow mapped by the EPS bearer and/or the identifier of the Qos flow mapped by the EPS bearer. The MME has received, from the SGW, and saved the identifier of the PDU session to which the EPS bearer belongs, the Qos information of the Qos flow mapped by the EPS bearer and/or the identifier of the Qos flow mapped by the EPS bearer by the method shown in FIG. 11.

When the target eNB needs to initiate a handover of the UE to a 5GS, the target eNB uses the received identifier of the PDU session to which the EPS bearer belongs, the Qos information of the Qos flow mapped by the EPS bearer and/or the identifier of the Qos flow mapped by the EPS bearer so that the data forwarding during the handover between different systems can be supported. The specific process is as described in the embodiment shown in FIG. 14.

Step 1204: The eNB transmits a handover request acknowledgement message to the MME. This message contains the data forwarding tunnel information allocated by the target base station. This message contains a target-to-source transparent transmitter.

Step 1205: The MME transmits a handover command message to the S-eNB. This message contains a target-to-source transparent transmitter.

Step 1206: The S-eNB transmits a handover command message to the UE. The UE is synchronized to the target base station.

Step 1207: The UE transmits a handover completion message to the T-eNB.

Step 1208: The eNB transmits a handover notification message to the MME.

Step 1209: The MME transmits a bearer modification request message to the SGW. This message is specific to each PDU session or PDU connection.

Step 1210: The SGW transmits a bearer modification response message to the MME.

Step 1211: The MME transmits a UE context release command message to the S-eNB.

Step 1212: The S-eNB transmits a UE context release completion message to the MME.

So far, the tenth method for supporting handover according to the present invention has been described. By this method, the access of a UE to an eNB through a handover can be solved. When an eNB needs to initiate a handover from an EPS to a 5GS, the data forwarding can be well supported, so that the loss of data is avoided, the delay of data forwarding is reduced and the continuity of services is ensured.

Figure 13:
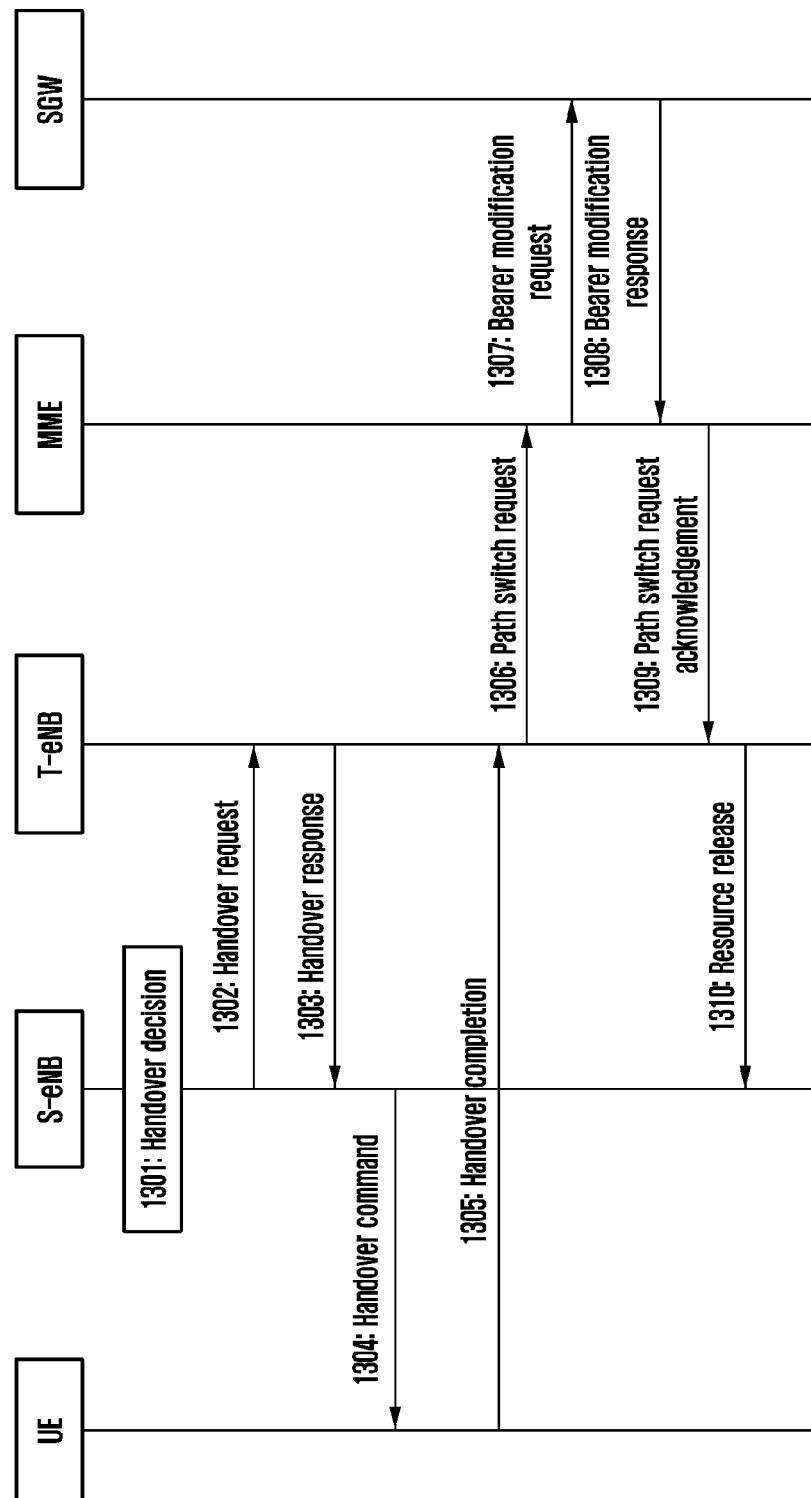
FIG. 13 is a schematic flowchart of a UE to accessing to an eNB through an X2 handover to support a handover between different systems.

As shown in FIG. 13, this method is used for accessing a UE to an eNB through an X2 handover process. When the eNB needs to initiate a handover of the UE to a 5GS, a method for acquiring information required by a handover between different systems to support the handover is required. This method comprises the following steps.

Step 1301: A source eNB (S-eNB) decides to initiate a handover of a UE.

Step 1302: The S-eNB transmits a handover request message to a target eNB (T-eNB).

The UE has one or more ongoing PDU sessions (also referred to as PDN connections). Each PDU session contains one or more EPS bearers. During a PDU session establishment or EPS bearer establishment process, Qos information and/or Qos flow identifier of the mapped Qos flow and/or the identifier of a PDU session are allocated to each EPS bearer. Default EPS bearers are mapped to a non-Guaranteed Business Rate (non-GBR) Qos flow. The PDU session to which the EPS bearer belongs can be allocated by the function of the PCC or PGW control plane. The Qos information and/or Qos flow identifier of the mapped Qos flow of the EPS bearer can be allocated by a function of a PCC or PGW control plane. In order to support the handover between different systems, a PGW control plane can further have an SMF function. In a PCC deployment scenario, the Policy Control and Charging Rules Function (PCRF) provides the SMF with the identifier of the PDU session to which the EPS bearer belongs, and the PCRF provides the SMF with the Qos and/or Qos flow identifier of the Qos flow mapped by the EPS bearer. In order to support the handover between different systems, a PCRF further has a Policy Control Function (PCF). The PGW transmits, to the SGW, the identifier of the PDU session to which the EPS bearer belongs, the Qos information of the Qos flow mapped by the EPS bearer and/or the identifier of the Qos flow mapped by the EPS bearer. The SGW saves the received identifier of the PDU session to which the EPS bearer belongs. The SGW saves the received Qos and/or Qos flow identifier of the Qos flow mapped by the EPS bearer. The SMF transmits, through the MME and to the UE, the Qos and/or Qos flow identifier of the Qos flow mapped by the EPS bearer and/or the identifier of the PDU session to which the EPS bearer belongs. For example, the SMF transmits the information to the UE through a non-access stratum message, i.e., a PDN connection establishment message. During a PDU session establishment or EPS bearer establishment process, the MME transmits, to an E-UTRAN, the Qos and/or Qos flow identifier of the Qos flow mapped by the EPS bearer and/or the identifier of the PDU session to which the EPS bearer belongs. The MME acquires, from the SMF, the Qos and/or Qos flow identifier of the Qos flow mapped by the EPS bearer and/or the identifier of the PDU session to which the EPS bearer belongs. The E-UTRAN can transmit the mapping information to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

The handover request further contains information about an E-RAB to be established. The information about an E-RAB to be established contains an E-RAB identifier, E-RAB Qos information, uplink tunnel information or more.

In the handover request message or a source-to-target transparent transmitter, the S-eNB contains the identifier of the PDU session to which the EPS bearer belongs, the Qos information of the Qos flow mapped by the EPS bearer and/or the identifier of the Qos flow mapped by the EPS bearer.

In this method of the present invention, there are three methods for informing the target eNB of the identifier of the PDU session to which the EPS bearer belongs, the Qos information of the Qos flow mapped by the EPS bearer and/or the identifier of the Qos flow mapped by the EPS bearer.

Method 1: The target eNB is informed by the source eNB through a handover request message, as described in this step.

Method 2: The target base station is informed by the MME by step 1309, as described in step 1309.

Method 3: The target eNB is informed by the SGW through the MME by steps 1308 and 1309, as described in steps 1308 and 1309.

When the target eNB needs to initiate a handover of the UE to a 5GS, the target eNB uses the received identifier of the PDU session to which the EPS bearer belongs, the Qos information of the Qos flow mapped by the EPS bearer and/or the identifier of the Qos flow mapped by the EPS bearer so that the data forwarding during the handover between different systems can be supported. The specific process is as described in the embodiment shown in FIG. 14.

Step 1303: The T-eNB transmits a handover response message to the S-eNB.

Step 1304: The S-eNB transmits a handover command message to the UE. The UE is synchronized to the target base station.

Step 1305: The UE transmits a handover completion message to the T-eNB.

Step 1306: The T-eNB transmits a path switch request message to the MME.

Step 1307: The MME transmits a bearer modification request message to the SGW.

Step 1308: The SGW transmits a bearer modification response message to the MME. This message contains the identifier of the PDU session to which the EPS bearer belongs, the Qos information of the Qos flow mapped by the EPS bearer and/or the identifier of the Qos flow mapped by the EPS bearer.

Step 1309: The MME transmits a path switch request acknowledgement message to the T-eNB. This message contains the identifier of the PDU session to which the EPS bearer belongs, the Qos information of the Qos flow mapped by the EPS bearer and/or the identifier of the Qos flow mapped by the EPS bearer.

When the target eNB needs to initiate a handover of the UE to a 5GS, the target eNB uses the received identifier of the PDU session to which the EPS bearer belongs, the Qos information of the Qos flow mapped by the EPS bearer and/or the identifier of the Qos flow mapped by the EPS bearer so that the data forwarding during the handover between different systems can be supported. The specific process is as described in the embodiment shown in FIG. 14.

Step 1310: The T-eNB transmits a resource release message to the S-eNB.

So far, the eleventh method for supporting handover according to the present invention has been described. By this method, the access of a UE to an eNB through a handover can be solved. When an eNB needs to initiate a handover from an EPS to a 5GS, the data forwarding can be well supported, so that the loss of data is avoided, the delay of data forwarding is reduced and the continuity of services is ensured.

Figure 14:
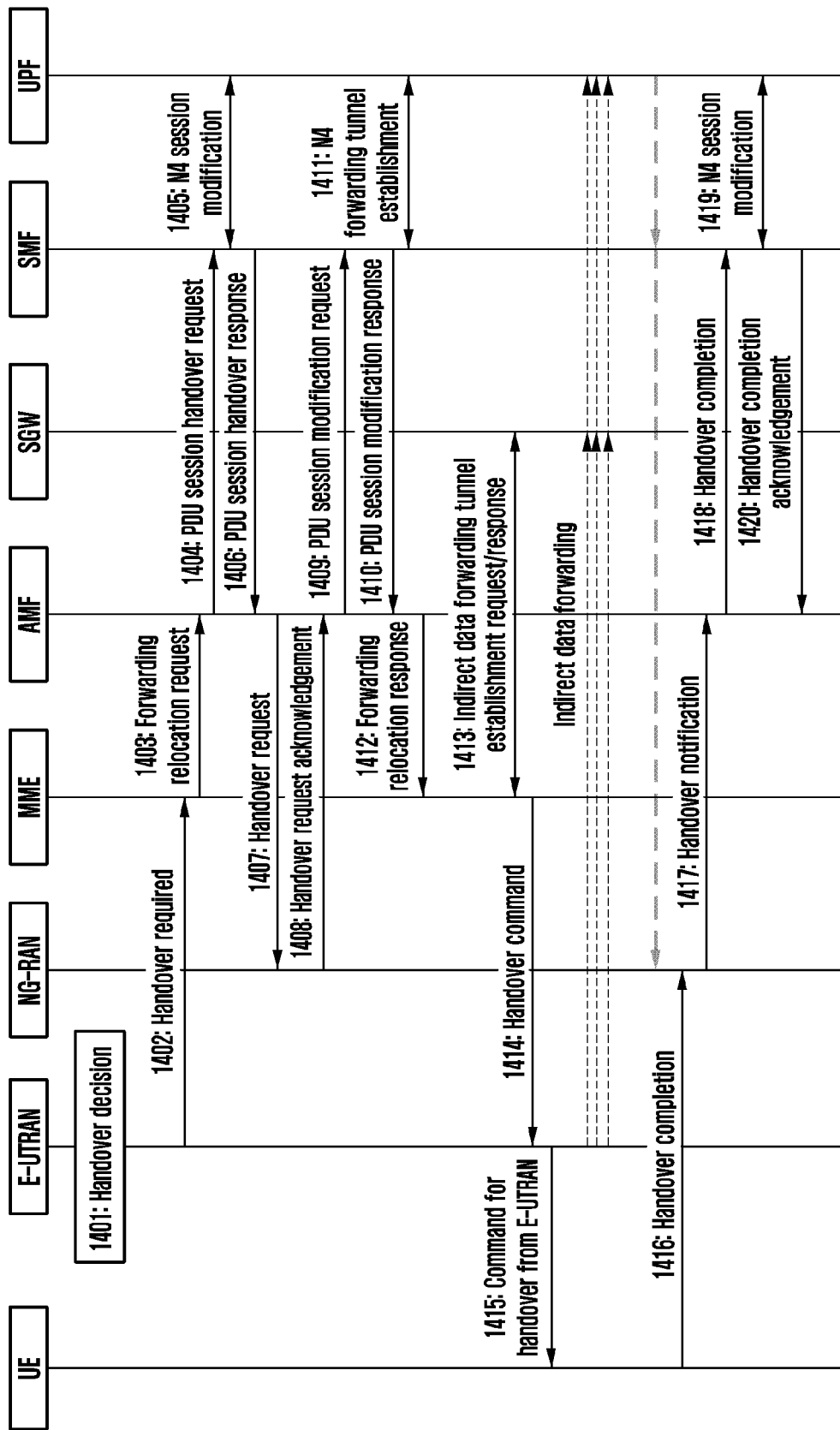
FIG. 14 is a schematic flowchart of a first method for handing over a UE from an EPS system to a 5G system.

FIG. 14 shows a schematic flowchart of a first method for handing over a UE from an EPS to a 5G system in the present invention. In this method, the information is obtained by the methods for supporting handover shown in FIGS. 11, 12 and 13, and the data forwarding during the handover between different systems can thus be well supported. This method comprises the following steps.

Step 1401: An E-UTRAN decides to hand over a UE to an NG-RAN.

Here, the E-UTRAN can be an eNB connected to the EPC. The NG-RAN can be a gNB, an eNB connected to the 5GC or a Centralized Unit (CU) in the gNB. The eNB connected to the 5GC can also be referred to as an ng-eNB.

The user plane path before handover is anchors UPF, SGW and E-UTRAN. The SGW needs to support an interface to the anchor UPF. The anchor UPF can be located in the 5GC or the EPC or can be a common entity. The anchor UPF can be a UPF serving the UE, and executes a function of a user plane anchor during the handover between different Radio Access Technologies (RATs). The anchor UPF can be a function of a PGW user plane plus an UPF or a function of an UPF plus a PGW user plane, and executes a function of a user plane anchor during the handover between different Radio Access Technologies (RATs).

The UE has one or more ongoing PDU sessions (also referred to as PDN connections). Each PDU session contains one or more EPS bearers. During a PDU session establishment or EPS bearer establishment process, Qos information and/or Qos flow identifier of the mapped Qos flow and/or the identifier of a PDU session are allocated to each EPS bearer. Default EPS bearers are mapped to a non-Guaranteed Business Rate (non-GBR) Qos flow. The PDU session to which the EPS bearer belongs can be allocated by the function of the PCC or PGW control plane. The Qos information and/or Qos flow identifier of the mapped Qos flow of the EPS bearer can be allocated by a function of a PCC or PGW control plane. In order to support the handover between different systems, a PGW control plane can further have an SMF function. In a PCC deployment scenario, the Policy Control and Charging Rules Function (PCRF) provides the SMF with the identifier of the PDU session to which the EPS bearer belongs, and the PCRF provides the SMF with the Qos and/or Qos flow identifier of the Qos flow mapped by the EPS bearer. In order to support the handover between different systems, a PCRF further has a Policy Control Function (PCF). The PGW transmits, to the SGW, the identifier of the PDU session to which the EPS bearer belongs, the Qos information of the Qos flow mapped by the EPS bearer and/or the identifier of the Qos flow mapped by the EPS bearer. The SGW saves the received identifier of the PDU session to which the EPS bearer belongs. The SGW saves the received Qos and/or Qos flow identifier of the Qos flow mapped by the EPS bearer. The SMF transmits, through the MME and to the UE, the Qos and/or Qos flow identifier of the Qos flow mapped by the EPS bearer and/or the identifier of the PDU session to which the EPS bearer belongs. For example, the SMF transmits the information to the UE through a non-access stratum message, i.e., a PDN connection establishment message. During a PDU session establishment or EPS bearer establishment process, the MME transmits, to an E-UTRAN, the Qos and/or Qos flow identifier of the Qos flow mapped by the EPS bearer and/or the identifier of the PDU session to which the EPS bearer belongs. The MME acquires, from the SMF, the Qos and/or Qos flow identifier of the Qos flow mapped by the EPS bearer and/or the identifier of the PDU session to which the EPS bearer belongs. The E-UTRAN can transmit the mapping information to the UE through an RRC message. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

Step 1402: The E-UTRAN transmits a handover required message to an MME. This message contains the identifier of a target NG-RAN node and a source-to-target transparent transmitter. This message further contains identification information indicating an AMF to which the target NG-RAN is connected. The identification information can be an identifier of a tracked area, an identifier of a network slice, an identifier of an AMF pool, an identifier of the AMF or more.

This message contains the handover type. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

In order to support the handover between different systems, an SMF can have functions of a PGW control plane.

The source-to-target transparent transmitter contains a PDU session identifier and a downlink data forwarding proposal for the PDU session. Or, the source-to-target transparent transmitter contains the PDU session identifier, the identifier of a Qos flow in the PDU session and a downlink data forwarding proposal for the Qos flow. The eNB obtains, through a PDN connection establishment process or a handover process, the identifier of the PDU session corresponding to the EPS bearer and/or the identifier of the Qos flow in the PDU session. It is also possible to obtain the Qos information of the mapped Qos flow. The method for obtaining, by the eNB, the information through a handover is as described in the methods shown in FIGS. 12 and 13. The method for obtaining, by the eNB, the information about the mapping from the E-RAB to the PDU session and/or from the E-RAB to the Qos flow in the PDU session through a PDU session establishment process is as described in FIG. 11. The eNB decides, according to the mapping from the E-RAB to the Qos flow in the PDU session and the Qos information, whether to give a proposal of data forwarding. The eNB can make a decision by considering other factors, for example, the presence or absence of data in a buffer, without influencing the main contents of the present invention.

The handover required message can further contain PDU session information and information about the Qos flow in the PDU session. The PDU session information contains a PDU session identifier. The information about the Qos flow contains a Qos flow identifier and/or Qos information of the Qos flow. The E-UTRAN obtains, through a PDN connection establishment process or a handover process, the identifier of the PDU session to which the EPS bearer belongs, the identifier of the mapped Qos flow and/or the Qos information of the mapped Qos flow. The process of obtaining, by the E-UTRAN, the information through the PDN connection establishment process is as described in FIG. 11 and step 1401. The method for obtaining, by the E-UTRAN, the information through the handover process is as described in the FIGS. 12 and 13.

Step 1403: The MME transmits a relocation request message to an AMF. According to the identification information indicating the AMF connected to the target NG-RAN node contained in the handover required message, the MME selects and finds an AMF. This message contains the identifier of the target NG-RAN node, a source-to-target transparent transmitter and UE context information. The UE context information contains UE Mobility Management (MM) context information and Session Management (SM) context. This message contains the handover type. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

The MME or the AMF decides whether the data forwarding is possible. Here, the data forwarding refers to indirect data forwarding. If the MME decides that the indirect data forwarding is impossible, the MME informs the AMF of the information.

Step 1404: The AMF transmits a PDU handover request message to the selected SMF. This message contains a PDN connection and an AMF identifier. The PDN connection provides the common address of the SMF and the PGW control plane function. According to the information in the received relocation required message, the AMF knows that the handover is a handover between different systems, and the AMF requests the SMF to provide an SM context. The AMF transmits this message to each SMF serving the UE.

Step 1405: The SMF modifies the UPF.

Step 1406: The SMF transmits a PDU session handover response message to the AMF. This message contains the PDU session identifier, a list of successfully established EPSs, and Qos rules.

This message further contains the mapping between an EPS bearer and a Qos flow in the PDU session. When the AMF requests for the SM context, the SMF also always feeds back the mapped EPS bearer context (if any) to the AMF. Or, the SMF transmits the mapped EPS bearer context to the AMF only when the AMF also requests for the mapped EPS context.

Step 1407: The AMF transmits a handover request message to the NG-RAN. This message contains PDU session information to be established. The information about the PDU session contains a session identifier, session Qos information, Qos flow information, uplink tunnel information for each session, a source-to-target transparent transmitter and/or Qos information of a Qos flow. This message contains the handover type. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

This message can further contain the mapping between a Qos flow in the PDU session and an EPS bearer, i.e., the identifier of the EPS bearer mapped by a Qos flow and/or the mapped Qos information.

Step 1408: The NG-RAN transmits a handover request acknowledgement message to the AMF. This message contains one or more pieces of the following information:
- a target-to-source transparent transmitter, wherein the target-to-source transparent transmitter can further contain the mapping between a Qos flow in the PDU session and an EPS bearer, i.e., the identifier of the EPS bearer mapped by a Qos flow and/or the mapped Qos information; the target-to-source transparent transmitter can further contain information about a successfully established PDU session; and the PDU session information comprises a PDU session identifier and a list of identifiers of successfully established Qos flow in the PDE session;
- a list of PDU session information accepted to be established by the NG-RAN, wherein the list of PDU session information contains the PDU session identifier, downlink tunnel information for the PDU session over an NG3 interface, Qos flow information accepted in the PDU session, rejected Qos flow information, and tunnel information for data forwarding over the NG3 interface; for a successfully established Qos flow in a successfully established PDU session, if the 5G-RAN has received a suggestion of downlink data forwarding given by the source base station, the 5G-RAN allocates, to the corresponding PDU session, tunnel information for data forwarding over the NG3 interface; and, for a successfully established Qos flow, if the 5G-RAN has received a proposal of downlink data forwarding given by the source base station and the data forwarding is possible, the 5G-RAN allocates, to the corresponding PDU session, tunnel information for data forwarding over the NG3 interface;
- a list of PDU session information rejected to be established by the NG-RAN, wherein the list of PDU session information contains the PDU session identifier and the causes for rejection.

Step 1409: The AMF transmits a PDU session modification request message to the SMF. If the tunnel information for data forwarding over the NG3 interface has been received from the NG-RAN, the AMF requests the SMF to create a data forwarding tunnel. The AMF transmits, to the SMF, the tunnel information for data forwarding received from the NG-RAN. This message contains the PDU session to which the EPS bearer belongs. This message can further contain the mapping between an EPS bearer and a Qos flow in the PDU session.

Step 1410: The SMF transmits a PDU session modification response message to the AMF. This message contains the tunnel information for data forwarding between the SGW and the anchor UPF allocated by the SMF or the anchor UPF. This message contains a target-to-source transparent transmitter.

This message contains Qos flow information to be mapped in the PDU session in the 5GS. The Qos flow information contains a Qos flow identifier and/or Qos information corresponding to the Qos flow.

Step 1411: The SMF transmits, through an N4 session establishment or N4 session modification process and to the anchor UPF, the tunnel information for downlink data forwarding over the NG 3 interface allocated by the NG-RAN. The SMF allocates tunnel information for data forwarding between the SGW and the UPF. Or, the anchor UPF allocates tunnel information used for data forwarding between the SGW and the anchor UPF and then transmits the tunnel information to the SMF. The N4 session establishment message or N4 session modification message contains the PDU session to which the EPS bearer belongs. The N4 session establishment message or N4 session modification message can further contain the mapping between an EPS bearer and a Qos flow in the PDU session.

The SMF transmits, to the AMF, the tunnel information used for data forwarding between the SGW and the anchor UPF.

The PDU session modification response message in step 1410 can be executed before or after the N4 session establishment response message or N4 session modification response message in step 1411.

There are three methods for performing data forwarding between the SGW and the anchor UPF.

Method 1: The method for data transmission between the SGW and the anchor UPF is that each EPS bearer in each PDU session corresponds to one tunnel. The anchor UPF transmits, through a same tunnel and to the NG-RAN, the data of a same PDU session received from the SGW by a tunnel corresponding to each EPS bearer, that is, the anchor UPF performs a mapping from multiple tunnels to one tunnel. In this data forwarding method, the anchor UPF allocates, to each EPS bearer requiring data forwarding in each PDU session, tunnel information used for data forwarding between the SGW and the anchor UPF. For each PDU session, the number of data forwarding tunnels is equal to the number of EPS bearers. The anchor UPF knows, according to the information received from the AMF in step 1409, the number of EPS bearers requiring data forwarding in each PDU session on the EPS side. The anchor UPF transmits, to the AMF, the tunnel information for data forwarding allocated to each EPS bearer in the PDU session.

Method 2: The method for data transmission between the SGW and the anchor UPF is that each PDU session corresponds to one tunnel. The SGW transmits, through a same tunnel and to the anchor UPF, the data of a same PDU session received by a tunnel corresponding to each EPS bearer. In this data forwarding method, the anchor UPF allocates, to each PDU session, tunnel information used for data forwarding between the SGW and the anchor UPF.

Method 3: The method for data transmission between the SGW and the anchor UPF is that each PDU session corresponds to one tunnel. The SGW transmits, through a same tunnel and to the anchor UPF, the data of a same PDU session received by a tunnel corresponding to each E-RAB, and the Qos and/or flow related information is added on a header of the data packet. In this data forwarding method, the anchor UPF allocates, to each PDU session, tunnel information used for data forwarding between the SGW and the anchor UPF. In the response message in steps 1411 and 1410, the anchor UPF transmits, through the SMF and to the AMF, the Qos flow information to be mapped in the PDU session in the 5GS. The Qos flow information contains a Qos flow identifier and/or Qos information corresponding to the Qos flow. The AMF informs the MME of the information by step 1412, and the MME informs the SGW of the information by step 1413. The SGW can contain the Qos and/or flow related information in the header of the data packet.

The anchor UPF transmits the allocated data forwarding tunnel information to the AMF through the SMF.

Step 1412: The AMF transmits a forwarding relocation response message to the MME. This message contains a target-to-source transparent transmitter and an EPS bearer setup list.

Step 1413: The MME transmits an indirect data forwarding tunnel establishment request message to the SGW. This message contains the tunnel information used for data forwarding between the SGW and the anchor UPF.

In the third data forwarding method, this message contains the Qos flow information to be mapped by the EPS bearer in the PDU session in the 5GS and is transmitted to the SGW. The Qos flow information contains a Qos flow identifier and/or Qos information corresponding to the Qos flow.

The SGW transmits a indirect data forwarding tunnel establishment response message to the MME. This message contains the uplink tunnel information for data forwarding over the S1 interface allocated by the SGW.

Step 1414: The MME transmits a handover command message to the E-UTRAN. This message contains a target-to-source transparent transmitter and the tunnel information for data forwarding over the S1 interface. This message contains the handover type. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

Step 1415: The E-UTRAN transmits an E-UTRAN handover command message to the UE.

This message can further contain the mapping between a Qos flow in the PDU session and an EPS bearer, i.e., the identifier of the EPS bearer mapped by a Qos flow and/or the mapped Qos information.

The E-UTRAN forwards data to the SGW. The E-UTRAN forwards data to the SGW on a tunnel corresponding to each E-RAB requiring data forwarding.

The SGW forwards data to the anchor UPF. Corresponding to the three data forwarding methods described in step 1411, the SGW has different behaviors.

In the method 1, the SGW forwards data to the anchor UPF on a tunnel corresponding to each EPS bearer requiring data forwarding.

In the method 2, the SGW transmits, through a same tunnel and to the anchor UPF, the data of a same PDU session received by the tunnel corresponding to each EPS bearer. The anchor UPF performs a mapping from the PDU session to the Qos flow.

In the method 3, the SGW transmits, through a same tunnel and to the UPF, the data of a same PDU session received by the tunnel corresponding to each E-RAB, and the Qos and/or flow related information is added on a header of the data packet. The SGW performs a mapping from the PDU session to the Qos flow. The SGW performs a mapping from the PDU session to the Qos flow according to the information received in step 1413.

The anchor UPF forwards data to the NG-RAN. Corresponding to the three data forwarding methods described in step 1411, the anchor UPF has different behaviors.

In the method 1, the anchor UPF transmits, through a same tunnel and to the NG-RAN, the data of a same PDU session received from the SGW by the tunnel corresponding to each EPS bearer to the NG-RAN through a tunnel corresponding to the PDU session, that is, the anchor UPF performs a mapping from multiple tunnels to one tunnel. The anchor UPF forwards data to the NG-RAN according to the session transmission method in the 5GS, for example, how many flows being used to transmit downlink data in each PDU session, and how a header of a flow being set. For an unsuccessfully established Qos flow received in step 1408, if the anchor UPF has received the data forwarded by the SGW, the anchor UPF discards the data. This is because the access control of the NG-RAN is performed according to the Qos flow; however, on the E-UTRAN side, the data forwarding tunnel corresponds to each E-RAB, and the data forwarding is also performed in E-RAB level. The level of Qos flow is finer than the level of E-RABs. Since the E-URAN cannot distinguish data from different Qos flows or the E-UTRAN does not known the information about an unsuccessfully established Qos flow, the E-UTRAN may forward the data of an unsuccessfully established Qos flow in the E-RAB to the SGW, and the SGW then transmits the data to the anchor UPF.

In the method 2, the anchor UPF directly receives data from the SGW by the tunnel corresponding to each PDU session. The anchor UPF forwards data to the NG-RAN according to the session transmission method in the 5GS, for example, how many flows being used to transmit downlink data in each PDU session, and how a header of a flow being set.

In the method 3, the anchor UPF directly receives, from the SGW, the data to be forwarded in the 5GS. The anchor UPF forwards data to the NG-RAN.

During the PDU session establishment or EPS bearer establishment process, the UE receives, from the network, Qos information and/or Qos flow information of the Qos flow mapped by the EPS bearer. The UE correlates the ongoing EPS bearers with the Qos flows in the PDU session contained in the handover command message. For an EPS bearer without the corresponding Qos flow, the UE can delete this EPS bearer.

Or, the UE obtains, from the handover command message, the mapping between a Qos flow in the PDU session and an EPS bearer. The UE correlates the ongoing EPS bearers with the Qos flows contained in the handover command message. For an EPS bearer without the corresponding Qos flow, the UE can delete this EPS bearer.

Step 1416: The UE transmits a handover completion message to the NG-RAN.

Step 1417: The NG-RAN transmits a handover notification message to the AMF. This message contains the tunnel information for downlink data transmission allocated by the NG-RAN.

Step 1418: The AMF transmits a handover completion message to the SMF.

Step 1419: The SMF transmits an N4 session modification message to the UPF. The UPF transmits the N4 session modification response to the SMF. The AMF transmits the tunnel information for downlink data transmission allocated by the NG-RAN to the anchor UPF through the SMF.

Step 1420: The SMF transmits a session handover completion acknowledgement message to the AMF.

The session modification response message in step 1420 can be executed before or after the N4 session modification response message in step 1419.

So far, the process of supporting the data forwarding during the handover between different systems can be well supported by using the information obtained from intra-5GS handover procedure in the present invention. By this method, the handover problem from the EPS to the 5GS can be solved, so that the loss of data is avoided and the continuity of services is ensured.

The present invention provides a method for supporting handover. Specifically, when a PDU session of a dual-registered UE is transferred from an EPS to a 5GS, the method comprises the following steps of:

based on a PDU session request initiated by a UE, establishing a PDU session; and based on the PDU session, acquiring tunnel information for data forwarding, and then performing data forwarding.

Figure 15:
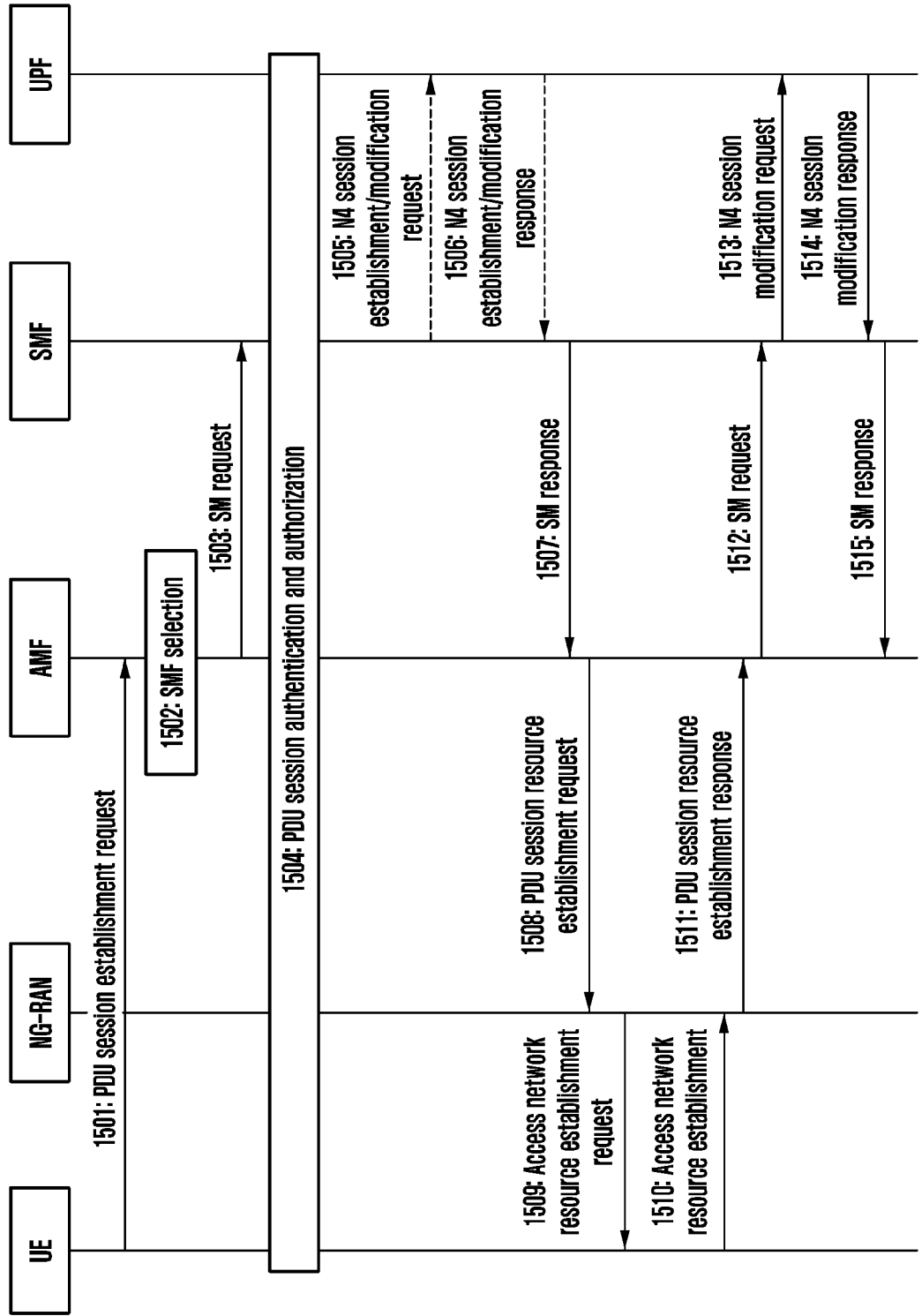
FIG. 15 is a schematic flowchart of a method for transferring a PDU session from an EPS to a 5G system when a UE is registered in both the 5G system and the EPS.

As shown in FIG. 15, this method is a method for supporting data forwarding when a PDU session of a UE is to be handed over from the EPS to the 5GS in the case of dual registration. This method comprises the following steps.

Step 1501: A UE transmits a Non-Access Stratum (NAS) message to an AMF to initiate a PDU session establishment process. The NAS message contains the PDU session identifier and N1 Session Management (SM) information. The N1 SM information contains a PDU session establishment request message. This message contains a handover indication.

An NG-RAN transmits the received NAS message to the AMF through an NG message. The NG message further contains the location information of a user and the type of the access technology.

Step 1502: For a new PDU session to be established, the AMF selects an SMF. The AMF saves the PDU session identifier and the identifier of the SMF. If the received message contains the handover indication information, the AMF use an SMF obtained from the subscription data. The AMF saves the received handover indication.

Step 1503: The AMF transmits an SM request message to the SMF. This message contains the N1 SM information received from the UE. This message contains a handover indication. The SMF saves the received handover indication information.

Step 1504: The SMF triggers a PDU session authentication and authorization process.

Step 1505: If the PDU session establishment request is an initial request and is not executed in step 1504, the SMF transmits an N4 session establishment message to the selected UPF. Otherwise, the SMF transmits an N4 session modification request message to the selected UPF.

Step 1506: The UPF transmits an N4 session establishment response message or an N4 modification response message to the SMF.

Step 1507: The SMF transmits an SM response message to the AMF. This message contains N2 SM information and N1 SM information. The N1 SM information contains an NAS message PDU session establishment acception. The N2 SM information contains the PDU session identifier, Qos profile, core network tunnel information and S-NSSAI. The N2 SM information contains the EPS Qos information mapped by the Qos flow in the PDU session. The N1 SM information contains the EPS Qos information mapped by the Qos flow in the PDU session.

If there is the handover indication, the SMF determines, according to the Qos of a service, whether the PDN connection requires data forwarding. The SMF can determine the data forwarding for each PDU session or whether each Qos flow in the PDU session requires data forwarding. If the data forwarding is required, the SMF contains a data forwarding indication in the SM response message. The data forwarding indication can be specific to the data forwarding of the PDU session or specific to each Qos flow in the PDU session.

Step 1508: The AMF transmits a PDU session resource establishment request message to an NG-RAN. The message contains the N2 SM information and the NAS message PDU session establishment acception. The NG-RAN saves the PDU session information, information of the Qos flow in the DPU session, and/or the EPS Qos information mapped by the Qos flow. The AMF contains the data forwarding indication in this message. The data forwarding indication can be specific to the data forwarding of the PDU session or specific to each Qos flow in the PDU session. The PDU session resource establishment request message can also be an initial context establishment request message.

Step 1509: The NG-RAN transmits an access network resource establishment request message to the UE. The access network resource establishment request message can be an RRC connection reconfiguration message. The NG-RAN allocates NG interface user plane downlink tunnel information. The message contains the NAS message PDU session establishment acception message. If the NG-RAN can allocate the required resources and the tunnel information of the NG-RAN side, the NG-RAN transmits an NAS message to the UE. The RRC message or the NAS message contains the EPS bearer identifier and/or EPS Qos information mapped by a Qos flow.

Step 1510: The UE transmits an access network resource establishment message to the NG-RAN. The access network resource establishment message can be an RRC connection reconfiguration completion message. This message can further contain an NAS message PDU session establishment completion message.

Step 1511: The NG-RAN transmits a PDU session resource establishment response message to the AMF. This message contains the N2 SM information and the PDU session identifier. The N2 SM information contains the PDU session identifier, RAN tunnel information, the accepted Qos information and/or the rejected Qos flow information. This message or the N2 SM information further contains the EPS bearer identifier mapped by a Qos flow. This message or the N2 SM information further contains the NAS message PDU session establishment completion message.

If the NG-RAN has received the data forwarding indication information, the NG-RAN allocates, to the PDU session or each Qos flow in the PDU session, tunnel information for downlink data forwarding. The tunnel information contains a tunnel identifier and the address of a transport layer. The PDU session resource establishment response message contains the data forwarding tunnel information allocated by the NG-RAN.

Step 1512: The AMF transmits an SM request message to the SMF. This message contains the N2 SM information received from the NG-RAN. This message contains the NAS message received from the UE. This message contains the EPS bearer identifier mapped by a Qos flow. This message contains the data forwarding tunnel information received from the NG-RAN.

Step 1513: If the N4 session of the corresponding PDU session has not been established, the SMF initiates an N4 session establishment process to the UPF. Otherwise, the SMF initiates an N4 session modification process. The SMF transmits the tunnel information allocated by the access network and/or the core network tunnel information to the UPF. The SMF further transmits, to the UPF, the data forwarding tunnel information received from the NG-RAN.

If the UPF has received the data forwarding tunnel information, the SMF or the UPF allocates the tunnel information for data forwarding between the SGW and the UPF, corresponding to the PDN session transferred from the EPS to the 5GS. If the tunnel information is allocated by the UPF, the UPF transmits the allocated tunnel information to the SMF through the N4 session modification message. The tunnel information can be specific to each EPS bearer or each PDU session. In order to support the movement between different systems, the SMF further has a function of a PGW control plane. The SMF transmits, to the SGW, the tunnel information for direct data forwarding between the SGW and the UPF. The SGW allocates the tunnel information for data forwarding between the eNB and the SGW, and then transmits the tunnel information to the eNB through the MME. The tunnel information is specific to each EPS bearer.

If the eNB has received the data forwarding uplink tunnel information, the eNB forwards downlink data to the SGW. According to whether the received data cannel information is specific to each EPS bearer or each PDU session, the SGW forwards data to the UPF. The UPF transmits, according to the relationship between the EPS bearer and the PDU session and/or the mapping between an EPS bearer and a Qos flow in the PDU session, the data of the EPS bearer to the NG-RAN by a tunnel of the mapped PDU session.

The NG-RAN transmits the forwarded data to the UE, and then transmits other data.

Step 1514: The UPF transmits an N4 session modification response message or an N4 session request response message to the SMF.

Step 1515: The SMF transmits an SM response message to the AMF.

So far, the thirteenth method for supporting handover according to the present invention has been described. By this method, during the transfer of a PDU session of a dual-connection UE from the 5GC to the EPC, the data forwarding can be well supported, so that the loss of data is avoided, the delay of data forwarding is reduced and the continuity of services is ensured.

Figure 16:
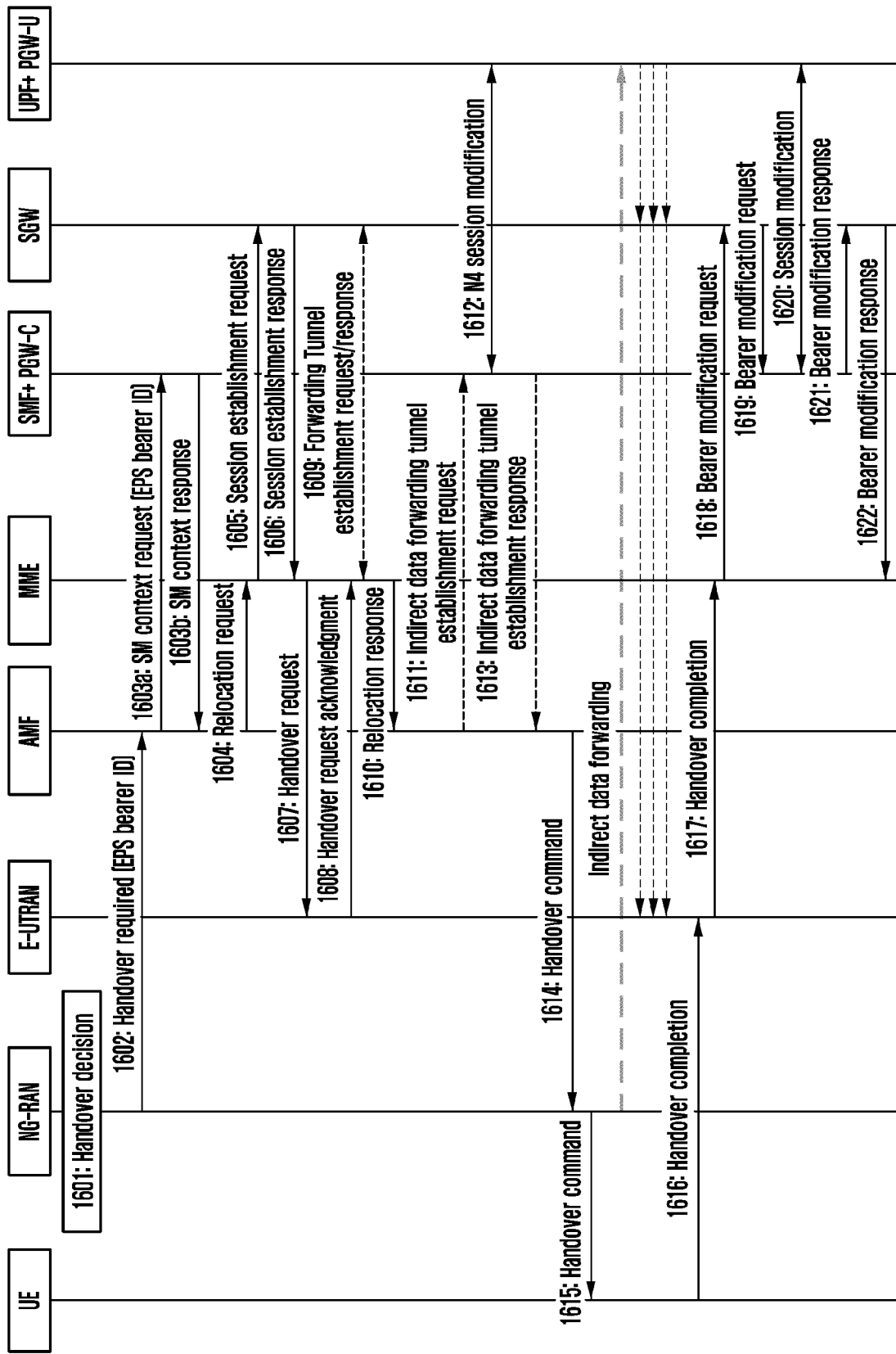
FIG. 16 is a schematic flowchart of a handover to an EPS when an NG-RAN allocates an EPS bearer identifier corresponding to a Qos flow.

FIG. 16 shows an EPS bearer identifier allocation method for supporting handover between different systems according to the present invention. This method can well support the data forwarding during the handover between different systems. This method comprises the following steps.

Step 1601: An NG-RAN decides to hand over a UE to an E-UTRAN.

Here, the E-UTRAN can be an eNB connected to the EPC. The NG-RAN can be a gNB, an eNB connected to the 5GC or a Centralized Unit (CU) in the gNB.

The user plane path before handover is from an UPF to the NG-RAN. The SGW needs to support an interface to the UPF. The UPF can contain a function of a PGW user plane and a function of performing user plane anchoring during the handover between different RATs.

Each PDU session contains one or more Qos flows. The UE has one or more ongoing PDU sessions. During a PDU session establishment or Guaranteed Business Rate (GBR) Qos flow establishment process, mapped EPS Qos information is allocated to a Qos flow. A Non-GBR Qos flow is mapped to a default EPS bearer. A GBR Qos flow is mapped to a dedicated EPS bearer. The EPS Qos information mapped by a Qos flow can be allocated by a PCC or an SMF. In order to support the handover between different systems, an SMF can have functions of a PGW control plane. In a PCC deployment scenario, a Policy Control Function (PCF) provides the SMF with mapped EPS Qos of a Qos flow. In order to support the handover between different systems, the PCF can have a Policy Control and Charging Rules Function (PCRF). The SMF transmits, through the AMF and to the UE, the EPS Qos information mapped by the Qos flow, for example, through a non-access stratum message PDU session establishment message. During the PDU session establishment or GBR Qos flow establishment process, the SMF can further transmit, through the AMF and to the NG-RAN, the EPS Qos information mapped by the Qos flow. The AMF transmits the EPS Qos information mapped by the Qos flow to the NG-RAN through an initial context establishment request message or a PDU session resource establishment request message. The NG-RAN can transmit the EPS Qos information mapped by the Qos flow to the UE through an RRC message. The E-RAB and the EPS bearer are identical. It is called the EPS bearer in a core network, while it is called the E-RAB in an access network.

The NG-RAN allocates the EPS bearer identifier mapped by a Qos flow in the PDU session. The NG-RAN can ensure that the allocated EPS bearer identifiers are unique and the number of the allocated EPS bearer identifiers does not exceed the maximum limit (eight). The E-RAB identifier and the EPS bearer identifier are identical. It is called the EPS bearer identifier in a core network, while it is called the E-RAB identifier in an access network.

Step 1602: The NG-RAN transmits a handover required message to an AMF. This message contains the identifier of a target eNB and a source-to-target transparent transmitter. The source-to-target transparent transmitter contains the E-RAB identifier and a downlink data forwarding proposal for the E-RAB. The NG-RAN obtains the EPS Qos information mapped by the Qos flow in the PDU session through a PDU session establishment process or a handover process. The method for obtaining, by the NG-RAN, the information through a handover process is as described in the method shown in FIG. 3. The method for obtaining, by the NG-RAN, the EPS bearer information through a PDU session establishment process is as described in step 1601. The NG-RAN decides, according to the mapping from the Qos flow to the E-RAB and the Qos information, whether to propose data forwarding. The NG-RAN can make a decision by considering other factors, for example, the presence or absence of data in a buffer, without influencing the main contents of the present invention.

The handover required message can further contain a list of EPS bearer information. The EPS bearer information contains the EPS bearer identifier and/or the Qos information of the EPS bearer. The handover required message can further contain the mapping between a Qos flow in the PDU session and an EPS bearer identifier. In the present invention, the mapping between a Qos flow and an EPS bearer identifier means that there is no EPS bearer identifier corresponding to the Qos flow in the PDU session.

This message further contains identification information indicating an MME to which the target eNB is connected. The identification information can be an identifier of a tracked area or an identifier of the MME.

The NG-RAN informs the AMF of the handover type. The handover type includes a handover in NR, a handover from NR to LTE, a handover from NR to UTRAN and a handover from NR to GERAN and/or GSM. For the handover from NR to LTE, the NG-RAN informs the AMF whether the target base station for the handover is a base station connected to a 5G core network or whether this handover is a handover between different systems. This is because an LTE eNB may support an interface to the 5GC, or may not support an interface to the 5GC. If the target base station is also connected to the 5GC, the handover is a handover in the 5G system. If the target base station is connected to the EPC but not connected to the 5GC, the handover is a handover between different systems. The NG-RAN can contain, in the handover required message, information about an inter-system handover or information indicating that there is no interface between the target base station and the 5GC, so as to inform the AMF that this handover is a handover between different systems. If an identifier of an eNB connected to the 5GC and an identifier of an eNB not connected to the 5GC are different in length, the 5GC can determine, according to the length of the identifier of the target base station contained in the received handover required message, whether the handover is a handover between different systems. If the identification information of the MME connected to the target base station and the identifier of the AMF node are defined differently (for example, different in length), the 5GC can determine, according to the length of the identifier of the core network connected to the target base station contained in the received handover required message, whether the handover is a handover between different systems. Or, the NG-RAN directly sets the handover type in the handover required message as a handover from the NR to an eNB connected to the EPC or a handover from the NR to an eNB connected to the 5GC, to inform the AMF of the handover type. The handover type indicates the core network to which the target eNB is connected is an EPC or a 5GC. If the core network is a 5GC, the handover is an intra-system handover. If the core network is an EPC, the handover is a handover between different systems.

Step 1603a: The AMF transmits a Session Management (SM) context request message to an SMF. According to the received information in the handover required message, the AMF knows that the handover is a handover between different systems, and the AMF requests the SMF to provide an SM context. The AMF can further request for an EPS bearer context. The AMF transmits this message to each SMF serving the UE. The AMF transmits, to the SMF, the EPS bearer identifier and/or the Qos information of the EPS bearer received from the NG-RAN. This message can further contain the mapping between a Qos flow in the PDU session and an EPS bearer identifier.

Step 1603b: The SMF transmits an SM context response message to the AMF. This message contains the SM context of the UE. The SM context further contains the mapped EPS bearer context, for example, the EPS bearer identifier and/or EPS Qos information. When the AMF requests for the SM context, the SMF also always feeds back the mapped EPS bearer context (if any) to the AMF if there is a mapped EPS bearer context. Or, if the AMF also requests for the mapped EPS bearer context when it requests for the SM context to the SMF, the SMF transmits the mapped EPS bearer context to the SMF. According to the information, which is received from the source NG-RAN, indicating that there is no connection between the target eNB and the 5G core network or indicating that the handover is a handover between different systems or a handover from the NR to an eNB connected to the EPC, the AMF knows that the handover is a handover between different systems, and the AMF requests the SMF to provide the mapped EPS bearer context information. This message can further contain the mapping between a Qos flow in the PDU session and an EPS bearer identifier.

In this method of the present invention, steps 1603a and 1603b may not be executed. The AMF acquires, from the handover required message received from the NG-RAN, EPS bearer information in the PDU session, for example, the EPS bearer identifier and EPS Qos information, so that the AMF can constitute a relocation request message in step 1604.

Step 1604: The AMF transmits a relocation request message to an MME. According to the identification information indicating the MME connected to the target eNB contained in the handover request message, the AMF selects and finds an MME. The identification information of the MME connected to the target eNB can be a TAI. This message contains the identifier of the target eNB, a source-to-target transparent transmitter and mapped EPS UE context information. The mapped EPS UE context information contains UE Mobility Management (MM) context information and Session Management (SM) context information.

The AMF or the MME decides whether the data forwarding is possible. Here, the data forwarding refers to indirect data forwarding. If the AMF decides that the indirect data forwarding is impossible, the AMF informs the MME of the information.

The AMF informs the MME of the information of the Qos flow(s) contained in the PDU session. The relocation request message can further contain the mapping between a Qos flow in the PDU session and an EPS bearer identifier.

Step 1605: The MME transmits a session establishment request message to an SGW. This message contains the EPS bearer context information.

Step 1606: The SGW transmits a session establishment response message to the MME. This message contains tunnel information for uplink data transmission over an S1 interface allocated by the SGW.

Step 1607: The MME transmits a handover request message to the E-UTRAN. This message contains a source-to-target transparent transmitter and an E-EAB context. The E-RAB context contains an E-RAB to be established and uplink tunnel information over the S1 interface allocated by the SGW. The E-RAB context contains information indicating whether the data forwarding is possible. This message contains the handover type. The specific content is the same as that in step 1602 and will not be repeated here. The handover request message can further contain the mapping between a Qos flow in the PDU session and an EPS bearer identifier.

Step 1608: The E-UTRAN transmits a handover request acknowledgement message to the MME. This message contains a list of established E-RABs, a list of unsuccessfully established E-RABs and a target-to-source transparent transmitter. For the established RABs, this message further contains tunnel information for downlink data transmission over the S1 interface. For the established E-RABs, if the source base station gives a proposal of downlink data forwarding, the data forwarding is possible and the target eNB accepts the downlink data forwarding proposal, the target base station contains the tunnel information which is allocated, by the E-UTRAN to each E-RAB requiring downlink data forwarding, for data forwarding over the S1 interface. The target-to-source transparent transmitter can further contain the mapping between a Qos flow in the PDU session and an EPS bearer identifier.

Step 1609: The MME requests the SGW to establish an indirect data forwarding tunnel. This step is executed only when the indirect data forwarding is to be executed. Upon receiving, from the E-UTRAN, the downlink tunnel information for data forwarding over the S1 interface, the MME requests the SGW to establish an indirect data forwarding tunnel. The MME transmits, to the SGW, the address of a transport layer for data forwarding and a TEID allocated by the eNB. The address of the transport layer and the TEID correspond to each E-RAB.

The SGW transmits an indirect data forwarding tunnel establishment response message to the MME. This message contains the information for data forwarding between the SGW and the UPF allocated by the SGW. The information for data forwarding between the SGW and the UPF contains a PDU session identifier and/or E-RAB information contained in the PDU session. The E-RAB information contains an E-RAB identifier and the tunnel information used by the E-RAB for data forwarding. The tunnel information contains the address of a transport layer and a TEID allocated by the SGW. The SGW allocates downlink data forwarding tunnel information to an E-RAB requiring downlink data forwarding. The SGW allocates uplink data forwarding tunnel information to an E-RAB requiring uplink data forwarding. The data forwarding tunnel information contained in the E-RAB information can contain uplink and/or downlink data forwarding tunnel information.

There are two methods for performing data forwarding between the UPF and the SGW.

A method for data transmission between the UPF and the SGW is that each EPS in each PDU session bears one tunnel. If the NG-RAN and the UPF perform data forwarding in such a way that each PDU session corresponds to one user plane tunnel, the UPF transmits, to the SGW and through a tunnel corresponding to an EPS bearer of each Qos flow, data of multiple Qos flows belonging to a same PDU session received from the NG-RAN, that is, the UPF performs a mapping from one tunnel to multiple tunnels. The UPF performs, according to the correspondence between a Qos flow in the PDU session and an EPS bearer identifier or an E-RAB, a mapping from one tunnel to multiple tunnels. In this forwarding method, the SGW allocates, to each EPS bearer requiring data forwarding in each PDU session, a tunnel information used for data forwarding between the SGW and the UPF. For each PDU session, the number of data forwarding tunnels is equal to the number of EPS bearers. The UPF knows, according to the information received from the SMF in step 412, the number of EPS bearers requiring data forwarding in each PDU session in the EPS, the mapping relationship between a Qos flow and an EPS bearer and/or the EPS bearer identifier. The UPF knows information of the Qos flow(s) of the PDU session contained in the 5G system.

The step 1609 is executed only when the indirect data forwarding is possible.

Step 1610: The MME transmits a relocation response message to the AMF. This message contains the tunnel information allocated by the SGW for data forwarding. The tunnel information is specific to each EPS bearer in each PDU session. This message contains a target-to-source transparent transmitter. The MME transmits, to the AMF, the E-RAB information contained in the PDU session and the tunnel information for data forwarding allocated by the SGW to each E-RAB.

This message contains the information for data forwarding between the SGW and the UPF allocated by the SGW. The information for data forwarding between the SGW and the UPF contains a PDU session identifier and/or E-RAB information contained in the PDU session. The E-RAB information contains an E-RAB identifier and the tunnel information used by the E-RAB for data forwarding. The information for data forwarding between the SGW and the UPF contains the tunnel information for data forwarding allocated to each E-RAB of each PDU session by the SGW. The tunnel information for data forwarding can contain uplink and/or downlink data forwarding tunnel information.

The MME directly transmits the E-RAB information to the AMF, and the E-RAB information is transferred by the AMF.

Step 1611: The AMF requests the SMF to create a data forwarding tunnel. The AMF transmits a indirect data forwarding tunnel establishment request message to the SMF. This message contains PDU session information. The PDU session information contains the PDU session identifier, information of the Qos flow contained in the PDU session, the number of EPS bearers requiring data forwarding in each PDU session in the EPS, the mapping between a Qos flow and an EPS bearer, the EPS bearer identifier and/or Qos information of each EPS bearer. This message contains the information for data forwarding received from the MME.

Step 1612: The SMF transmits an N4 session modification message to the UPF. This message contains PDU session information. The PDU session information contains the PDU session identifier, information of the Qos flow(s) contained in the PDU session, the number of EPS bearers requiring data forwarding in each PDU session in the EPS, the mapping between a Qos flow and an EPS bearer, the EPS bearer identifier and/or Qos information of each EPS bearer. This message contains the information for data forwarding received from the AMF.

The N4 session modification message contains EPS bearer information contained in the PDU session. The EPS bearer information contains an EPS bearer identifier and tunnel information used by each EPS bearer for data forwarding. The SMF informs the UPF of the correspondence between a Qos flow and an EPS bearer in the PDU session. The UPF knows the Qos flow information of the PDU session in the 5G system, and the UPF receives, from the SMF, the EPS bearer information contained in the PDU session and the mapping between a Qos flow and an EPS bearer.

The UPF allocates tunnel information for data forwarding between the NG-RAN and the UPF and then transmits the tunnel information to the SMF.

A method for data forwarding between the NG-RAN and the UPF is as follows.

The NG-RAN and the UPF perform data forwarding in such a way that each PDU session corresponds to one user plane tunnel. In this data forwarding method, the UPF allocates tunnel information for each PDU session. The tunnel information contains the address of a transport layer and a TEID.

The UPF transmits the allocated tunnel information for data forwarding to the SMF. The SMF receives an N4 session modification response message from the UPF. This message contains the tunnel information for data forwarding between the NG-RAN and the UPF allocated by the UPF.

Step 1613: The SMF transmits a indirect data forwarding tunnel establishment response message to the AMF. This message contains the tunnel information for data forwarding between the NG-RAN and the UPF allocated by the UPF.

Step 1614: The AMF transmits a handover command message to the NG-RAN. This message contains a target-to-source transparent transmitter and the tunnel information for data forwarding allocated by the UPF. This message further contains information about established PDU sessions and information about unsuccessfully established PDU sessions. The information about established PDU sessions contains information about established Qos flows and information about unsuccessfully established Qos flows. The tunnel information for data forwarding is specific to each PDU session.

Step 1615: The NG-RAN transmits a handover command message to the UE. This message can further contain the mapping between the Qos flow in the PDU session and the EPS bearer identifier. The UE correlates the ongoing Qos flows with the EPS bearer identifier in the PDU session contained in the handover command message. For a Qos flow without the corresponding EPS bearer, the UE can delete this Qos flow.

The NG-RAN forwards data to the UPF. For a PDU session requiring data forwarding and on a corresponding tunnel, the NG-RAN forwards data to the UPF.

The NG-RAN transmits, on a user plane tunnel allocated for the PDU session, data of each Qos flow to the UPF. For the downlink data, the NG-RAN transmits, on a tunnel allocated for downlink data forwarding, a downlink data packet to the UPF.

The UPF forwards data to the SGW. The UPF directly forwards the data received from the NG-RAN to the SGW through a user plane tunnel allocated for the corresponding EPS bearer. The SGW directly forwards the data to the target base station. The UPF forwards, according to the mapping between a Qos flow and an EPS bearer and through the user plane tunnel allocated for the corresponding EPS bearer, data of different Qos flows in the PDU session to the SGW. According to the mapping between a Qos flow and an EPS bearer and the information about the EPS bearer accepting the data forwarding, the UPF knows a Qos flow accepting the data forwarding, and the UPF forwards, to the SGW and through the user plane tunnel allocated for the corresponding EPS bearer, the data of the Qos flow that accepts the data forwarding. Correspondingly, if there is no Qos flow accepting the data forwarding and there is no corresponding data forwarding tunnel, the UPF discards the data. The SGW directly forwards data to the target base station.

The SGW forwards data to the E-UTRAN. The SGW transmits, to the E-UTRAN and through the corresponding tunnel allocated by the E-UTRAN, the data received from the UPF by the tunnel corresponding to each EPS bearer, that is, the UPF performs a mapping from multiple tunnels to one tunnel. The SGW forwards data to the E-UTRAN according to the session transmission method in the EPS.

Step 1616: The UE transmits a handover completion message to the E-UTRAN.

Step 1617: The E-UTRAN transmits a handover completion message to the MME. This message contains the tunnel information allocated by the E-UTRAN for downlink data transmission.

Step 1618: The MME transmits a bearer modification request message to the SGW. This message contains the tunnel information for downlink data transmission over the S1 interface.

Step 1619: The SGW transmits a bearer modification request message to the SMF. The SMF can further have a function of a PGW control plane. The SGW allocates tunnel information for downlink data transmission between the SGW and the UPF, and the tunnel information corresponds to each EPS bearer or each PDU session.

Step 1620: The SMF requests the UPF to perform session modification. The SMF can further have a function of a PGW control plane. The SMF transmits, to the UPF, the tunnel information for downlink data transmission between the SGW and the UPF allocated by the SGW, and the tunnel information corresponds to each EPS bearer or each PDU session. The UPF transmits a session modification response to the SMF. The UPF allocates tunnel information for uplink data transmission between the SGW and the UPF, and the UPF transmits, to the SMF, the tunnel information for uplink data transmission.

Step 1621: The SMF transmits a bearer modification response message to the SGW. This message contains the tunnel information for uplink data transmission between the SGW and the UPF allocated by the UPF.

Step 1622: The SGW transmits a bearer modification response message to the MME.

So far, the method for allocating, by the NG-RAN, the EPS bearer identifier while supporting the handover between different systems according to the present invention has been completed. The data forwarding during the handover between different systems can be well supported. By this method, the handover problem from the 5GS to the EPS can be solved, so that the loss of data is avoided and the continuity of services is ensured. By this method, the EPS bearer identifier is allocated as required, so that unnecessary allocation and transmission are avoided and the operations to the equipment are simplified.

Figure 17:
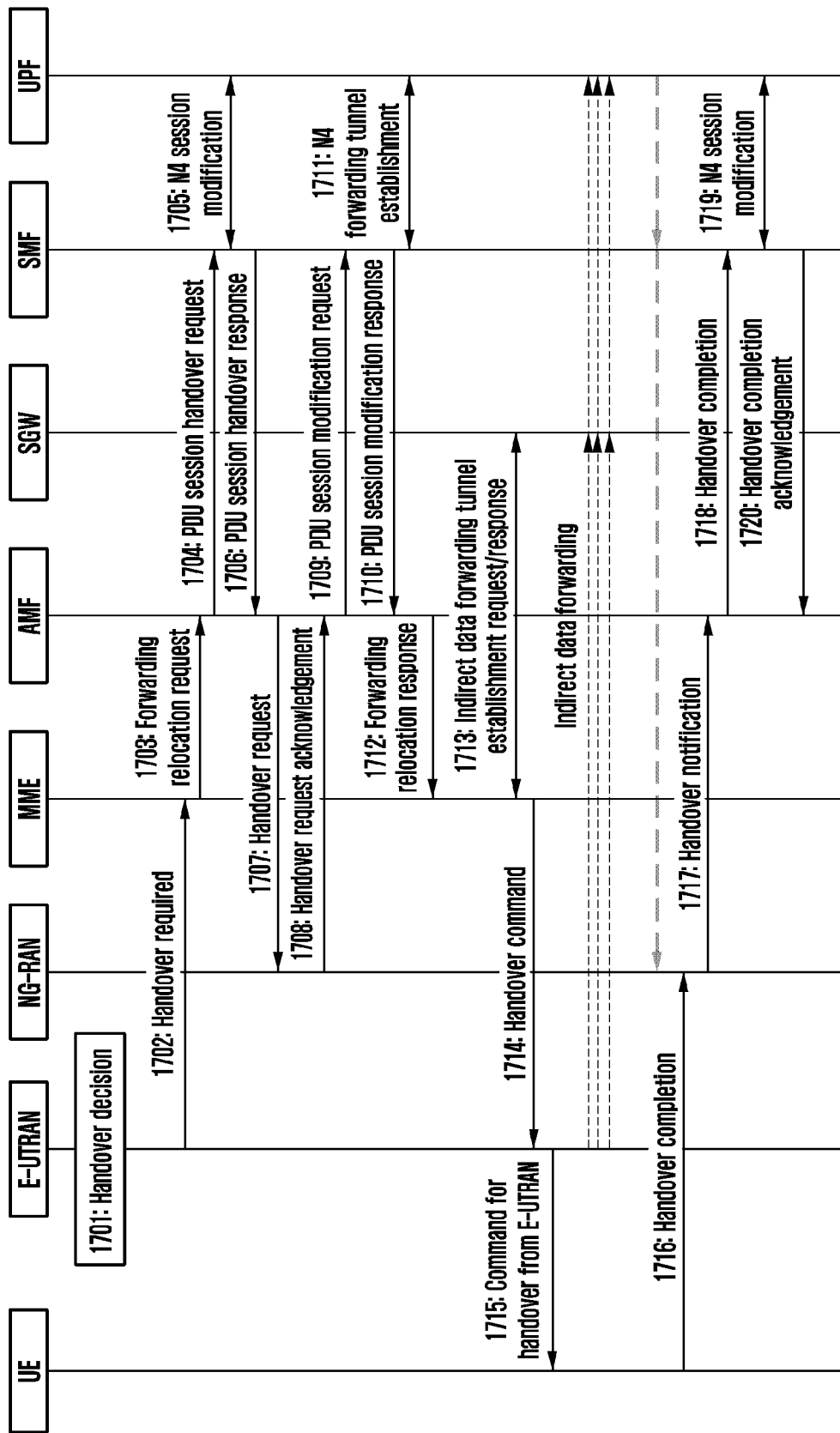
FIG. 17 is a schematic flowchart of a second method for handing over a UE from an EPS system to a 5G system.

FIG. 17 shows a schematic flowchart of a second method for handing over a UE from an EPS to a 5GS system according to the present invention. This method comprises the following steps.

Step 1701: An E-UTRAN decides to hand over a UE to an NG-RAN.

Here, the E-UTRAN can be an eNB connected to the EPC. The NG-RAN can be a gNB, an eNB connected to the 5GC or a Centralized Unit (CU) in the gNB. The eNB connected to the 5GC can also be referred to as an ng-eNB.

The user plane path before handover is anchors UPF, SGW and E-UTRAN. The SGW needs to support an interface to the anchor UPF. The anchor UPF can be located in the 5GC or the EPC or can be a common entity. The anchor UPF can be a UPF serving the UE, and executes a function of a user plane anchor during the handover between different Radio Access Technologies (RATs). The anchor UPF can be a function of a PGW user plane plus an UPF or a function of an UPF plus a PGW user plane, and executes a function of a user plane anchor during the handover between different Radio Access Technologies (RATs).

The UE has one or more ongoing PDU sessions (also referred to as PDN connections). Each PDU session contains one or more EPS bearers. During a PDU session establishment or EPS bearer establishment process, Qos information and/or Qos flow identifier of a mapped Qos flow and/or the identifier of a PDU session are allocated to each EPS bearer. Default EPS bearer is mapped to a non-Guaranteed Business Rate (non-GBR) Qos flow. The PDU session to which the EPS bearer belongs can be allocated by the function of the PCC or PGW control plane. The Qos information and/or Qos flow identifier of a mapped Qos flow of the EPS bearer can be allocated by a function of a PCC or PGW control plane. In order to support the handover between different systems, a PGW control plane can further have an SMF function. In a PCC deployment scenario, the Policy Control and Charging Rules Function (PCRF) provides the SMF with the identifier of the PDU session to which an EPS bearer belongs, and the PCRF provides the SMF with the Qos and/or Qos flow identifier of a Qos flow mapped by an EPS bearer. In order to support the handover between different systems, a PCRF further has a Policy Control Function (PCF). The PGW transmits, to the SGW, the identifier of the PDU session to which an EPS bearer belongs, the Qos information of a Qos flow mapped by an EPS bearer and/or the identifier of a Qos flow mapped by an EPS bearer. The SGW saves the received identifier of the PDU session to which an EPS bearer belongs. The SGW saves the received Qos and/or Qos flow identifier of a Qos flow mapped by an EPS bearer. The SMF transmits to the UE via the MME, the Qos and/or Qos flow identifier of a Qos flow mapped by an EPS bearer and/or the identifier of the PDU session to which an EPS bearer belongs e.g. through a non-access stratum message PDN connection establishment message. The MME acquires, from the SMF, the Qos and/or Qos flow identifier of a Qos flow mapped by an EPS bearer and/or the identifier of the PDU session to which an EPS bearer belongs. The E-RAB identifier and the EPS bearer identifier are identical or in one-to-one correspondence. It is called an EPS bearer in a core network, while it is called an E-RAB in an access network. The E-RAB identifier and the EPS bearer identifier are identical or in one-to-one correspondence. It is called the EPS bearer identifier in a core network, while it is called the E-RAB identifier in an access network.

Step 1702: The E-UTRAN transmits a handover required message to an MME. This message contains the identifier of a target NG-RAN node and a source-to-target transparent transmitter. This message further contains identification information indicating an AMF to which the target NG-RAN is connected. The identification information can be an identifier of a tracked area, an identifier of a network slice, an identifier of an AMF pool, an identifier of the AMF, or more.

This message contains the handover type. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

The E-UTRAN gives a proposal of data forwarding for an E-RAB. The handover required message contains a list of E-RAB information of the UE. The E-RAB information contains an E-RAB identifier and/or the downlink data forwarding proposed for the E-RAB. Here, the list of E-RAB information of the UE is directly contained in the handover required message or in the source-to-target transparent transmitter. If the list of E-RAB information of the UE is contained in the handover required message, the core network can know the downlink data forwarding information proposed for the E-RAB. For the handover between different systems, that is, if the target base station is an NG-RAN, the E-UTRAN contains the E-RAB identifier of the UE and the downlink data forwarding in the handover required information or in the source-to-target transparent transmitter. For the handover in the LTE system, the E-UTRAN contains the E-RAB identifier of the UE and the downlink data forwarding in the source-to-target transparent transmitter.

Step 1703: The MME transmits a relocation request message to an AMF. According to the identification information of an AMF to which the target NG-RAN node connects contained in the handover required message, the MME selects and finds the AMF. This message contains the identifier of the target NG-RAN node, a source-to-target transparent transmitter and UE context information. The UE context information contains UE Mobility Management (MM) context information and Session Management (SM) context. This message contains the handover type. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

This message contains a list of EPS bearer information of the UE. The EPS information contains an EPS identifier and/or the downlink data forwarding proposed for the EPS bearer.

The MME or the AMF decides whether the data forwarding is possible. Here, the data forwarding refers to indirect data forwarding. If the MME decides that the indirect data forwarding is impossible, the MME informs the AMF of the information.

Step 1704: The AMF transmits a PDU handover request message to the selected SMF. This message contains a PDN connection and an AMF identifier. The PDN connection provides the common address of the SMF and the PGW control plane function. According to the information in the received relocation request message, the AMF knows that the handover is a handover between different systems, and the AMF requests the SMF to provide an SM context. The AMF transmits this message to each SMF serving the UE.

This message contains a list of EPS bearer information of the UE. The EPS information contains an EPS identifier and/or the downlink data forwarding proposed for the EPS bearer.

The SMF receives, from the MME, an EPS bearer identifier and the downlink data forwarding proposed for the EPS bearer. According to the PDU session identifier and QoS flow identifier(s) corresponding to an EPS bearer obtained during the PDU session or EPS bearer establishment process, the SMF knows the PDU session and Qos flow(s) corresponding to an EPS bearer, so that the SMF can know the PDU session and the Qos flow(s) that the source base station proposed for downlink data forwarding.

Step 1705: The SMF modifies an UPF.

Step 1706: The SMF transmits a PDU session handover response message to the AMF. This message contains the PDU session identifier, an EPS bearer setup list, and Qos rules.

This message further contains the mapping between EPS bearers and Qos flows in the PDU session. When the AMF requests for the SM context, the SMF also always feeds back the mapped EPS bearer context (if any) to the AMF. Or, the SMF transmits the mapped EPS bearer context to the AMF only when the AMF also requests for the mapped EPS context.

Step 1707: The AMF transmits a handover request message to the NG-RAN. This message contains PDU session information to be established. The information about the PDU session contains an PDU session identifier, downlink data forwarding for the PDU session, session Qos information, Qos flow information, a downlink data forwarding proposal for the Qos flow, uplink tunnel information of each PDU session, a source-to-target transparent transmitter, and/or Qos information of a Qos flow. This message contains the handover type. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

This message contains a list of Qos flow information in the PDU session. The Qos flow information contains a Qos flow identifier, Qos information of the Qos flow and/or downlink data forwarding information proposed for the Qos flow.

This message can further contain the mapping between a Qos flow in the PDU session and an EPS bearer, i.e., the identifier of the EPS bearer mapped by a Qos flow and/or the mapped Qos information. This message contains a source-to-target transparent transmitter.

Step 1708: The NG-RAN transmits a handover request acknowledgement message to the AMF. This message contains one or more pieces of the following information:

a target-to-source transparent transmitter, wherein the target-to-source transparent transmitter can further contain the mapping between a Qos flow in the PDU session and an EPS bearer, i.e., the identifier of the EPS bearer mapped by a Qos flow and/or the mapped Qos information; the target-to-source transparent transmitter can further contain information about a successfully established PDU session; and the PDU session information comprises a PDU session identifier and a list of identifiers of a successfully established Qos flow in the PDU session;

a list of PDU session information accepted to be established by the NG-RAN, wherein the list of PDU session information contains the PDU session identifier, downlink tunnel information for the PDU session over an NG3 interface, Qos flow information accepted for the PDU session, Qos flow information that is not accepted, and tunnel information for data forwarding over the NG3 interface; for a successfully established Qos flow in a successfully established PDU session, if the 5G-RAN has received the proposed downlink data forwarding and has accepted the data forwarding, the NG-RAN allocates, to the corresponding PDU session, tunnel information for data forwarding over the NG3 interface; for a successfully established Qos flow, if the 5G-RAN has received the proposed downlink data forwarding, the data forwarding is possible and the data forwarding has been accepted, the NG-RAN allocates, to the corresponding PDU session, tunnel information for data forwarding over the NG3 interface; the NG-RAN contains, in the handover request acknowledgement message, the information indicating that the data forwarding for a Qos flow has been accepted; for a successfully established Qos flow in a successfully established PDU session, if the 5G-RAN has received the downlink data forwarding proposed for the corresponding E-RAB and the NG-RAN has accepted the data forwarding for the Qos flow, the NG-RAN allocates, to the corresponding PDU session, tunnel information for data forwarding over the NG3 interface; for a successfully established Qos flow, if the 5G-RAN has received the downlink data forwarding proposed for the corresponding E-RAB, the data forwarding is possible and NG-RAN has accepted the data forwarding for the Qos flow, the NG-RAN allocates, to the corresponding PDU session, tunnel information for data forwarding over the NG3 interface; the NG-RAN contains, in the handover request acknowledgement message, the information indicating that the data forwarding for a Qos flow has been accepted; the tunnel information for data forwarding is specific to each PDU session; and a list of PDU session information rejected to be established by the NG-RAN, wherein the list of PDU session information contains the PDU session identifier and the causes for rejection.

Step 1709: The AMF transmits a PDU session modification request message to the SMF. If the tunnel information for data forwarding over the NG3 interface has been received from the NG-RAN, the AMF requests the SMF to create a data forwarding tunnel. The AMF transmits, to the SMF, the tunnel information for data forwarding received from the NG-RAN. This message contains the PDU session to which an EPS bearer belongs. This message can further contain the mapping between an EPS bearer and a Qos flow in the PDU session. This message contains the information indicating that a Qos flow has been accepted for the data forwarding by the target NG-RAN.

According to the mapping between EPS bearer and PDU session identifier as well as Qos flow identifier, the SMF knows the information about the EPS bearer that has been accepted for data forwarding.

The SMF allocates tunnel information to an EPS bearer that has been accepted for data forwarding, or the SMF requests the UPF to allocate data forwarding tunnel information to an EPS bearer that has been accepted for data forwarding. Or, the SMF allocates tunnel information to a PDU session that has accepted the data forwarding, or the SMF requests the UPF to allocate data forwarding tunnel information to a PDU session that has accepted the data forwarding.

This message contains information about a successfully established Qos flow and/or information about an unsuccessfully established Qos flow. According to the mapping between EPS bearer and PDU session identifier as well as Qos flow identifier, the SMF knows the information about the EPS bearers that have been successfully admitted to handover. Or, this message contains the information about a successfully established Qos flow, and the SMF knows the information about an unsuccessfully established Qos flow according to the information about the Qos flow in the PDU session of the UE and the information about the successfully established Qos flow.

Step 1710: The SMF transmits a PDU session modification response message to the AMF. This message contains the tunnel information for data forwarding between the SGW and the anchor UPF allocated by the SMF or the anchor UPF. This message contains a target-to-source transparent transmitter.

This message contains an EPS bearer setup list. The SMF obtains, according to the information about a successfully established Qos flow, the list of established EPS bearers which are successfully handed over to the target base station. This message further contains the tunnel information allocated to an EPS bearer that has been accepted for data forwarding, or the tunnel information allocated to a PDU session that has been accepted for data forwarding.

This message contains Qos flow information to be mapped in the PDU session in the 5GS. The Qos flow information contains a Qos flow identifier and/or Qos information corresponding to the Qos flow.

Step 1711: The SMF transmits, through an N4 session establishment or N4 session modification process and to the anchor UPF, the tunnel information for downlink data forwarding over the NG3 interface allocated by the NG-RAN. The SMF allocates tunnel information for data forwarding between the SGW and the UPF and transmits it to the UPF. Or, the anchor UPF allocates tunnel information used for data forwarding between the SGW and the anchor UPF and then transmits the tunnel information to the SMF. The N4 session establishment message or N4 session modification message contains the PDU session to which an EPS bearer belongs. The N4 session establishment message or N4 session modification message can further contain the mapping between an EPS bearer and a Qos flow in the PDU session.

The SMF transmits, to the UPF, the tunnel information used for data forwarding between the SGW and the anchor UPF allocated by the SMF or the UPF. The tunnel information is specific to the EPS bearer or PDU session that has been accepted for data forwarding.

This message contains information about a successfully established Qos flow and/or information about an unsuccessfully established Qos flow. Or, this message contains the information about a successfully established Qos flow, and the SMF knows the information about an unsuccessfully established Qos flow according to the information about the Qos flow in the PDU session of the UE and the information about the successfully established Qos flow.

The PDU session modification response message in step 1710 can be executed before or after the N4 session establishment response message or N4 session modification response message in step 1711.

There are three methods for performing data forwarding between the SGW and the anchor UPF.

Method 1: The method for data transmission between the SGW and the anchor UPF is that there is one tunnel for each EPS bearer in each PDU session. The anchor UPF transmits the data of a same PDU session received from the SGW in a per EPS bearer tunnel to the NG-RAN through the tunnel corresponding to the PDU session, that is, the anchor UPF performs a mapping from multiple tunnels to one tunnel. The anchor UPF needs to add the Qos flow identifier in a header of the data packet and then transmits the data packet to the NG-RAN. In this data forwarding method, the anchor UPF or the SMF allocates, to each EPS bearer requiring data forwarding in each PDU session, tunnel information used for data forwarding between the SGW and the anchor UPF. For each PDU session, the number of data forwarding tunnels is equal to the number of EPS bearers. The anchor UPF knows, according to the information received from the AMF in steps 1709 and 1711, the number of EPS bearers requiring data forwarding in each PDU session on the EPS side. The anchor UPF or the SMF transmits, to the AMF, the tunnel information for data forwarding allocated to each EPS bearer in the PDU session.

Method 2: The method for data transmission between the SGW and the anchor UPF is that each PDU session corresponds to one tunnel. The SGW transmits, through a same tunnel and to the anchor UPF, the data of a same PDU session received by a tunnel corresponding to each EPS bearer. In this data forwarding method, the anchor UPF allocates, to each PDU session, tunnel information used for data forwarding between the SGW and the anchor UPF.

Method 3: The method for data transmission between the SGW and the anchor UPF is that each PDU session corresponds to one tunnel. The SGW transmits, through a same tunnel and to the anchor UPF, the data of a same PDU session received by a tunnel corresponding to each E-RAB, and the Qos and/or flow related information is added on a header of the data packet. In this data forwarding method, the anchor UPF allocates, to each PDU session, tunnel information used for data forwarding between the SGW and the anchor UPF. In the response message in steps 1709 and 1711, the anchor UPF transmits, through the AMF and to the AMF, the Qos flow information to be mapped in the PDU session in the 5GS. The Qos flow information contains a Qos flow identifier and/or Qos information corresponding to the Qos flow. The AMF informs the MME of the information by step 1710, and the MME informs the SGW of the information by step 1713. The SGW can contain the Qos and/or flow related information in the header of the data packet.

The anchor UPF transmits the allocated data forwarding tunnel information to the AMF through the SMF.

Step 1712: The AMF transmits a forwarding relocation response message to the MME. This message contains a target-to-source transparent transmitter and an EPS bearer setup list. This message further contains the tunnel information allocated to an EPS bearer accepted for data forwarding.

Step 1713: The MME transmits an indirect data forwarding tunnel establishment request message to the SGW. This message contains the tunnel information used for data forwarding between the SGW and the anchor UPF.

In the third data forwarding method, this message contains the Qos flow information to be mapped by the EPS bearer in the PDU session in the 5GS and is transmitted to the SGW. The Qos flow information contains a Qos flow identifier and/or Qos information corresponding to the Qos flow.

The SGW transmits an indirect data forwarding tunnel establishment response message to the MME. This message contains the uplink tunnel information for data forwarding over the S1 interface allocated by the SGW.

Step 1714: The MME transmits a handover command message to the E-UTRAN. This message contains a target-to-source transparent transmitter and the tunnel information for data forwarding over the S1 interface. This message contains the handover type. The tunnel information for data forwarding over the S1 interface is specific to the E-RAB. The presence of the tunnel information for data forwarding indicates that the target base station has accepted the data forwarding. The handover type contains a handover in the LTE, a handover from the LTE to the NR or more. The handover from the LTE to the NR can further contain a handover from an LTE base station connected to the EPC to the NR or a handover from an LTE base station connected to the 5GC to the NR. This is because an LTE eNB may support an interface to the 5GC, or may not support an interface to the 5GC.

Step 1715: The E-UTRAN transmits a command message for handover from E-UTRAN to the UE.

This message can further contain the mapping between a Qos flow in the PDU session and an EPS bearer, i.e., the identifier of the EPS bearer mapped by a Qos flow and/or the mapped Qos information.

The E-UTRAN forwards data to the SGW. The E-UTRAN forwards data to the SGW on a tunnel corresponding to each E-RAB accepted for data forwarding.

The SGW forwards data to the anchor UPF. Corresponding to the three data forwarding methods described in step 1711, the SGW has different behaviors.

In the method 1, the SGW forwards data to the anchor UPF on a tunnel corresponding to each EPS bearer accepted for data forwarding.

In the method 2, the SGW transmits, through a same tunnel and to the anchor UPF, the data of a same PDU session received by the tunnel corresponding to each EPS bearer. The anchor UPF performs a mapping from the PDU session to the Qos flow.

In the method 3, the SGW transmits, through a same tunnel and to the UPF, the data of a same PDU session received by the tunnel corresponding to each E-RAB, and the Qos and/or flow related information is added on a header of the data packet. The SGW performs a mapping from the PDU session to the Qos flow. The SGW performs a mapping from the PDU session to the Qos flow according to the information received in step 1713.

The anchor UPF forwards data to the NG-RAN. Corresponding to the three data forwarding methods described in step 1711, the anchor UPF has different behaviors.

In the method 1, the anchor UPF transmits the data packets of a same PDU session received from the SGW in a per EPS bearer tunnel to the NG-RAN through the corresponding PDU session tunnel, that is, the anchor UPF performs a mapping from multiple tunnels to one tunnel. The anchor UPF forwards data to the NG-RAN according to the session transmission method in the 5GS, for example, how many Qos flows being used to transmit downlink data in each PDU session, and how a header of a Qos flow being set (for example, the header of the data packet contains the Qos flow identifier or other information). For an unsuccessfully established Qos flow received in step 1711, if the anchor UPF has received the data forwarded by the SGW, the anchor UPF discards the data. This is because the access control in the NG-RAN is performed per Qos flow; however, on the E-UTRAN side, the data forwarding tunnel corresponds to each E-RAB, and the data forwarding is also performed in the E-RAB level. The level of a Qos flow is finer than the level of an E-RAB. Since the E-URAN cannot distinguish data from different Qos flows or the E-UTRAN does not know the information about the unsuccessfully established Qos flows, the E-UTRAN may forward the data of an unsuccessfully established Qos flow in the E-RAB to the SGW, and the SGW then transmits the data to the anchor UPF. The UPF discards the data of the unsuccessfully established Qos flows.

In the method 2, the anchor UPF directly receives data from the SGW by the tunnel corresponding to each PDU session. The anchor UPF forwards data to the NG-RAN according to the session transmission method in the 5GS, for example, how many flows being used to transmit downlink data in each PDU session, and how a header of a flow being set.

In the method 3, the anchor UPF directly receives, from the SGW, the data to be forwarded in the 5GS. The anchor UPF forwards data to the NG-RAN.

During the PDU session establishment or EPS bearer establishment process, the UE receives, from the network, Qos information and/or Qos flow information of a Qos flow mapped by an EPS bearer. The UE correlates the ongoing EPS bearers with the Qos flows in the PDU session contained in the handover command message. For an EPS bearer without the corresponding Qos flow, the UE can delete this EPS bearer.

Or, the UE obtains, from the handover command message, the mapping between a Qos flow in the PDU session and an EPS bearer. The UE correlates the ongoing EPS bearers with the Qos flows in the PDU session contained in the handover command message. For an EPS bearer without the corresponding Qos flow, the UE can delete this EPS bearer.

Step 1716: The UE transmits a handover completion message to the NG-RAN.

Step 1717: The NG-RAN transmits a handover notification message to the AMF. This message contains the tunnel information for downlink data transmission allocated by the NG-RAN.

Step 1718: The AMF transmits a handover completion message to the SMF.

Step 1719: The SMF transmits an N4 session modification message to the UPF. The UPF transmits the N4 session modification response to the SMF. The AMF transmits the tunnel information for downlink data transmission allocated by the NG-RAN to the anchor UPF through the SMF.

Step 1720: The SMF transmits a session handover completion acknowledgement message to the AMF.

The session modification response message in step 1720 can be executed before or after the N4 session modification response message in step 1719.

So far, the process of obtaining information by the handover process in the EPS in the present invention has been completed, and the data forwarding during the handover between different systems can be well supported. By this method, the handover problem from the EPS to the 5GS can be solved, so that the loss of data is avoided and the continuity of services is ensured.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

What is claimed is:

1. A method performed by a first entity for supporting an inter-system handover from a first radio access technology (RAT) to a second RAT, the method comprising:
   receiving, from a second entity, a first message including quality of service (QoS) flow information;
   transmitting, to a base station, a handover request message including E-UTRAN radio access bearer (E-RAB) information and the QoS flow information;
   receiving, from the base station, a handover request acknowledgement message including information indicating whether a data forwarding for at least one QoS flow associated with a protocol data unit (PDU) session is accepted or not, the information being determined based on the E-RAB information and the QoS flow information, when the PDU session is accepted by the base station; and
   transmitting, to the second entity, a second message including tunnel information for the data forwarding,
   wherein the E-RAB information includes an E-RAB identifier and data forwarding information.

2. The method of claim 1, wherein the handover request acknowledgement message includes information on a list of QoS flows, which have failed to be established, with a cause value.

3. The method of claim 1, wherein the handover request message includes handover type information.

4. The method of claim 1, wherein the handover request acknowledgement message includes PDU session information indicating that the PDU session is rejected to be established by the base station and cause information for a rejection in case that the PDU session is not accepted.

5. A method performed by a first entity for supporting an inter-system handover from a first radio access technology (RAT) to a second RAT, the method comprising:
receiving, from a second entity, a message including first tunnel information for data forwarding between a third entity and the first entity, and second tunnel information for downlink data forwarding between a base station and the first entity allocated by the base station;
receiving, from the third entity, a data packet through a tunnel for data forwarding based on the first tunnel information; and
forwarding, to the base station, the data packet in a protocol data unit (PDU) session tunnel.

6. The method of claim 5, further comprising:
adding a quality of service flow identifier (QFI) on the data packet through the tunnel for data forwarding based on the first tunnel information.

7. The method of claim 5, wherein the message further includes mapping information associated with quality of service (QoS) flow.

8. A first entity for supporting an inter-system handover from a first radio access technology (RAT) to a second RAT, the first entity comprising:
a transceiver; and
a controller coupled with the transceiver and configured to:
receive, from a second entity, a first message including quality of service (Qos) flow information;
transmit, to a base station, a handover request message including E-UTRAN radio access bearer (E-RAB) information and the Qos flow information;
receive, from the base station, a handover request acknowledgement message including information indicating whether a data forwarding for at least one Qos flow associated with a protocol data unit (PDU) session is accepted or not, the information being determined based on the E-RAB information and the QoS flow information, when the PDU session is accepted by the base station; and
transmit, to the second entity, a second message including tunnel information for the data forwarding.

9. The first entity of claim 8, wherein the handover request acknowledgement message includes information on a list of QoS flows, which have failed to be established, with a cause value.

10. The first entity of claim 8, wherein the E-RAB information includes an E-RAB identifier and data forwarding information.

11. The first entity of claim 8, wherein the handover request message includes handover type information.

12. The first entity of claim 8, wherein the handover request acknowledgement message includes PDU session information indicating that the PDU session is rejected to be established by the base station and cause information for a rejection in case that the PDU session is not accepted.

13. A first entity for supporting an inter-system handover from a first radio access technology (RAT) to a second RAT, the first entity comprising:
a transceiver; and
a controller coupled with the transceiver and configured to:
receive, from a second entity, a message including first tunnel information for data forwarding between a third entity and the first entity and second tunnel information for downlink data forwarding between a base station and the first entity allocated by the base station;
receive, from the third entity, a data packet through a tunnel for data forwarding based on the first tunnel information; and
forward, to the base station, the data packet in a protocol data unit (PDU) session tunnel.

14. The first entity of claim 13, wherein the controller is further configured to:
add a quality of service flow identifier (QFI) on the data packet through the tunnel for data forwarding based on the first tunnel information.

15. The first entity of claim 13, wherein the message further includes mapping information associated with quality of service (QoS) flow.

* * * * *